(12) United States Patent
Zamir

(10) Patent No.: US 10,058,790 B2
(45) Date of Patent: Aug. 28, 2018

(54) MOTOR ASSEMBLY KIT

(71) Applicant: BOSE CORPORATION, Framingham, MA (US)

(72) Inventor: Lee Zamir, Framingham, MA (US)

(73) Assignee: BOSE CORPORATION, Framingham, MA (US)

( * ) Notice: Subject to any disclaimer, the term of this patent is extended or adjusted under 35 U.S.C. 154(b) by 755 days.

(21) Appl. No.: 14/666,667

(22) Filed: Mar. 24, 2015

(65) Prior Publication Data

US 2015/0265938 A1 Sep. 24, 2015

Related U.S. Application Data

(60) Provisional application No. 61/969,802, filed on Mar. 24, 2014.

(51) Int. Cl.
*H02K 1/24* (2006.01)
*A63H 33/04* (2006.01)
*H02P 6/08* (2016.01)

(52) U.S. Cl.
CPC .............. *A63H 33/042* (2013.01); *H02K 1/24* (2013.01); *H02P 6/08* (2013.01)

(58) Field of Classification Search
CPC ......... A63H 33/042; H02P 6/08; G03B 25/02; G09F 19/12; G11B 27/026; G11B 25/00; H04N 5/76
USPC .................................................. 446/295, 297
See application file for complete search history.

(56) References Cited

U.S. PATENT DOCUMENTS

| | | | |
|---|---|---|---|
| 6,538,540 B2 * | 3/2003 | Oberndorfer | H01H 51/20 335/267 |
| 8,482,714 B1 | 7/2013 | Seder | |
| 2009/0033446 A1 * | 2/2009 | Gruner | H01H 1/26 335/129 |
| 2010/0201949 A1 | 8/2010 | Barnett et al. | |
| 2015/0283470 A1 * | 10/2015 | Hooper | A63H 3/006 446/485 |

FOREIGN PATENT DOCUMENTS

| | | |
|---|---|---|
| GB | 2307561 A | 5/1997 |
| KR | 20100124881 A | 11/2010 |

OTHER PUBLICATIONS

International Search Report and Written Opinion of the International Searching Authority for International Application No. PCT/US2015/022294, dated Jul. 10, 2015, 14 pages.
"Spinsational Animator Disc Spinner—Incredible Science," Incredible Science, Dec. 23, 2012, Retrieved Jun. 29, 2015 <<https://www.youtube.com/watch?v=ShoZ4iRs2Ek>>, 1 page.

* cited by examiner

*Primary Examiner* — Joshua Benitez Rosario
*Assistant Examiner* — Leda Pham
(74) *Attorney, Agent, or Firm* — Patterson + Sheridan, LLP

(57) ABSTRACT

In some examples, a motor assembly kit includes a magnet, a coil, a bearing, and a flat assembly. The flat assembly includes a base structure, a first plurality of components, and a second plurality of components. The first plurality of components are removable from the flat assembly to construct a magnet support to support the magnet above the base structure. The second plurality of components are removable from the flat assembly to construct a coil cradle to support the coil above the base structure.

20 Claims, 35 Drawing Sheets

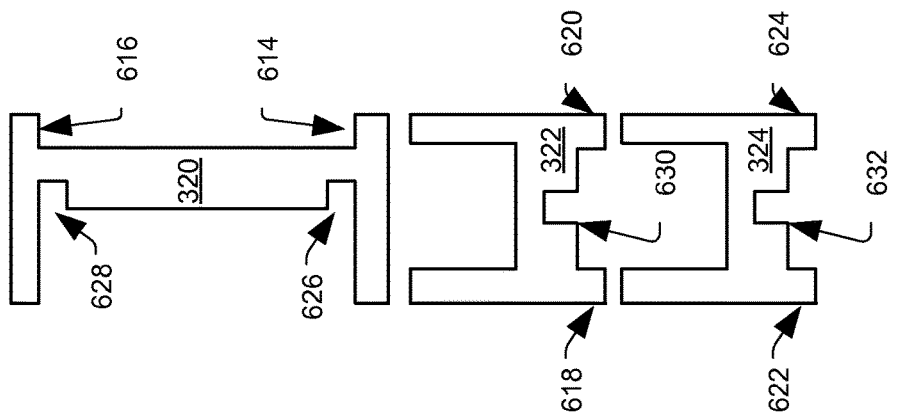
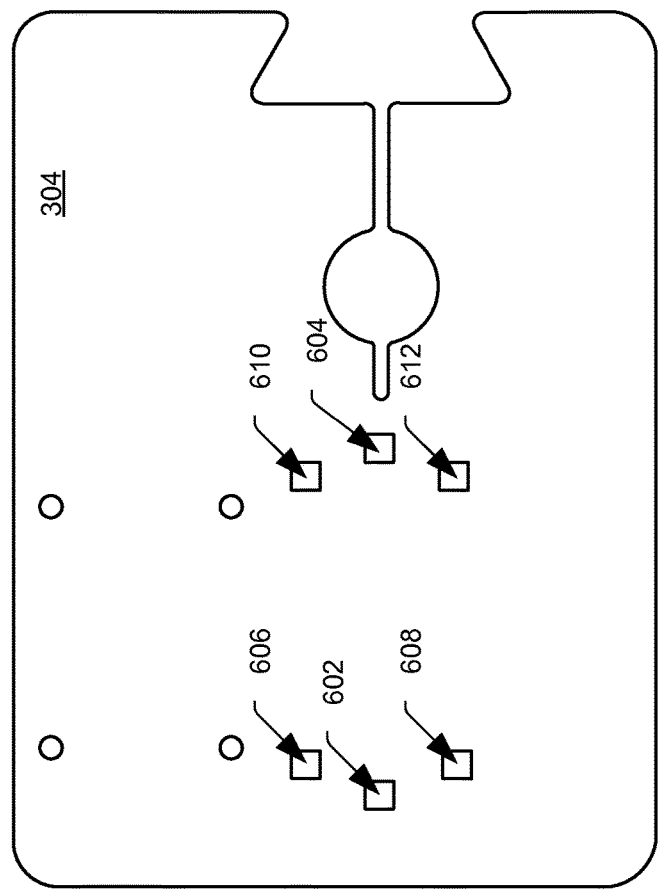
FIG. 6

MOTOR ASSEMBLY KIT

I. CLAIM OF PRIORITY

The present application claims the benefit of and priority from U.S. Provisional Application Ser. No. 61/969,802, filed Mar. 24, 2014 and titled "CONSTRUCTION KIT ASSEMBLY," which is expressly incorporated herein by reference in its entirety.

II. FIELD OF THE DISCLOSURE

The present disclosure relates to a motor assembly kit and components thereof.

III. BACKGROUND

With the increase in prevalence of mobile computing devices, children are being introduced to computing technology at a younger age. For example, it is no longer considered out of the ordinary for a young child to be proficient in operating a mobile phone or a tablet computer. Thus, at a fairly young age, children often have familiarity with certain aspects of audio, video, and communications technology.

IV. SUMMARY OF THE DISCLOSURE

In selected examples, a motor assembly kit is described. In some cases, the motor assembly kit includes a magnet, a coil, a bearing, and a flat assembly. The flat assembly includes a base structure, a first plurality of components, and a second plurality of components. The first plurality of components are removable from the flat assembly to construct a magnet support to support the magnet above the base structure. The second plurality of components are removable from the flat assembly to construct a coil cradle to support the coil above the base structure. The first plurality of components may include a first magnet bracket, a second magnet bracket, and at least one rotor plate. The first magnet bracket includes a hole to receive a first side of the magnet associated with a first pole of the magnet, and a second magnet includes a hole to receive a second side of the magnet associated with a second pole of the magnet. The at least one rotor plate is configured to receive the first magnet bracket and the second magnet bracket to form a magnet assembly and configured to rotatably attach the magnet assembly to the base structure via the bearing. The second plurality of components include a first coil cradle support, a second coil cradle support, and a third coil cradle support. The first coil cradle support includes a set of legs to be inserted into a first set of holes of the base structure to support a first end of the coil and a second end of the coil, wherein the first end of the coil is disposed adjacent to the magnet assembly. The second coil cradle support includes a set of legs to be inserted into a second set of holes of the base structure to support one of the first end of the coil and the second end of the coil. The third coil cradle support includes a set of legs to be inserted into a third set of holes of the base structure to support the other one of the first end of the coil and the second end of the coil.

In another example, a motor assembly kit may include a coil, a magnet, a bearing, and a flat assembly. The flat assembly includes a first plurality of components that are removable from the flat assembly to construct a magnet support to support the magnet above the base structure. The flat assembly further includes a second plurality of components that are removable from the flat assembly to construct a coil cradle to support the coil above the base structure. The first plurality of components may include a first magnet bracket, a second magnet bracket, at least one rotor plate, and a rotor clip. The first magnet bracket includes a hole to receive a first side of the magnet associated with a first pole of the magnet, and the second magnet bracket includes a hole to receive a second side of the magnet associated with a second pole of the magnet. The at least one rotor plate is configured to receive the first magnet bracket and the second magnet bracket. The rotor clip includes a set of legs that substantially align with a set of holes of the at least one rotor plate to secure the magnet within the first magnet bracket and the second magnet bracket to form a magnet assembly that is rotatably attachable to the base structure via the bearing. The second plurality of components may include a first coil cradle support, a second coil cradle support, and a third coil cradle support. The first coil cradle support includes a set of legs to be inserted into a first set of holes of the base structure to support a first end of the coil and a second end of the coil (that includes at least one wire), and the first end of the coil is disposed adjacent to the magnet assembly. The second coil cradle support includes a set of legs to be inserted into a second set of holes of the base structure to support one of the first end of the coil and the second end of the coil. The third coil cradle support includes a set of legs to be inserted into a third set of holes of the base structure to support the other one of the first end of the coil and the second end of the coil.

In yet another example, a motor assembly kit includes a coil, a power supply, a control unit, a magnet, a bearing, and a flat assembly. The control unit includes a first interface to receive a power cable (associated with the power supply) and a second interface to receive a control cable to be electrically coupled to the coil via at least one wire. The first plurality of components may include a first magnet bracket, a second magnet bracket, a rotor plate assembly, and a rotor clip. The first magnet bracket includes a hole to receive a first side of the magnet associated with a first pole of the magnet, the second magnet bracket includes a hole to receive a second side of the magnet associated with a second pole of the magnet, and the at least one rotor plate is configured to receive the first magnet bracket and the second magnet bracket. The rotor clip includes a set of legs that substantially align with a set of holes of the at least one rotor plate to secure the magnet within the first magnet bracket and the second magnet bracket to form a magnet assembly that is rotatably attachable to the base structure via the bearing. The second plurality of components may include a first coil cradle support, a second coil cradle support, and a third coil cradle support. The first coil cradle support includes a set of legs to be inserted into a first set of holes of the base structure to support the first end of the coil and the second end of the coil, where the first end of the coil is disposed adjacent to the magnet assembly. The second coil cradle support includes a set of legs to be inserted into a second set of holes of the base structure to support one of the first end of the coil and the second end of the coil. The third coil cradle support includes a set of legs to be inserted into a third set of holes of the base structure to support the other one of the first end of the coil and the second end of the coil.

V. BRIEF DESCRIPTION OF THE DRAWINGS

FIG. 6 is a top view of various components removed from the flat assembly of FIG. 3 for use in constructing the coil support of FIG. 1;

FIG. 23 further illustrates a particular example in which a user may manually initiate rotation of a rotor of the second magnet assembly;

FIG. 26 further illustrates a particular example in which a user may manually initiate rotation of a rotor of the third magnet assembly;

FIG. 32 further illustrates that the rotation of the animation disk may result in the design pattern on the animation disk appearing blurry to a user;

FIG. 33 further illustrates that rotation of the animation disk at a particular rotation rate in conjunction with the light emitted by the strobe light at a particular pulse rate may create an optical illusion (e.g., a travelling ball);

VI. DETAILED DESCRIPTION

Figure 1:
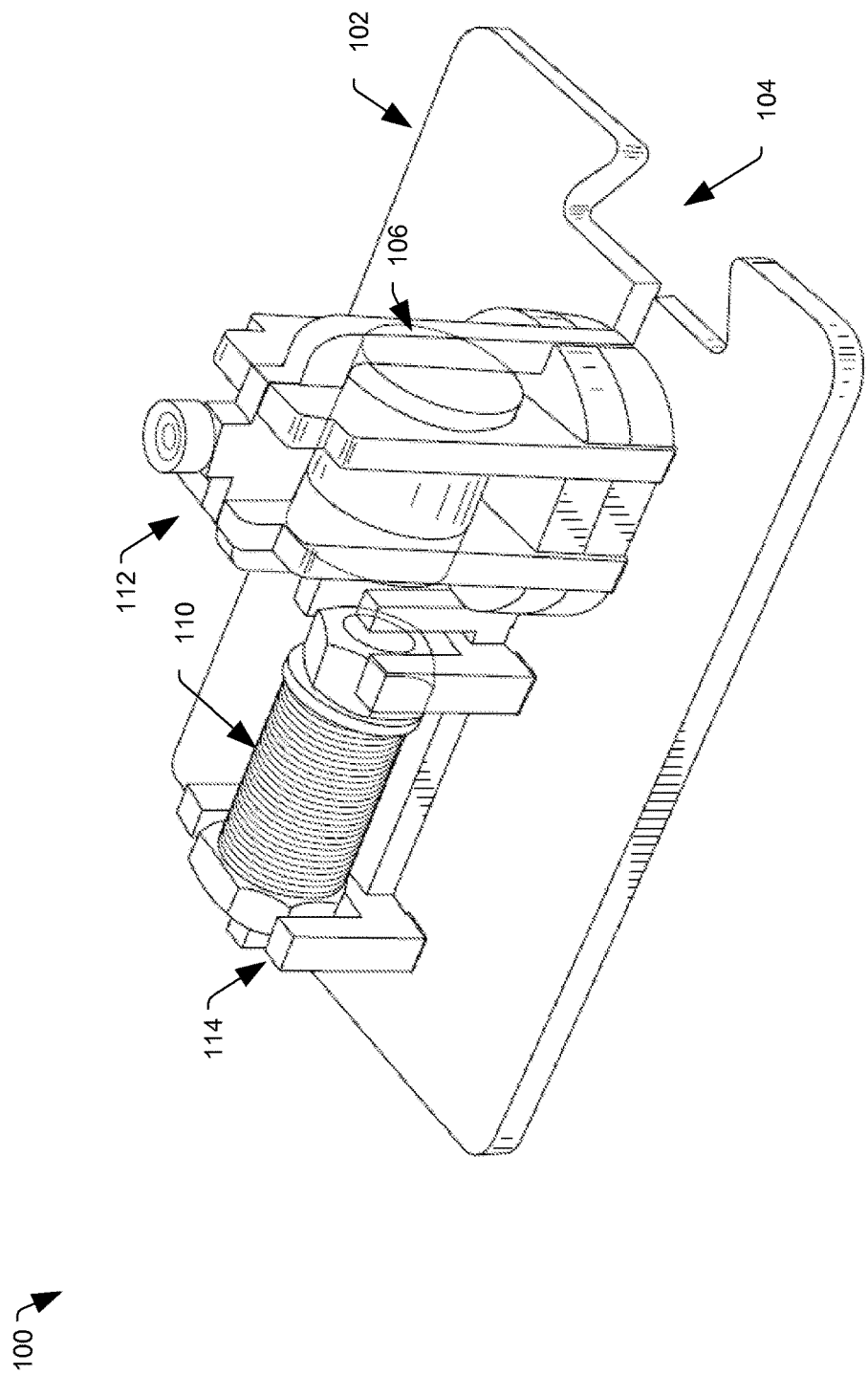
FIG. 1 is a side view of an example of an electromagnetic motor constructed by a user from a motor assembly kit.

A construction kit may encourage understanding of electric motor concepts by enabling children to construct and study motor performance. In the example illustrated in FIG. 1, an illustrative construction kit 100 includes a base structure 102. The base structure 102 includes cutouts or contours 104 configured to align in a fixed relationship with a contour of another base structure (not shown in FIG. 1, see e.g., FIG. FIG. 17). A magnet 106 rotates around a pivot (e.g., a bearing 202 that is obscured from view in the perspective view of FIG. 1 but that is shown in the side view of FIG. 2).

A coil 110 may be driven by a stereo amplifier (not shown). A magnet support 112 includes sections that snap together to allow the magnet 106 to rotate around the pivot 108. The magnet support 112 additionally snaps into the base structure 102. Similarly, the coil 110 is snapped into a coil support 114 that snaps or otherwise attaches to the base structure 102. In some cases, the coil 110 may be a single coil (e.g., comprising copper) that may be wound by a user or that may be pre-wound for the user. Current flowing through the coil 110 may be manipulated such that the magnet 106 is induced to rotate on the pivot. In this manner, a user constructs a basic motor without tools, e.g., by snapping components together.

A completed motor assembly includes a rotor and a stator. The rotor includes a portion of the motor assembly that rotates (e.g., the magnet 106 and the bearing 202). The stator includes the portion of the motor assembly that remains stationary (e.g., the coil 110 and the coil support 114).

Figure 2:
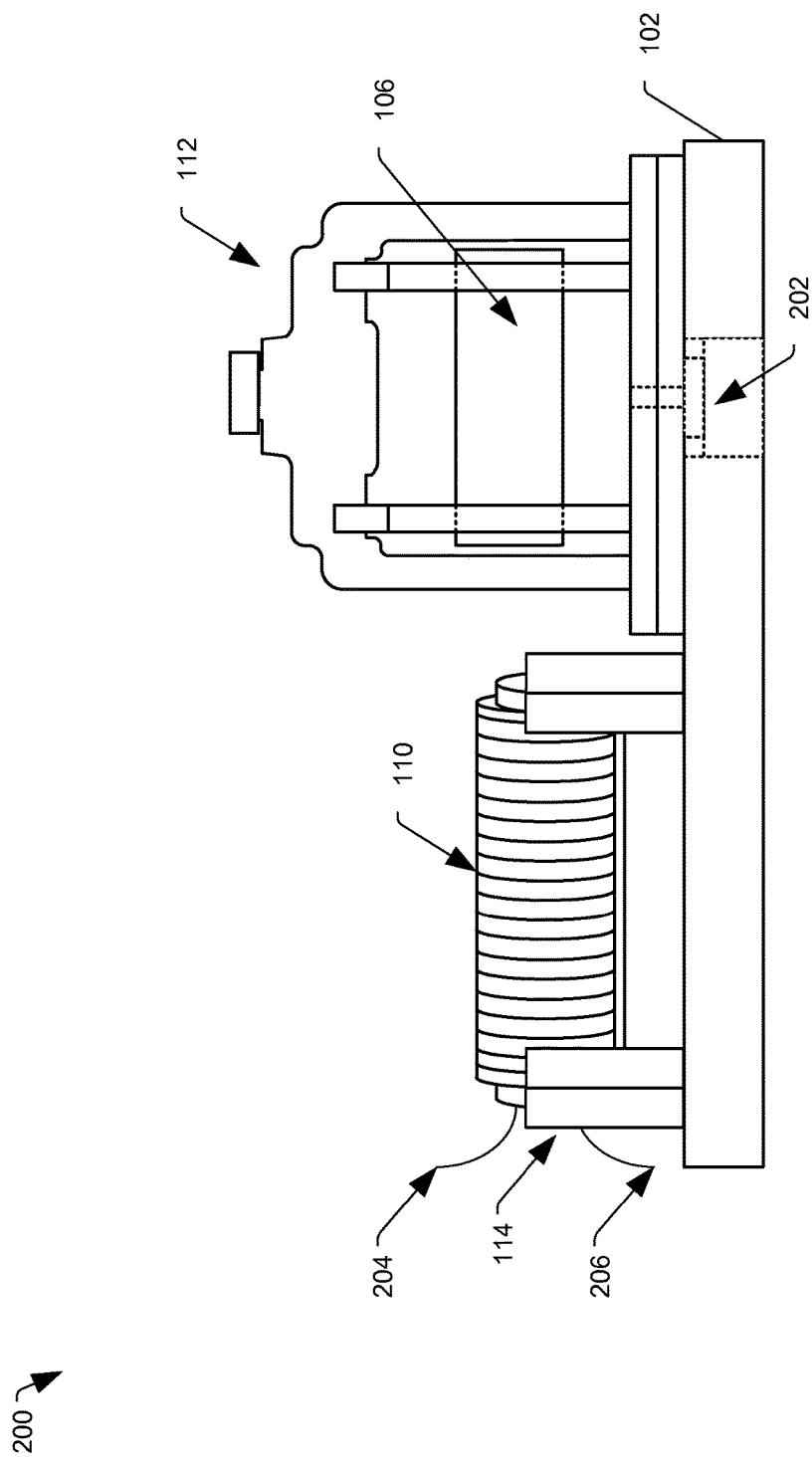
FIG. 2 is a side view of an example of an electromagnetic motor constructed by a user from a motor assembly kit.

FIG. 2 is a side view 200 of an example of an electromagnetic motor constructed by a user from components of a motor assembly kit. FIG. 2 illustrates that a bearing 202 may be inserted into a central hole of the base structure 102 (e.g., adjacent to the cutout 104 illustrated in FIG. 1). The bearing 202 may include a shaft (see FIG. 12B for a more detailed view of the bearing 202) in order to allow the magnet support 112 to be rotatably attached to the base structure 102.

While not shown in FIG. 1, FIG. 2 illustrates that the coil 110 may include a first wire 204 and a second wire 206 for connection with a power source (not shown) to provide direct current (DC) or alternating current (AC) to the coil 110, resulting in an electromagnetic motor. FIG. 2 further illustrates that the coil 110 may be positioned within the coil cradle 114 such that the two wires 204, 206 are positioned away from the rotor (e.g., the magnet 106, the magnet support 112, and the bearing 202) in order to allow the magnet 106 to rotate with respect to the base structure 102.

Figure 3:
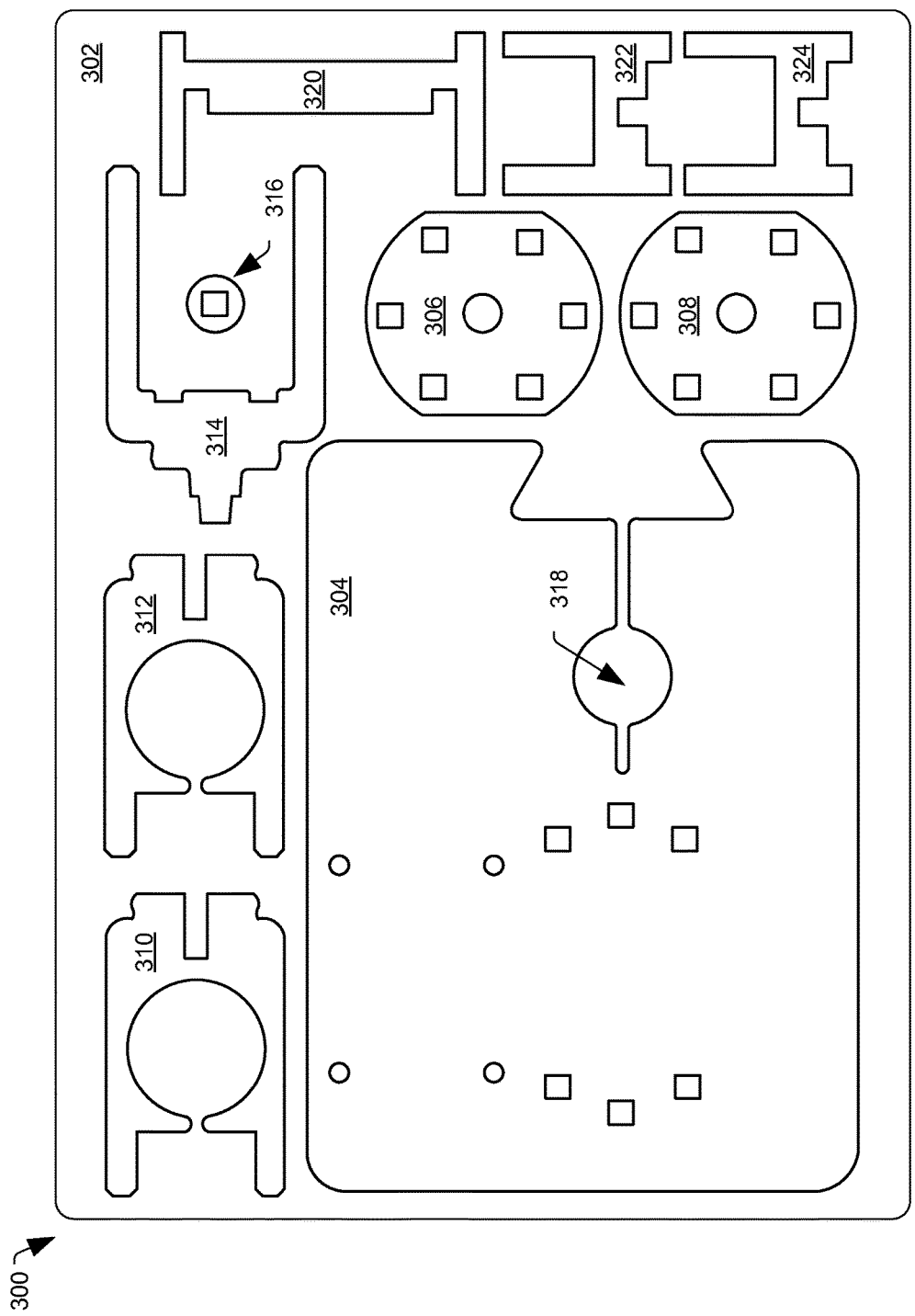
FIG. 3 is a top view of an example of a flat assembly having components to use in constructing the electromagnetic motor of FIG. 1.

FIG. 3 is a top view 300 of an example of a flat assembly 302 having components for use in constructing the electromagnetic motor that is illustrated in FIGS. 1 and 2.

The flat assembly 302 includes component parts that can be punched out or otherwise separated by hand. For example, a base structure 304 may be separated from the flat assembly 302 to form the base structure 102 illustrated in FIGS. 1 and 2, component parts may be separated from the flat assembly 302 to form the magnet support 112 illustrated in FIGS. 1 and 2, and component parts may be separated from the flat assembly 302 to form the coil support 114 illustrated in FIGS. 1 and 2. In some cases, the flat assembly 302 may include material that fills the holes and that may be punched out or otherwise separated by hand. Alternatively, the hole material may be pre-removed such that the holes illustrated in the flat assembly 302 may already be present when the user begins the motor assembly process.

In the example illustrated in FIG. 3, the flat assembly 302 includes a first rotor plate 306, a second rotor plate 308, a first magnet bracket 310, a second magnet bracket 312, a rotor clip 314, and a disk 316. As further described with respect to FIGS. 4-11B, the magnet support 112 illustrated in FIGS. 1 and 2 may be constructed by assembling the rotor plates 306, 308, inserting the magnet 106 (not shown in FIG. 3) into holes of the magnet brackets 310, 312, securing the magnet 106 with the rotor clip 314, and attaching the disk 316 for a user to grasp for rotation. One side of the bearing 202 (not shown in FIG. 3) may be inserted into a central hole 318 of the base structure 304, while another side of the bearing 202 may be inserted into central holes of the assembled rotor plates 306, 308 (see FIG. 13A).

In the example illustrated in FIG. 3, the flat assembly 302 further includes a first coil cradle support 320, a second coil cradle support 322, and a third coil cradle support 324. As further described with respect to FIGS. 14A-15B, the coil support 114 of FIGS. 1 and 2 may be constructed by inserting the coil cradle supports 320-324 into the corresponding holes of the base structure 304. Upon assembly of the coil support 114 using the coil cradle supports 320-324, the coil 110 illustrated in FIGS. 1 and 2 may be positioned adjacent to the magnet 106 above the base structure 304.

Thus, FIG. 3 illustrates one example of a flat assembly of a motor assembly kit that includes components that may be punched out or otherwise separated by hand and used to construct a motor without tools. That is, the flat assembly 302 of FIG. 3 may provide a platform that allows a user (e.g., a child) to construct a rotor and a stator without tools.

Figure 4:
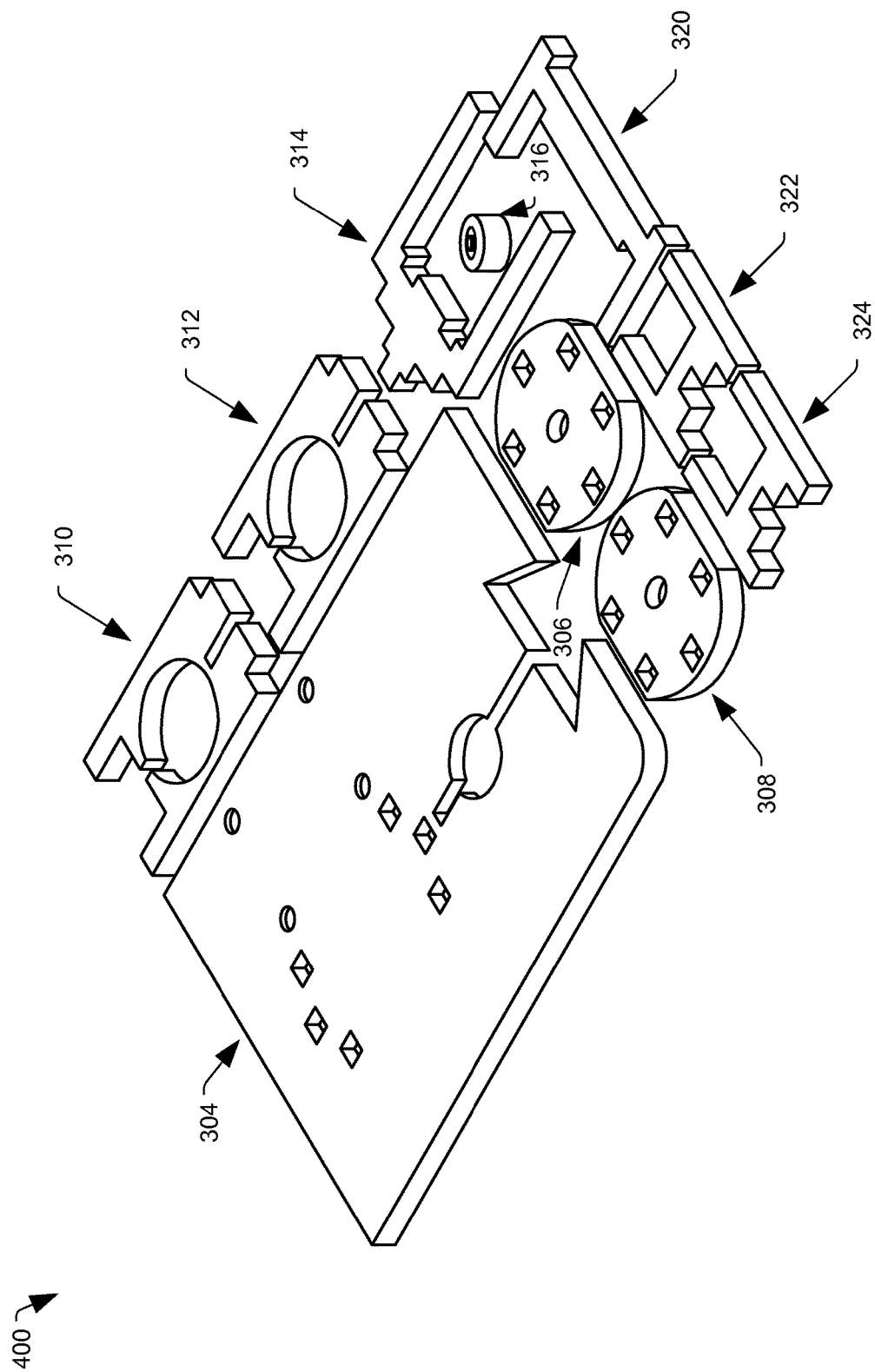
FIG. 4 is a perspective view of various components removed from the flat assembly of FIG. 3 for use in constructing the electromagnetic motor of FIG. 1.

FIG. 4 is a perspective view 400 of various components removed from the flat assembly 302 of FIG. 3 for use in constructing the motor assembly of FIGS. 1 and 2.

For example, in some cases, the flat assembly 302 may be formed from a plastic material (e.g., an acrylate polymer). As an illustrative, non-limiting example, the flat assembly 302 may be clear acrylic plastic material, such as polymethyl methacrylate (PMMA), among other alternatives. In a particular example, a nominal thickness of the flat assembly 302 may be within a range of between about 0.1 inches to about 0.5 inches, such as within a range of between about 0.125 inches and about 0.3 inches, or within a range of between about 0.15 inches and about 0.25 inches.

FIG. 4 illustrates various components that have been removed from the flat assembly 302 of FIG. 3. For example, the perspective view 400 of FIG. 4 illustrates the base structure 304, the rotor plates 306, 308, the magnet supports 310, 312, the rotor clip 314, the disk 316, and the coil cradle supports 320-324. The perspective view 400 of FIG. 4 further illustrates that the holes in various components may result from removal of material from the flat assembly 302. Alternatively, the flat assembly 302 may have the material associated with the various holes removed prior to packaging in the motor assembly kit.

Figure 5:
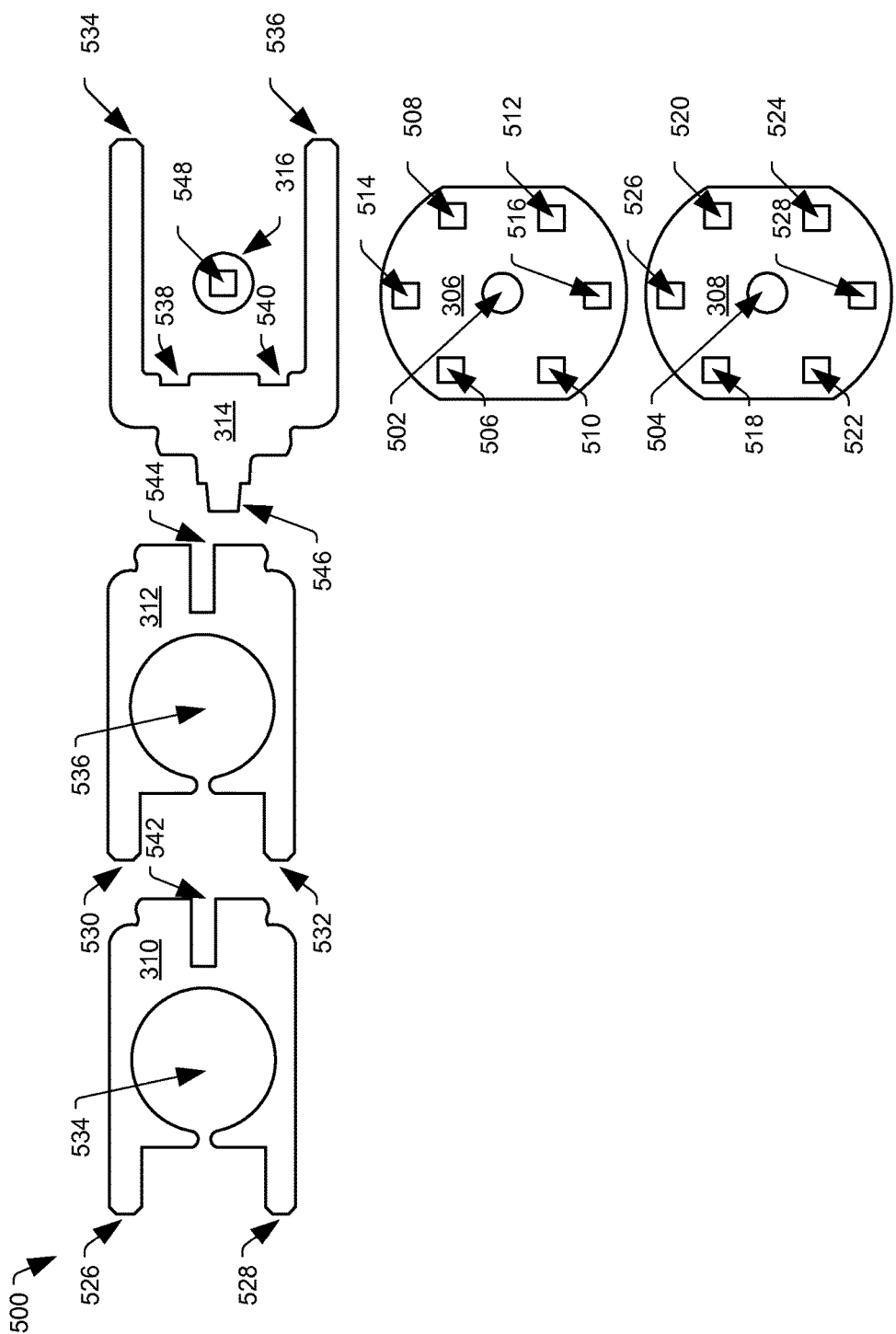
FIG. 5 is a top view of various components removed from the flat assembly of FIG. 3 for use in constructing the magnet support of FIG. 1.

FIG. 5 is a top view 500 of various components that have been removed from the flat assembly 302 of FIG. 3 to be used for assembling the magnet support 112 illustrated in FIGS. 1 and 2.

FIG. 5 illustrates that the first rotor plate 306 includes a central hole 502 for receiving a shaft of the bearing 202 (not shown in FIG. 5, see FIG. 2), holes for receiving the magnet brackets 310, 312, and holes for receiving the rotor clip 314. Similarly, the second rotor plate 308 includes a central hole 504 for receiving the shaft of the bearing 202 (not shown in FIG. 5, see FIG. 2), holes for receiving the magnet brackets 310, 312, and holes for receiving the rotor clip 314. In the example illustrated in FIG. 5, the first rotor plate 306 includes a first set of holes 506, 508 for receiving one of the magnet brackets 310, 312, a second set of holes 510, 512 for receiving another one of the magnet brackets 310, 312, and a third set of holes 514, 516 for receiving the rotor clip 314. Similarly, in the example illustrated in FIG. 3, the second rotor plate 308 includes a first set of holes 518, 520 for receiving one of the magnet brackets 310, 312, a second set of holes 522, 524 for receiving another one of the magnet brackets 310, 312, and a third set of holes 526, 528 for receiving the rotor clip 314. It will be appreciated that the example illustrated in FIG. 5 is for illustrative purposes only and that the rotor plates 306, 308 may include an alternative number of holes and/or an alternative arrangement of holes.

As described further below with respect to FIGS. 7A and 7B, the first rotor plate 306 and the second rotor plate 308 may be stacked atop one another such that the central holes 502, 504 for receiving the shaft of the bearing 202 and the holes for receiving the magnet brackets 310, 312 and the rotor clip 314 are substantially aligned. To illustrate, either the first rotor plate 306 may be stacked atop the second rotor plate 308 or the second rotor plate 308 may be stacked atop the first rotor plate 306. In either case, stacking the rotor plates 306, 308 atop one another may result in the first set of holes 506, 508 of the first rotor plate 306 being substantially aligned with the first set of holes 518, 520 of the second rotor plate 308. Further, stacking the rotor plates 306, 308 atop one another may result in the second set of holes 510, 512 of the first rotor plate 306 being substantially aligned with the second set of holes 522, 524 of the second rotor plate 308. Still further, stacking the rotor plates 306, 308 atop one another may result in the third set of holes 514, 516 of the first rotor plate 306 being substantially aligned with the third set of holes 526, 528 of the second rotor plate 308.

As an illustrative non-limiting example, the first rotor plate 306 may be stacked atop the second rotor plate 308. In this case, the central hole 502 of the first rotor plate 306 may be disposed above and substantially aligned with the central hole 504 of the second rotor plate 308. Further, in this case, the first set of holes 506, 508 of the first rotor plate 306 may be disposed above and substantially aligned with the first set of holes 518, 520 of the second rotor plate 308. Still further, in this case, the second set of holes 510, 512 of the first rotor plate 306 may be disposed above and substantially aligned with the second set of holes 522, 524 of the second rotor plate 308.

As described further below with respect to FIGS. 8A and 8B, the substantial alignment of the first set of holes 506, 508 of the first rotor plate 306 with the first set of holes 518, 520 of the second rotor plate 308 may allow the first magnet bracket 310 and the second magnet bracket 312 to be inserted. For example, FIG. 5 illustrates that the first magnet bracket 310 may include a set of legs 526, 528, and the second magnet bracket 312 may also include a set of legs 530, 532. As an illustrative, non-limiting example, the set of legs 526, 528 of the first magnet bracket 310 may be inserted into the first set of holes 506, 508 of the first rotor plate 306 and may extend into the first set of holes 518, 520 of the second rotor plate 308. In this case, the set of legs 530, 532 of the second magnet bracket 312 may be inserted into the second set of holes 510, 512 of the first rotor plate 306 and may extend into the second set of holes 522, 524 of the second rotor plate 308. Alternatively, the set of legs 526, 528 of the first magnet bracket 310 may be inserted into the second set of holes 510, 512 of the first rotor plate 306 and may extend into the second set of holes 522, 524 of the second rotor plate 308. In this case, the set of legs 530, 532 of the second magnet bracket 312 may be inserted into the first set of holes 506, 508 of the first rotor plate 306 and may extend into the first set of holes 518, 520 of the second rotor plate 308.

In either case, insertion of the legs 526, 528 of the first magnet bracket 310 and the legs 530, 532 of the second magnet bracket 312 into the holes of the rotor plates 306, 308 may result in substantial alignment of a hole 534 of the first magnet bracket 310 with a hole 536 of the second magnet bracket 312. As described further below with respect to FIGS. 9A and 9B, the magnet 106 may be inserted through the substantially aligned holes 534, 536 such that a first pole of the magnet 106 and a second pole of the magnet 106 are substantially aligned along an axis that is substantially parallel to a surface of the stacked rotor plates 306, 308 (and substantially parallel to a surface of the base structure 304).

As described further below with respect to FIGS. 10A and 10B, the rotor clip 314 may be used to secure the magnet 106 above the surface of the stacked rotor plates 306, 308 after the magnet 106 has been inserted into the holes 534, 536 of the magnet brackets 310, 312. In the illustrative example illustrated in FIG. 5, the rotor clip 314 includes a set of legs 534, 536 that may be inserted into the third set of holes 514, 516 of the first rotor plate 306 and may extend into the third set of holes 526, 528 of the second rotor plate 308. FIG. 5 further illustrates that the rotor clip 314 may further include a set of grooves 538, 540 that may substantially align with grooves 542, 544 of the magnet brackets 310, 312. In some cases, a user may align the set of legs 534, 536 with the third set of holes 514, 516 by grasping a tip 546 of the rotor clip 314 and may insert the legs 534, 536 into the third set of holes 514, 516 until the grooves 538, 540 of the rotor clip 314 contact the grooves 542, 544 of the magnet brackets 310, 312.

As described further below with respect to FIGS. 11A and 11B, the disk 316 may include a hole 548 that may be aligned with the tip 546 of the rotor clip 314. In some examples, the hole 548 may be substantially square or substantially rectangular in shape in order to allow for secure contact with the tip 546, while an outer surface of the disk 316 may be substantially circular in shape. The substantially circular shape may allow the user to impart rotational motion by grasping and rotating the disk 316.

FIG. 6 is a top view 600 of various components that have been removed from the flat assembly 302 of FIG. 3 to be used for assembling the coil support 114 illustrated in FIGS. 1 and 2.

FIG. 6 illustrates that the base structure 304 includes a first set of holes 602, 604 for receiving the first coil cradle support 320, a second set of holes 606, 608 for receiving one of the second coil cradle support 322 or the third coil cradle support 324, and a third set of holes 610, 612 for receiving the other one of the second coil cradle support 322 or the third coil cradle support 324. It will be appreciated that the example illustrated in FIG. 6 is for illustrative purposes only and that the base structure 304 may include an alternative number of holes and/or an alternative arrangement of holes.

As described further below with respect to FIGS. 14A-15B, the coil cradle supports 320-324 may be used to form the coil cradle 114 for the coil 110. In the illustrative example of FIG. 6, the first coil cradle support 320 includes a set of legs 614, 616 that may be inserted into the first set of holes 602, 604 of the base structure 304. The second coil cradle support 322 includes a set of legs 618, 620 that may be inserted into one of the second set of holes 606, 608 or the third set of holes 610, 612. The third coil cradle support 324 includes a set of legs 622, 624 that may be inserted into the other one of the second set of holes 606, 608 or the third set of holes 610, 612.

Upon insertion into the base structure 304, a set of grooves 626, 628 of the first coil cradle support 320 may be disposed above a surface of the base structure 304. The grooves 626, 628 may be positioned above the base structure 304 to substantially align with a groove 630 of the second coil cradle support 322 and with a groove 632 of the third coil cradle support 324. As an illustrative, non-limiting example, the groove 630 of the second coil cradle support 322 may be substantially aligned with the groove 626 of the first coil cradle support 320 when the set of legs 618, 620 of the second coil cradle support 322 is inserted into the second set of holes 606, 608 of the base structure 304. In this example, the groove 633 of the third coil cradle support 324 may be substantially aligned with the groove 628 of the first coil cradle support 320 when the set of legs 622, 624 of the third coil cradle support 324 is inserted into the third set of holes 610, 612 of the base structure 304.

Figure 7A:
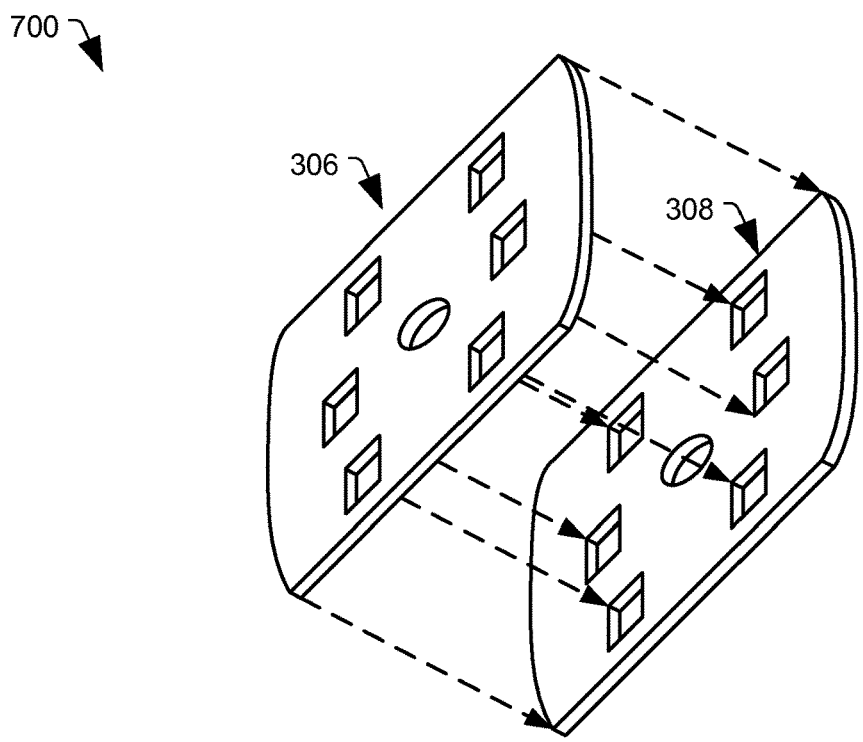
FIG. 7A is a first perspective view of two rotor plates that are removed from the flat assembly of FIG. 3 and aligned atop one another.

FIG. 7A is a first perspective view 700 of the two rotor plates 306, 308 that are removed from the flat assembly 302 of FIG. 3 and aligned atop one another. FIG. 7B is a second perspective view 702 of the two rotor plates 306, 308 of FIG. 7A after being stacked atop one another. While FIGS. 7A and 7B illustrate one example in which the first rotor plate 306 is stacked atop the second rotor plate 308, alternatively the second rotor plate 308 may be stacked atop the first rotor plate 306.

FIG. 7A illustrates that the central hole 502 of the first rotor plate 306 may be disposed above and substantially aligned with the central hole 504 of the second rotor plate 308. Further, in this case, the first set of holes 506, 508 of the first rotor plate 306 may be disposed above and substantially aligned with the first set of holes 518, 520 of the second rotor plate 308. Still further, in this case, the second set of holes 510, 512 of the first rotor plate 306 may be disposed above and substantially aligned with the second set of holes 522, 524 of the second rotor plate 308.

Figure 7B:
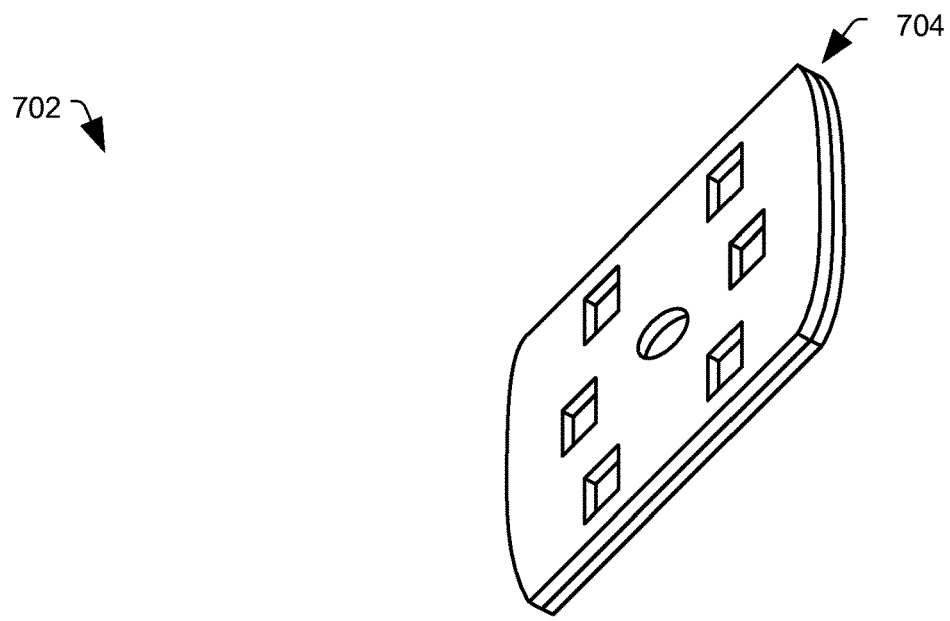
FIG. 7B is a second perspective view of a stacked rotor plate assembly that includes the two rotor plates of FIG. 7A stacked atop one another.

FIG. 7B illustrates that a stacked rotor plate assembly 704 may result from the stacking of the two rotor plates 306, 308 atop one another.

Figure 8A:
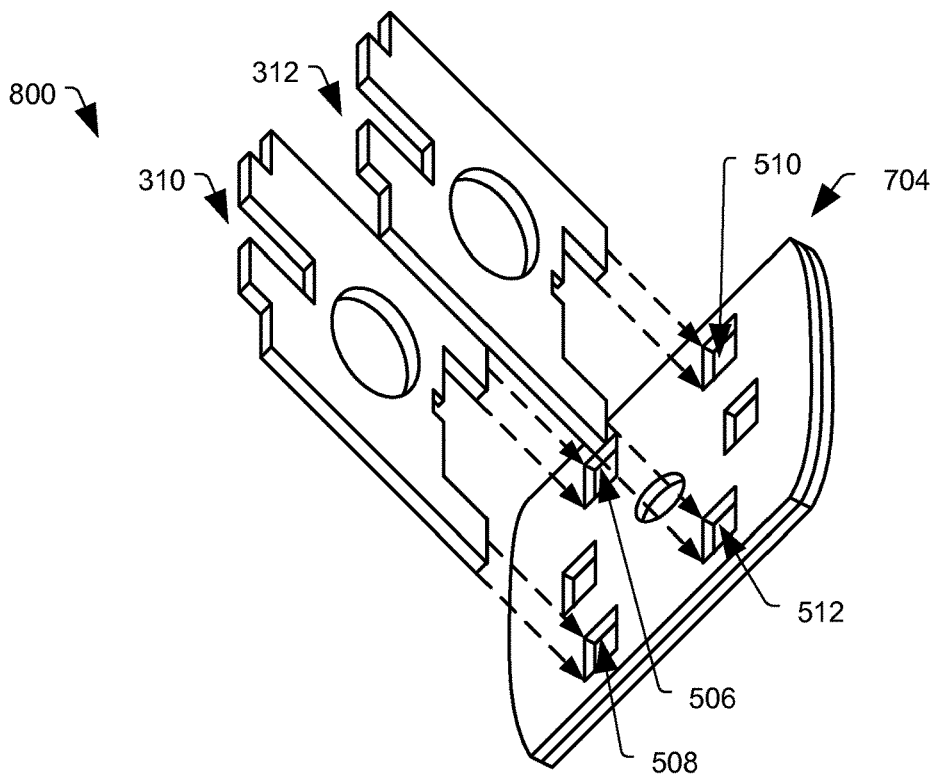
FIG. 8A is a first perspective view of two magnet supports that are removed from the flat assembly of FIG. 3 and aligned for insertion into holes of the stacked rotor plate assembly of FIG. 7B.

FIG. 8A is a first perspective view 800 of the two magnet supports 310, 312 that have been removed from the flat assembly 302 of FIG. 3 and aligned for insertion into holes of the stacked rotor plate assembly 704 of FIG. 7B. FIG. 8B is a second perspective view 802 of the two magnet supports 310, 312 after being inserted into the holes of the stacked rotor plate assembly 704.

FIG. 8A illustrates that the substantial alignment of the first set of holes 506, 508 of the first rotor plate 306 with the first set of holes 518, 520 of the second rotor plate 308 may allow the first magnet bracket 310 and the second magnet bracket 312 to be inserted. FIG. 8A illustrates a particular example in which the set of legs 526, 528 of the first magnet bracket 310 may be inserted into the first set of holes 506, 508 of the first rotor plate 306 of the stacked rotor plate assembly 704. FIG. 8A further illustrates that the set of legs 530, 532 of the second magnet bracket 312 may be inserted into the second set of holes 510, 512 of the first rotor plate 306 of the stacked rotor plate assembly 704.

Figure 8B:
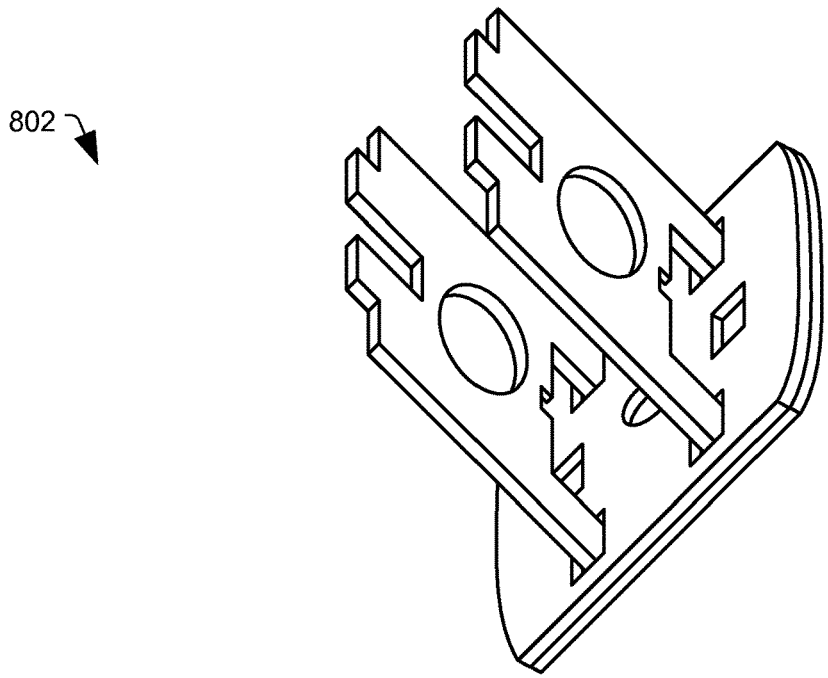
FIG. 8B is a second perspective view of the two magnet supports of FIG. 8A after being inserted into the holes of the stacked rotor plate assembly.

FIG. 8B illustrates that, upon insertion into the stacked rotor plate assembly 704, the set of legs 526, 528 of the first magnet bracket 310 may extend into the first set of holes 518, 520 of the second rotor plate 308. FIG. 8B further illustrates that, upon insertion into the stacked rotor plate assembly 704, the set of legs 530, 532 of the second magnet bracket 312 may extend into the second set of holes 522, 524 of the second rotor plate 308.

Figure 9A:
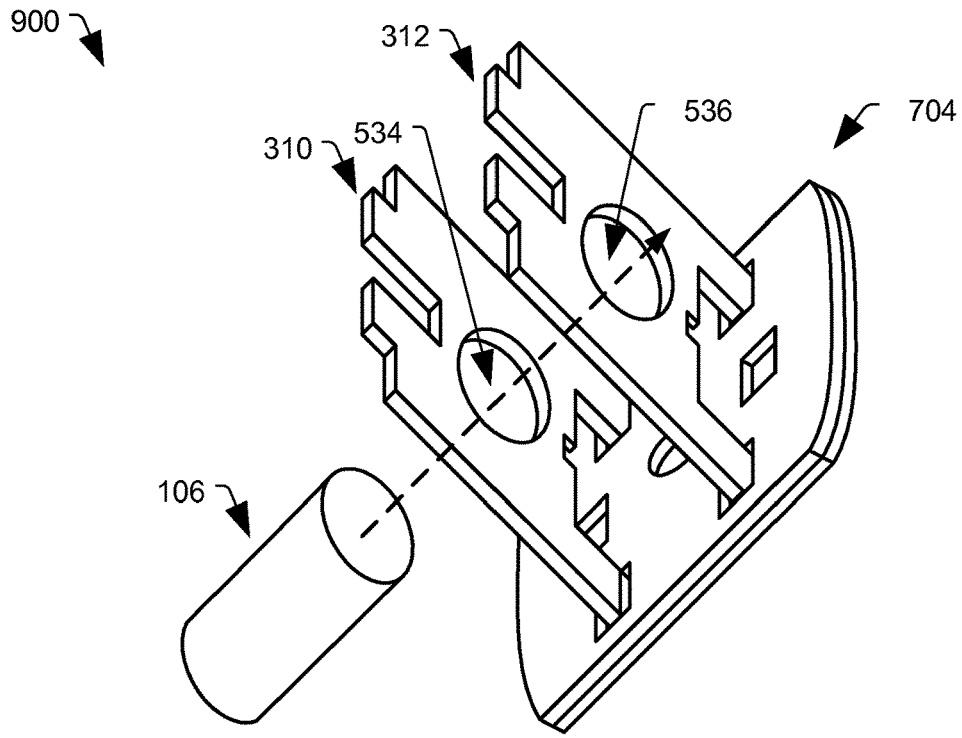
FIG. 9A is a first perspective view of a magnet of the motor assembly kit being positioned for insertion into holes of the magnet supports after the magnet supports have been inserted into the holes of the stacked rotor plate assembly as illustrated in FIG. 8B.
Figure 9B:
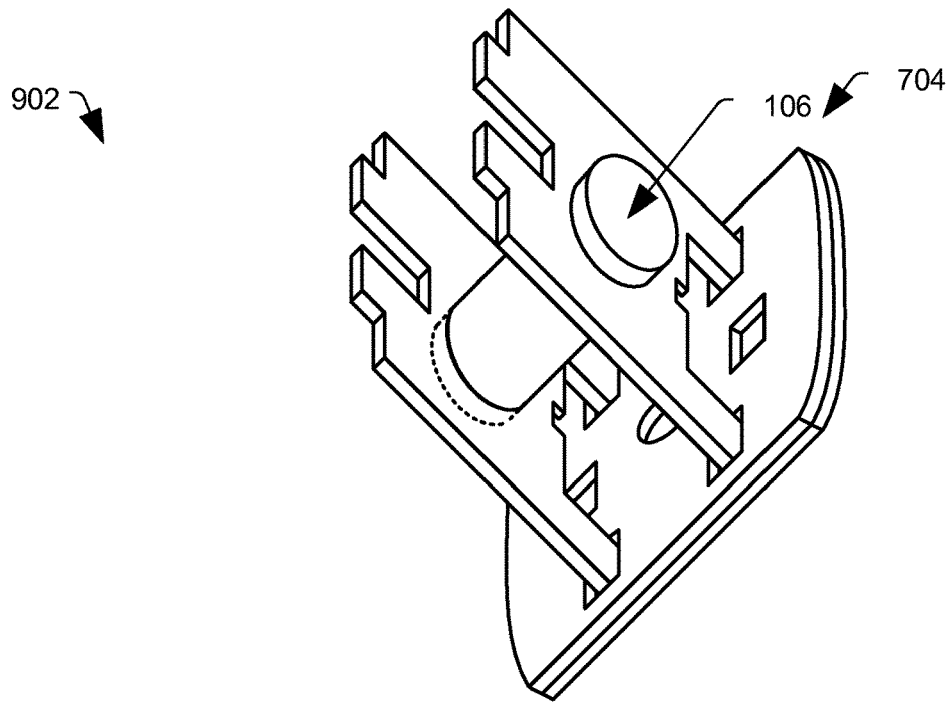
FIG. 9B is a second perspective view showing the magnet having been inserted into the holes of the magnet supports.

FIG. 9A is a first perspective view 900 of the magnet 106 being positioned for insertion into the holes 534, 536 of the magnet supports 310, 312 after the magnet supports 310, 312 have been inserted into the holes of the stacked rotor plate assembly 704 as illustrated in FIG. 8B. FIG. 9B is a second perspective view 902 showing the magnet 106 having been inserted into the holes 534, 536 of the magnet supports 310, 312.

FIG. 9A illustrates that the insertion of the legs 526, 528 of the first magnet bracket 310 and the legs 530, 532 of the second magnet bracket 312 into the holes of the stacked rotor plate assembly 704 may result in substantial alignment of the hole 534 of the first magnet bracket 310 with the hole 536 of the second magnet bracket 312. Accordingly, the magnet 106 may be inserted through the substantially aligned holes 534, 536.

FIG. 9B illustrates that the insertion of the magnet 106 into the holes 534, 536 may result in a first pole of the magnet 106 and a second pole of the magnet 106 being substantially aligned along an axis that is substantially parallel to a surface of the stacked rotor plate assembly 704.

Figure 10A:
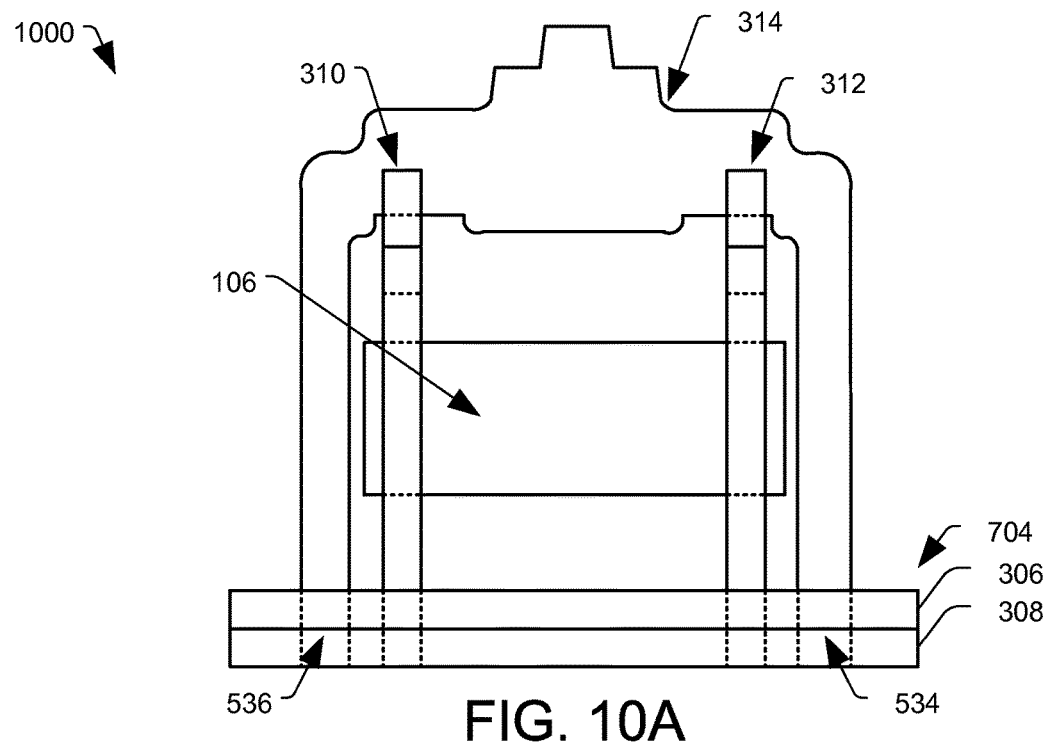
FIG. 10A is a first side view of a magnet assembly after a rotor clip has been inserted into holes of the stacked rotor plate assembly to secure the magnet after the magnet has been inserted into the holes of the magnet supports as illustrated in FIG. 9B.

FIG. 10A is a first side view 1000 of a magnet assembly after the rotor clip 314 has been inserted into holes of the stacked rotor plate assembly 704 to secure the magnet 106 after the magnet 106 has been inserted into the holes 534, 536 of the magnet supports 310, 312 as illustrated in FIG. 9B. FIG. 10B is a second side view 1002 of the magnet assembly after the rotor clip 314 has been inserted into holes of the stacked rotor plate assembly 704 to secure the magnet 106.

Figure 10B:
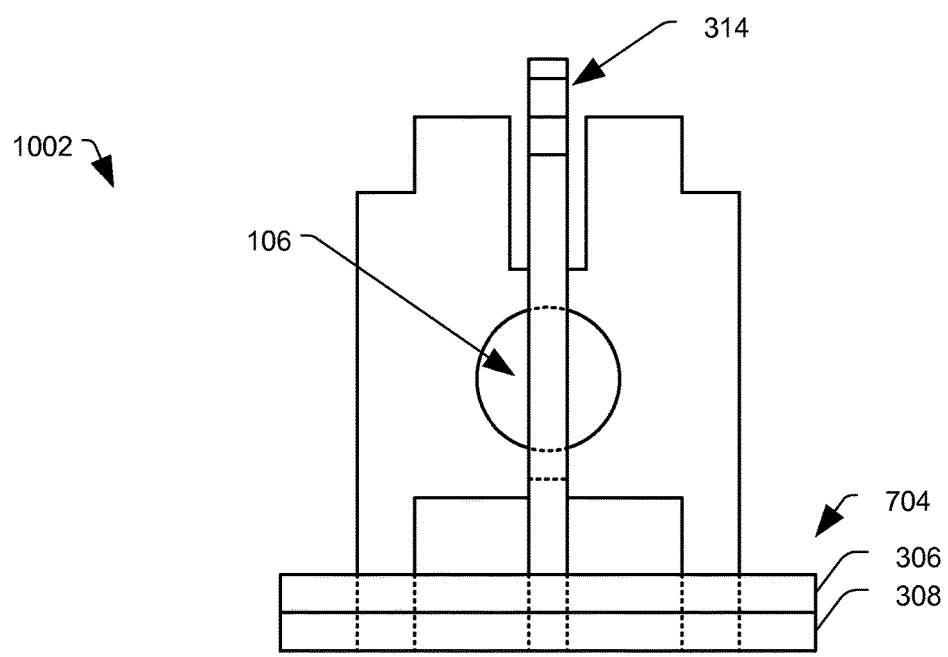
FIG. 10B is a second side view of the magnet assembly after the rotor clip has been inserted into holes of the stacked rotor plate assembly to secure the magnet.

FIGS. 10A and 10B illustrate that the set of legs 534, 536 of the rotor clip 314 may extend into the third set of holes 526, 528 of the second rotor plate 308 of the stacked rotor plate assembly 704. FIGS. 10A and 10B further illustrate that insertion of the set of legs 534, 536 of the rotor clip 314 into may result in contact of the grooves 538, 540 of the rotor clip 314 with the grooves 542, 544 of the magnet brackets 310, 312.

Figure 11A:
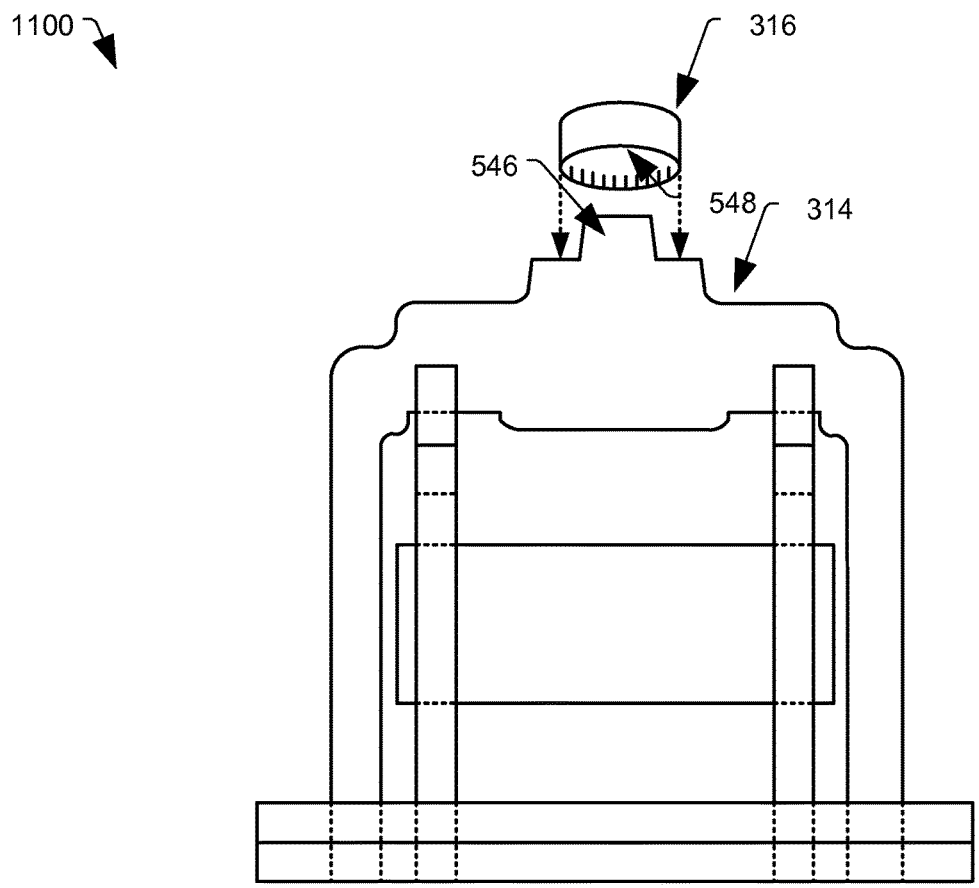
FIG. 11A is a first side view that illustrates a disk being secured to a tip of the rotor clip illustrated in FIGS. 10A and 10B.

FIG. 11A is a first side view 1100 that illustrates the disk 326 being secured to the tip 546 of the rotor clip 314. FIG. 11B is a second side view 1102 showing a more detailed view of the tip 546 of the rotor clip 314 after the disk 316 has been secured to the tip 546 of the rotor clip 314.

FIG. 11A illustrates that the hole 548 of the disk 316 may be aligned with the tip 546 of the rotor clip 314. In some implementations, the hole 548 may be substantially square or substantially rectangular in shape in order to allow for secure contact with the tip 546. FIG. 11A further illustrates a particular example in which the outer surface of the disk 316 is substantially circular in shape, The substantially circular shape may allow the user to impart rotational motion by grasping and rotating the disk 316.

Figure 11B:
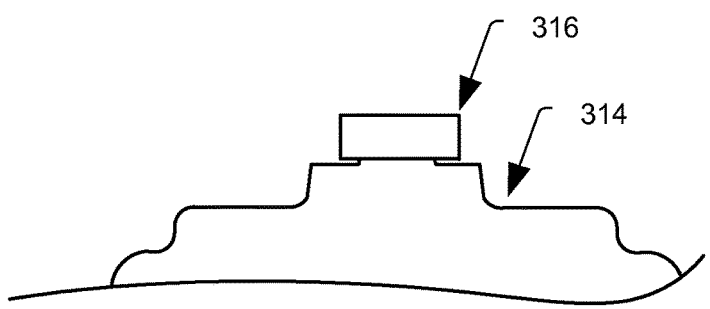
FIG. 11B is a second side view showing a more detailed view of the disk and the tip of the rotor clip after the disk has been secured to the tip of the rotor clip as illustrated in FIG. 11A.
Figure 12A:
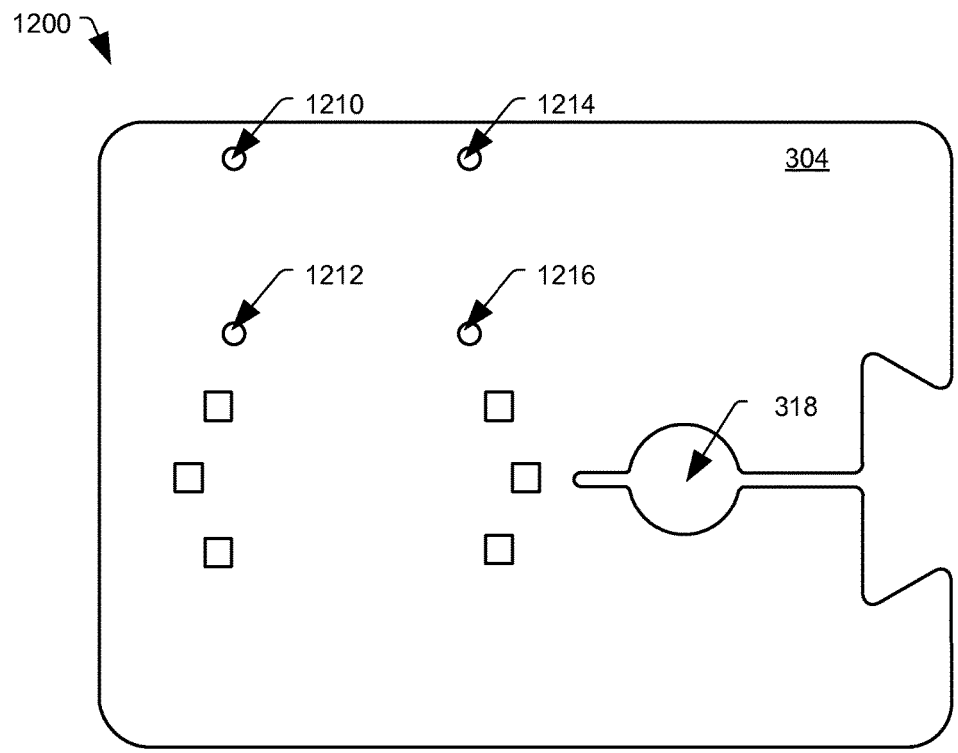
FIG. 12A is a top view of the base structure that is removed from the flat assembly of FIG. 3 and that includes a central hole to receive a bearing to support the magnet assembly illustrated in FIGS. 11A and 11B.
Figure 12B:
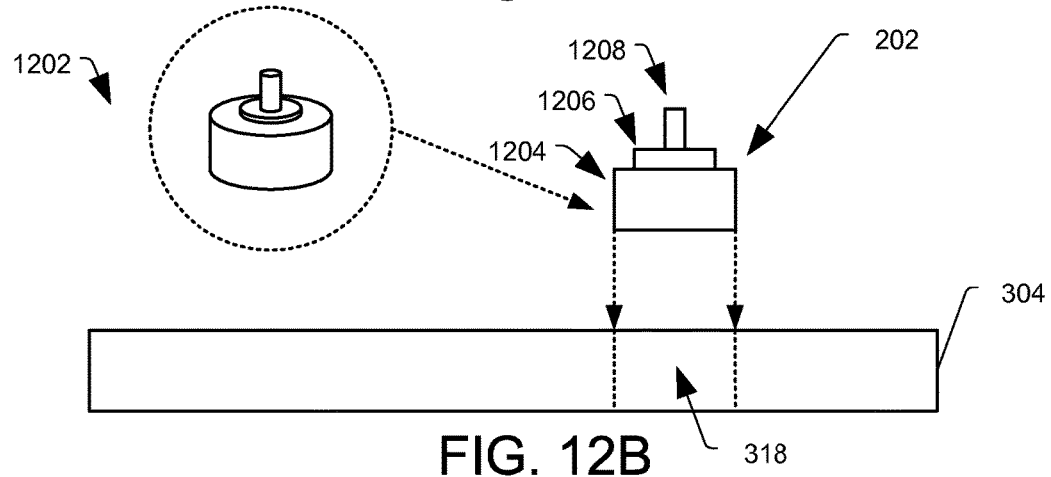
FIG. 12B is a side view showing the insertion of the bearing into the central hole of the base structure illustrated in FIG. 12A.

FIG. 12A is a top view 1200 of the base structure 304 that is removed from the flat assembly 302 of FIG. 3 and that includes the central hole 318 for receiving the bearing 202 to support the magnet assembly illustrated in FIGS. 11A and 11B. FIG. 12B is a side view 1202 showing the insertion of the bearing 202 into the central hole 318 of the base structure 304.

The user may insert the bearing 202 into the central hole 318 of the base structure 304 and press the bearing 202 firmly into place. FIG. 12B illustrates that the bearing 202 may include a base portion 1204 and a rotatable portion 1206 that includes a shaft 1208 to be inserted into the central holes 502, 504 in the stacked rotor plate assembly 704.

Figure 17:
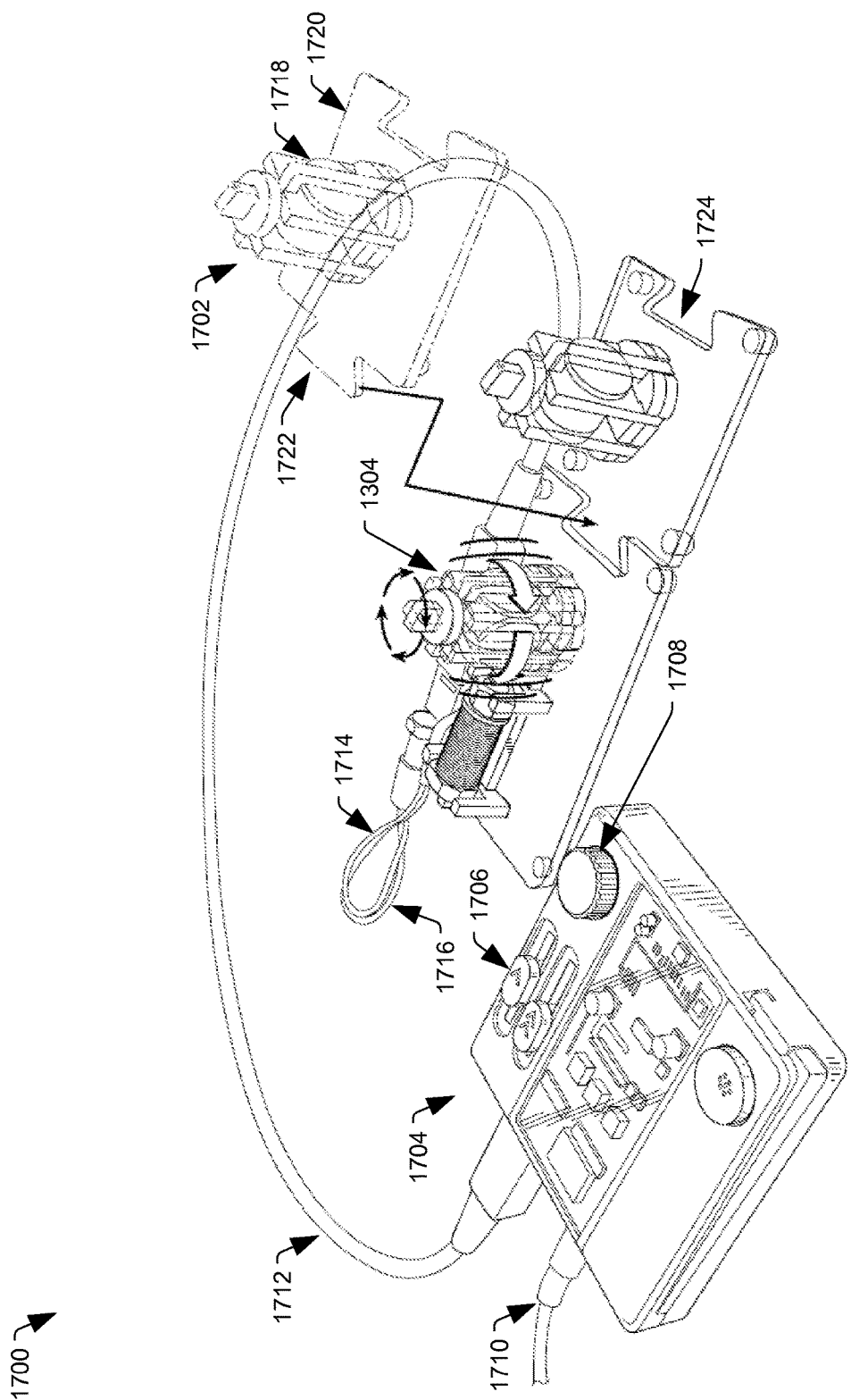
FIG. 17 is a perspective view of another magnet assembly being disposed adjacent to the electromagnetic motor illustrated in FIG. 1.

As described further below with respect to FIG. 17, FIG. 12A illustrates an example in which the base structure 304 may further include multiple holes to receive an electrical coupling from a stereo amplifier to provide power to the coil 110 via the first wire 204 and the second wire 206.

Figure 13A:
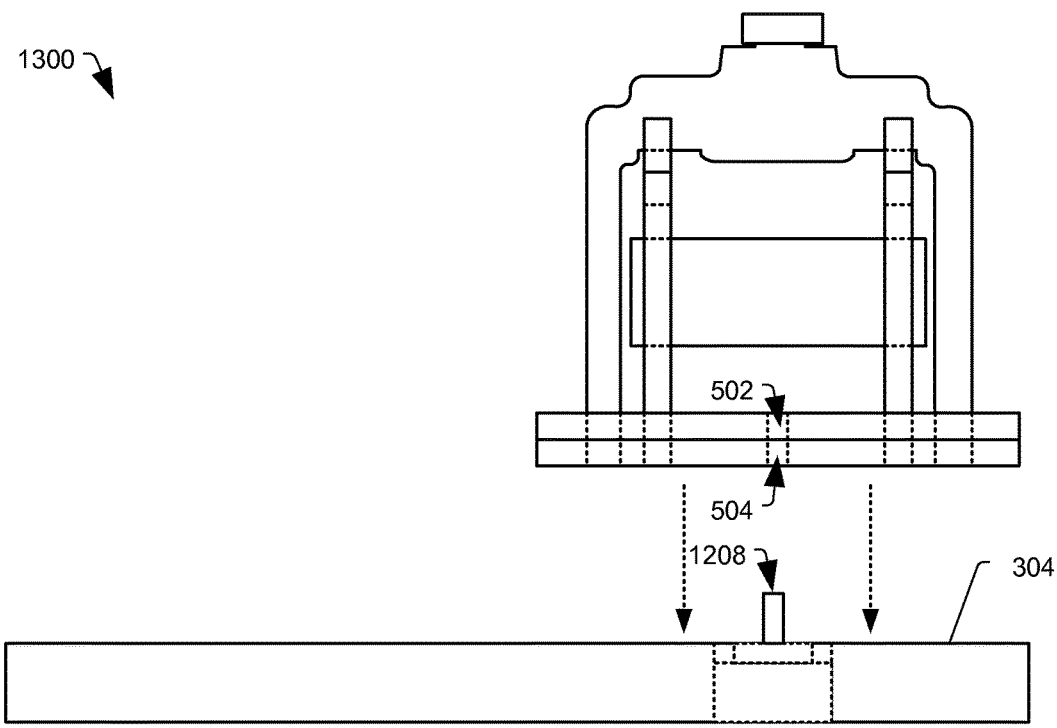
FIG. 13A is a first side view showing holes in the stacked rotor plate assembly being aligned with a shaft of the bearing that has been inserted into the base structure as illustrated in FIG. 12B.
Figure 13B:
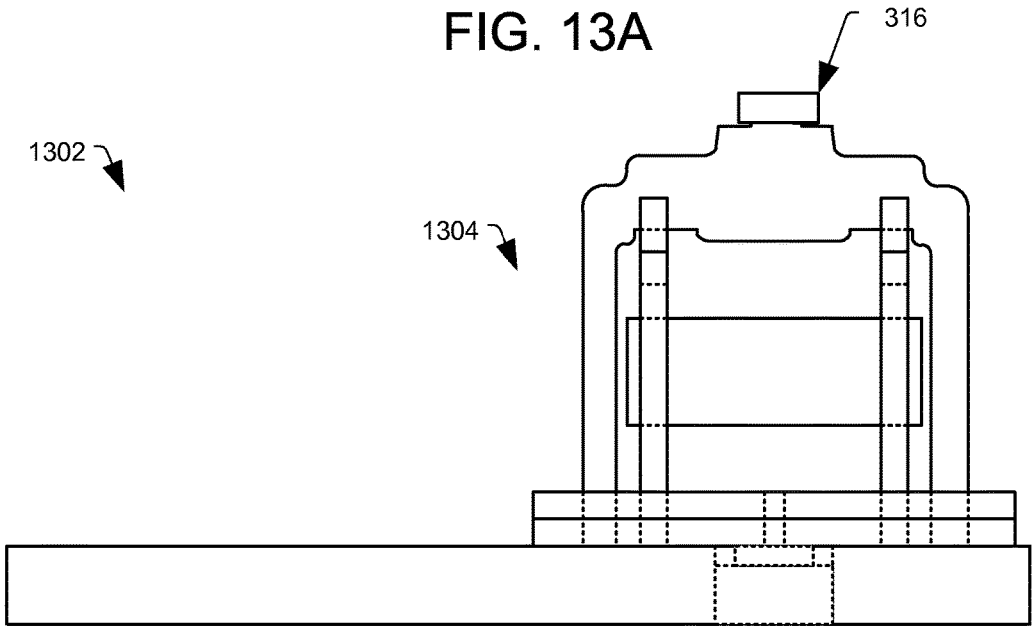
FIG. 13B is a second side view showing the stacked rotor plate assembly being rotatably attached to the base structure via the bearing inserted into the holes of the stacked rotor plate assembly to form a rotor.

FIG. 13A is a first side view 1300 showing the central holes 502, 504 of the stacked rotor plate assembly 704 being aligned with the shaft 1208 of the bearing 202 that has been inserted into the base structure 304 as illustrated in FIG. 12B. FIG. 13B is a second side view 1302 showing the stacked rotor plate assembly 704 being rotatably attached to the base structure 304 via the shaft 1208 of the bearing 202.

The user may position the central holes 502, 504 of the stacked rotor assembly 704 above the shaft 1208 and may press the stacked rotor assembly 704 down such that the shaft 1208 contacts the central holes 502, 504 in order to complete assembly of a rotor 1304 of the motor assembly. The user may grasp the disk 316 in order to spin the rotor 1304 with her hand. In the event that the rotor 1304 does not spin freely or if the rotor 1304 seems loose or off-center, the user may re-position the bearing 202 such that the bearing 202 is seated firmly in the base structure 304.

Figure 14A:
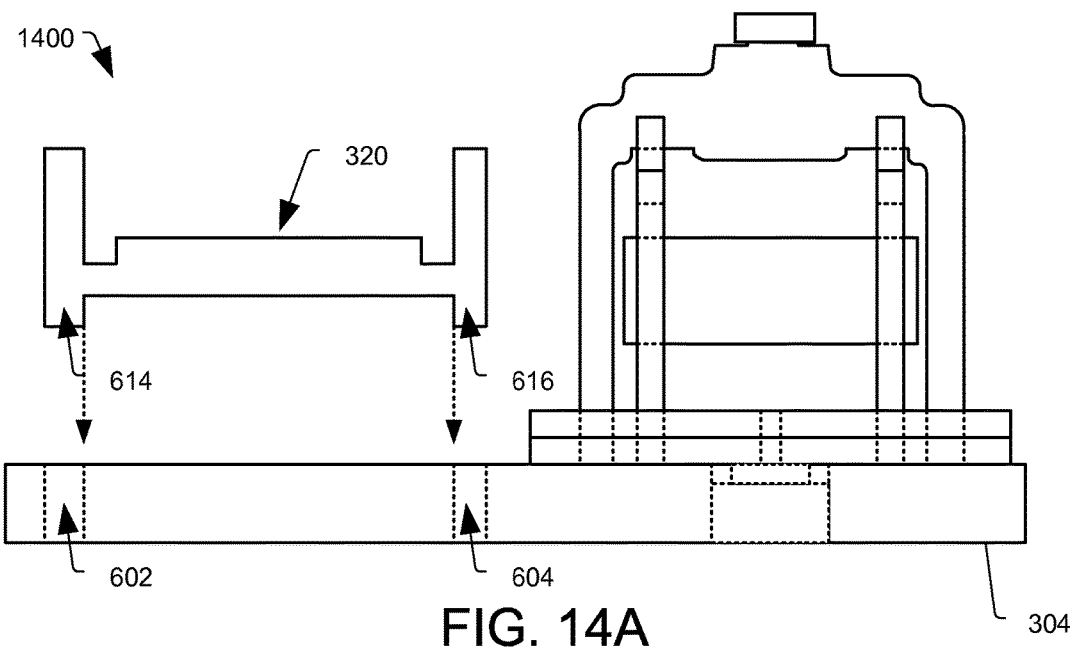
FIG. 14A is a first side view showing a first coil cradle support that is removed from the flat assembly of FIG. 3 and that includes a set of legs aligned for insertion into holes in the base structure.
Figure 14B:
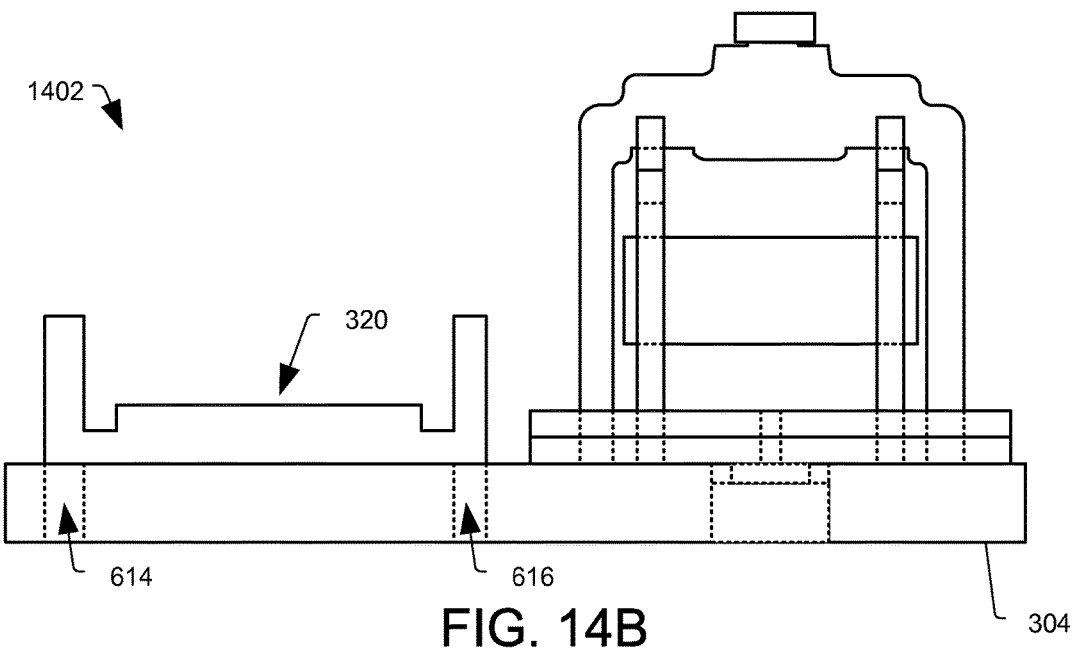
FIG. 14B is a second side view showing the legs of the first coil cradle support inserted into the holes of the base structure.

FIG. 14A is a first side view 1400 showing the first coil cradle support 320 that has been removed from the flat assembly 304 of FIG. 3. The first coil cradle support 320 includes a set of legs 614, 616 (see FIG. 6) that may be aligned for insertion into the first set of holes 602, 604 in the base structure 304. FIG. 14B is a second side view 1402 showing the legs 614, 616 of the first coil cradle support 320 inserted into the first set of holes 602, 604 of the base structure 304.

Figure 15A:
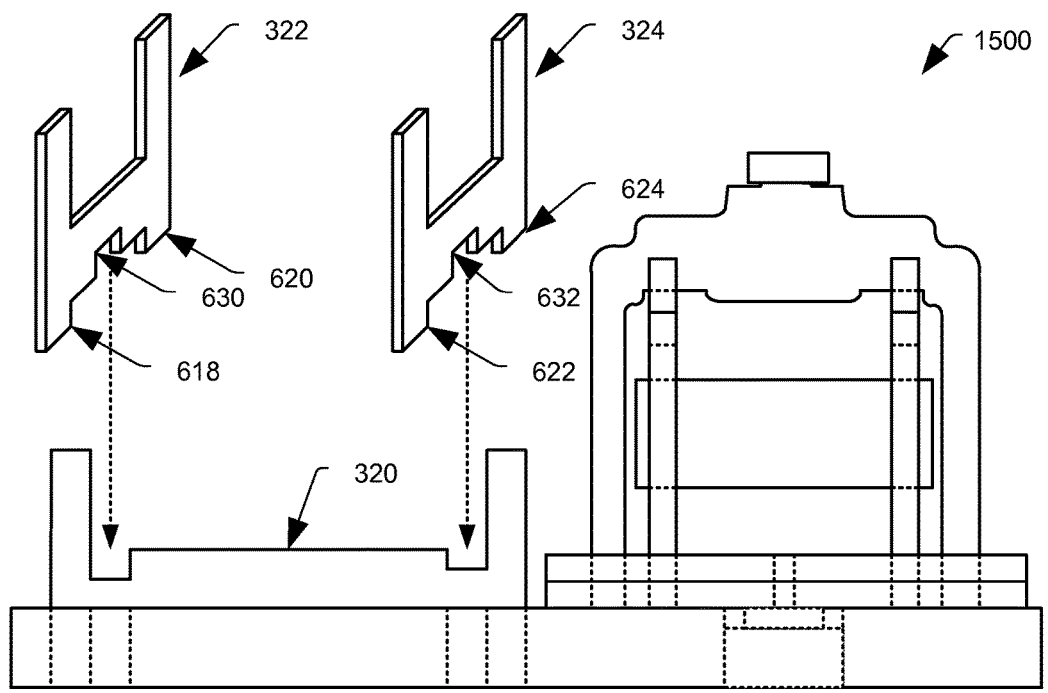
FIG. 15A is a partial perspective view showing a second coil cradle support and a third coil cradle support that include legs that are aligned for insertion into holes of the base structure and that include grooves to be aligned with grooves of the first coil cradle support.

FIG. 15A is a partial perspective view 1500 showing the second coil cradle support 322 and the third coil cradle support 324 that have been removed from the flat assembly 304 of FIG. 3. In FIG. 15A, the second coil cradle support 322 and the third coil cradle support 324 are shown in a perspective view in order to illustrate the set of legs 618, 620 and the groove 630 of the second coil cradle support 322 and the set of legs 622, 624 and the groove 632 of the third coil cradle support 324.

In the illustrative example of FIG. 15A, the set of legs 618, 620 of the second coil cradle support 322 may be positioned above the base structure 304 to align with the second set of holes 606, 608 of the base structure 304 (see FIG. 6). FIG. 15A further illustrates that the set of legs 622, 624 of the third coil cradle support 324 may be positioned above the base structure 304 to align with the third set of holes 610, 612 of the base structure 304 (see FIG. 6). FIG. 15A further illustrates that the positioning of the second coil cradle support 322 may align the groove 630 of the second coil cradle support 322 with the first groove 626 of the first coil cradle support 320 (see FIG. 6). FIG. 15A also illustrates that the positioning of the third coil cradle support 324 may align the groove 632 of the third coil cradle support 324 with the second groove 628 of the first coil cradle support 320 (see FIG. 6).

Figure 15B:
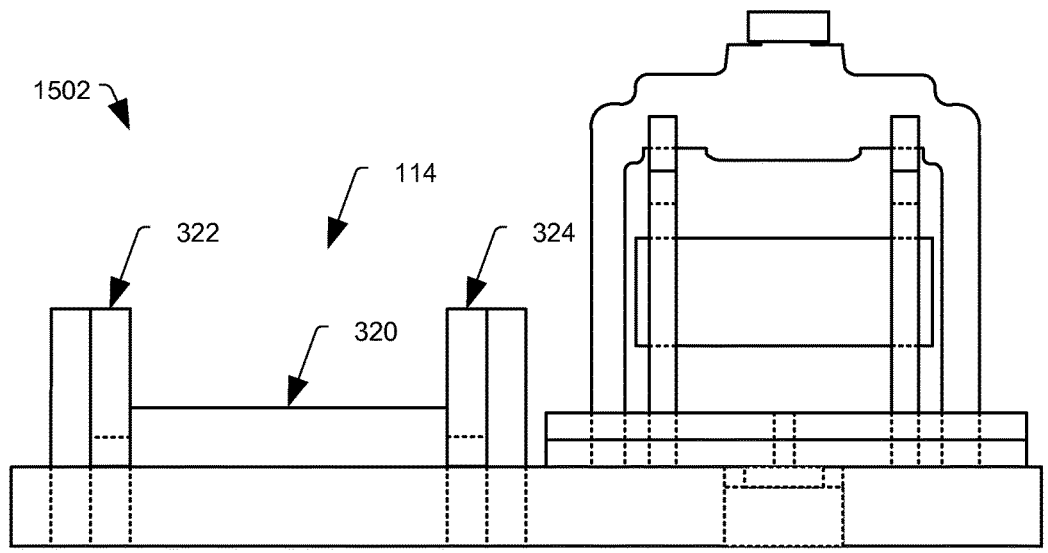
FIG. 15B is a side view that illustrates the additional coil cradle supports shown in FIG. 15A after insertion into the base structure to form a coil cradle.

FIG. 15B is a side view 1502 illustrating the second coil cradle support 322 and the third coil cradle support 324 after insertion into the base structure 304 to complete assembly of the coil support 114. FIG. 15B further illustrates that insertion of the set of legs 618, 620 of the second coil cradle support 322 may result in the groove 630 of the second coil cradle support 322 contacting the first groove 626 of the first coil cradle support 320 (see FIG. 6). Further, FIG. 15B illustrates that the insertion of the set of legs 622, 624 of the third coil cradle support 324 may result in the groove 632 of the third coil cradle support 324 contacting the second groove 628 of the first coil cradle support 320 (see FIG. 6).

Figure 16A:
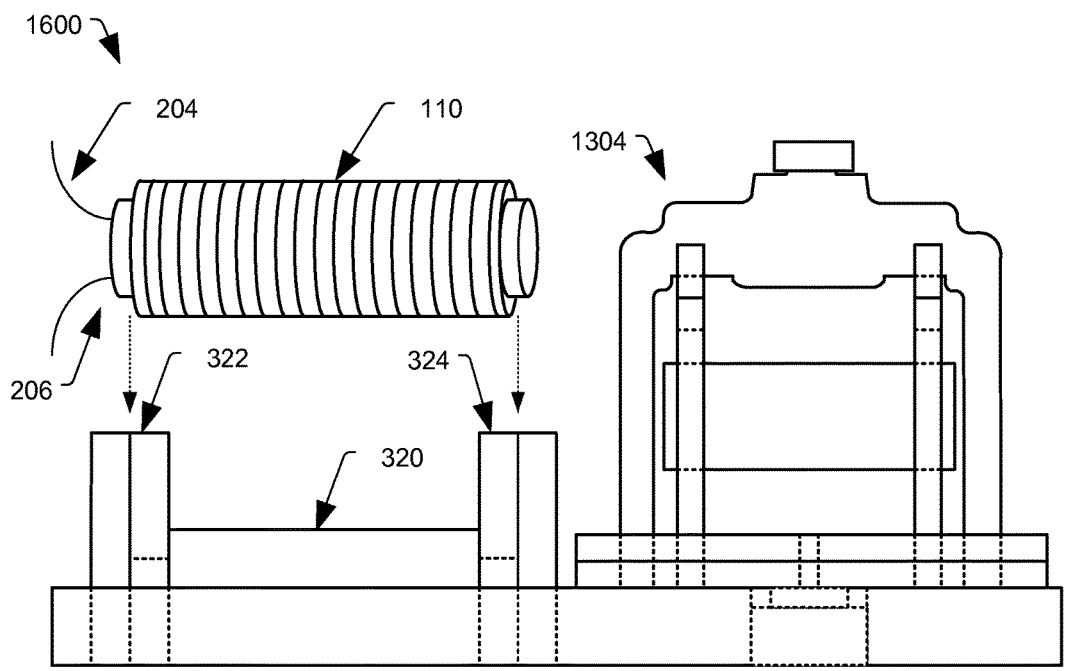
FIG. 16A is a partial perspective view showing a coil of the motor assembly kit being aligned for insertion into the coil cradle.

FIG. 16A is a partial perspective view 1600 showing the coil 110 being aligned with the coil support 114. In the example of FIG. 16A, a first end of the coil 110 is positioned to align with one side of the coil cradle 114 adjacent to the rotor 1304, while a second end of the coil cradle 114 is positioned to align with the other side of the coil cradle 114 such that the first wire 204 and the second wire 206 are positioned away from the rotor 1304.

Figure 16B:
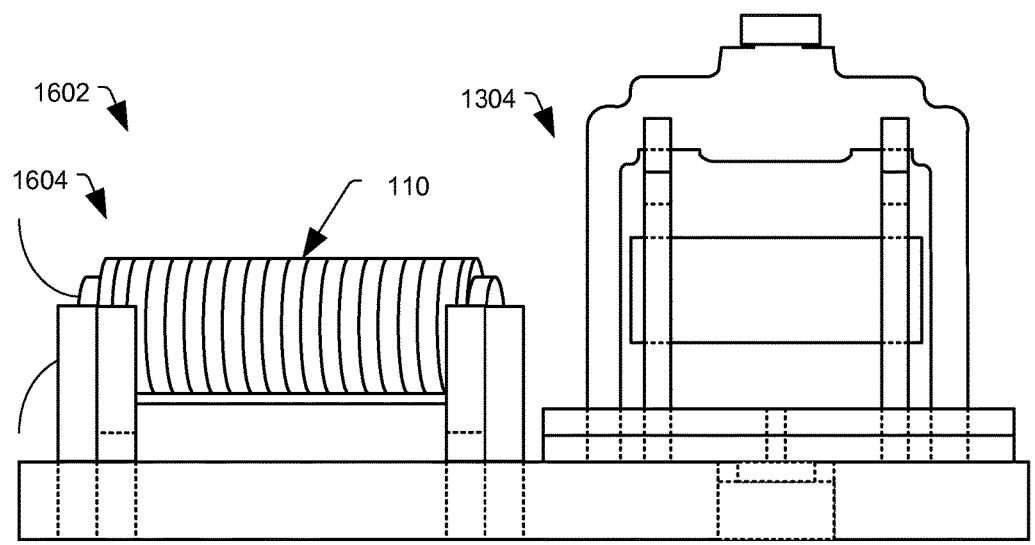
FIG. 16B is a side view that illustrates the coil having been inserted into the coil cradle to form a stator of adjacent to the rotor.

The user may press the coil 110 into the coil support 114 in order to complete assembly of a stator 1604 of the motor assembly. FIG. 16B is a side view 1602 that illustrates that the stator 1604 is positioned adjacent to the rotor 1304, forming the motor assembly illustrated in FIGS. 1 and 2.

FIG. 17 is a perspective view 1700 of another magnet assembly including a second rotor 1702 that may be positioned adjacent to the rotor 1304 associated with the electromagnetic motor 100 illustrated in FIG. 1. FIG. 17 illustrates that current flowing through the coil 110 of the electromagnetic motor 100 may be manipulated using a control unit 1704 (e.g., a stereo amplifier) in order to adjust a rotation speed of the rotor 1304. Further, as described below with respect to FIGS. 23-28, the additional magnet assemblies may allow a user to construct a magnetic gear train game, with adjacent magnet assemblies rotating in different directions in response to the magnetic fields of adjacent rotating magnets.

In some cases, the current flowing through the coil 110 may induce the rotor 1304 to rotate in a particular direction (e.g., clockwise in the example of FIG. 17). Alternatively, in some cases, the user may manually initiate the rotation of the rotor 1304. For example, as described above with respect to the example illustrated in FIG. 13B, the user may spin the rotor 1304 by grasping the disk 316 between a thumb and a forefinger and spinning the rotor 1304 in a clockwise direction with respect to the base structure 304. In either case, once the rotor 1304 has begun to spin, the user may adjust a rotation speed using a motion controller 1706 of the control unit 1704 (as described further with respect to FIG. 28).

In the example illustrated in FIG. 17, the control unit 1704 includes multiple controls. For example, the control unit 1704 may include a power control 1708 (e.g., a volume knob) that may be rotated in one direction (e.g., in a clockwise direction) to turn on the control unit 1704 and may be rotated in another direction (e.g., in a counterclockwise direction) to turn off the control unit 1704. In some implementations, a light or other indicator may be activated in order to identify to the user that the control unit 1704 has been powered on (e.g., in response to the user rotating the power control 1708). In the example of FIG. 17, the control unit 1704 further includes a first interface to receive a power cable 1710. The power cable 1710 may receive power from a power supply (not shown in FIG. 17). For example, the power cable 1710 may be connected to a wall outlet (not shown in FIG. 17) in order to provide power to the control unit 1704. The control unit 1704 may also include a second interface to receive a control cable 1712. In the example illustrated in FIG. 17, a first end of the control cable 1712 may be electrically connected to the second interface of the control unit 1704, and a second end of the control cable 1712 may be electrically connected to a motor adapter (partially obscured from view in FIG. 17).

In a particular implementation, the motor adapter may include a set of legs that may be inserted into holes 1210-1216 (see FIG. 12A) of the base structure 304 in order to secure the motor adapter to the base structure 304. In some cases, the motor adapter may include a first terminal and a second terminal (obscured from view in FIG. 17). The first terminal of the motor adapter may be electrically connected to the coil 110 via a first wire 1714, and the second terminal may be electrically connected to the coil 110 via a second wire 1716. In some cases, the first wire 1714 and the second wire 1716 may each include clips (e.g., alligator clips that are obscured from view in FIG. 17) to electrically connect the terminals of the motor adapter to the two wires 204, 206 (not shown in FIG. 17, see FIG. 2) associated with the coil 110. As an illustrative, non-limiting example, the first wire 1714 may include one alligator clip (e.g., a red alligator clip that is obscured from view in FIG. 17) that may be clipped to the first terminal of the motor adapter and another alligator clip (e.g., another red alligator clip that is obscured from view in FIG. 17) that may be clipped to one of the wires 204, 206 associated with the coil 110. Further, the second wire 1716 may include one alligator clip (e.g., a black alligator clip that is obscured from view in FIG. 17) that may be clipped to the second terminal of the motor adapter and another alligator clip (e.g., another black alligator clip that is obscured from view in FIG. 17) that may be clipped to the other one of the wires 204, 206 associated with the coil 110.

Thus, the control unit 1704 may receive power from a power supply via the power cable 1710 and may selectively provide current to the coil 110 via the control cable 1712. Further, as described below with respect to FIG. 28, the motion controller 1706 (also referred to as a motion slider) may allow a user to adjust a rotation speed by varying a current that is provided from the control unit 1704 to the coil 110 via the control cable 1712 that is electrically connected to the first wire 204 and the second wire 206 (see e.g., FIG. 2). In a particular instance, the user may increase the current that is provided to the coil 110 and thereby increase the rotation speed of the adjacent rotor 1304 by sliding the motion controller 1706 in a first direction (e.g., toward a side of the control unit 1704 that includes the interfaces to receive the power cable 1710 and the control cable 1712). Alternatively, the user may decrease the current that is provided to the coil 110 and thereby reduce the rotation speed of the adjacent rotor 1304 by sliding the motion controller 1706 in a second direction (e.g., toward another side of the control unit 1704).

In some cases, the rotor 1304 may begin to shake in response to current being provided to the coil 110 from the control unit 1704 via the control cable 1712. In other cases, the rotor 1304 may begin to rotate (e.g., in a clockwise direction in the example of FIG. 17) responsive to the current being provided to the coil 110. Alternatively, in some cases, the user may manually spin the rotor 1304 in order to initiate the rotation (e.g., by grasping the disk 316 between a thumb and a forefinger and spinning the rotor 1304 in a clockwise direction with respect to the base structure 304, as described with respect to FIG. 13B). In either case, once the rotor 1304 has begun to spin, the user may adjust the rotation speed using the motion controller 1706 of the control unit 1704 (as described further with respect to FIG. 28).

One example investigation that may be performed by the user is to determine how slowly the rotor 1304 can be made to spin without stalling out. That is, the user may reduce the rotation speed using the motion controller 1706 in order to identify a position of the motion controller 1706 with respect to a top of the control unit 1704 (e.g., a side of the control unit 1704 that includes the interfaces to receive the power cable 1710 and the control cable 1712) and a bottom of the control unit 1704 that may represent a threshold amount of current to be provided to the coil 110 in order to induce rotation of the rotor 1304.

FIG. 17 further illustrates that the electromagnetic motor 100 illustrated in FIG. 1 may be combined with one or more additional magnet assemblies in order to provide a magnetic gear train game. In the example illustrated in FIG. 17, the second magnet assembly (also referred to as a passive assembly) includes the second rotor 1702 that includes a second magnet 1718 that is rotatable with respect to a base structure 1720. FIG. 17 shows that the base structure 1720 of the second magnet assembly may be positioned adjacent to the base structure 302 of the first magnet assembly (also referred to as an active assembly). In the particular example illustrated in FIG. 17, the base structures include mating patterns that may fit together in a manner similar to puzzle pieces. For example, the base structure 1720 of the second magnet assembly may include a first pattern 1722 (e.g., a male mating pattern) that may substantially align with the cutout 104 (e.g., a female mating pattern) of the first magnet assembly (see e.g., FIG. 1).

FIG. 17 further illustrates that the base structure 1720 of the second magnet assembly may include a cutout 1724 (e.g., a female mating pattern) in order to allow additional magnet assemblies to be added to construct a magnetic gear train game. In the magnetic gear train game, a magnet of one magnet assembly may be made to spin in response to a magnetic field that is produced by a spinning magnet of an adjacent magnet assembly. To illustrate, referring to the example in FIG. 17, the magnet 1718 of the second rotor 1702 may be made to spin in a counterclockwise direction with respect to the base structure 1720 in response to a magnetic field associated with the magnet 106 of the first rotor 1304 rotating in a clockwise direction with respect to the base structure 304.

While FIG. 17 illustrates a particular example in which the first rotor 1304 (associated with the electromagnetic motor 100) is induced to rotate in a clockwise direction with respect to the base structure 304, it will be appreciated that in alternative cases the first rotor 1304 may be induced to rotate in a counterclockwise direction with respect to the base structure 304. In this case, the magnet 1718 of the second rotor 1702 may be made to spin in a clockwise direction with respect to the base structure 1720 in response to a magnetic field associated with the magnet 106 of the first rotor 1304 rotating in a counterclockwise direction with respect to the base structure 304. Further, as described below with respect to FIG. 18, the adjacent magnet assemblies may include one or more pads (also referred to as feet) that may be disposed on an underside of the base structures 304, 1720 in order to align the adjacent magnets 106, 1718 at substantially the same height above the respective base structures. The one or more pads on the underside of the base structures 304, 1720 may also reduce potential movement of the base structures 304, 1720 with respect to a surface (e.g., a table) that may result from the rotation of the magnets 106, 1718.

Figure 18:
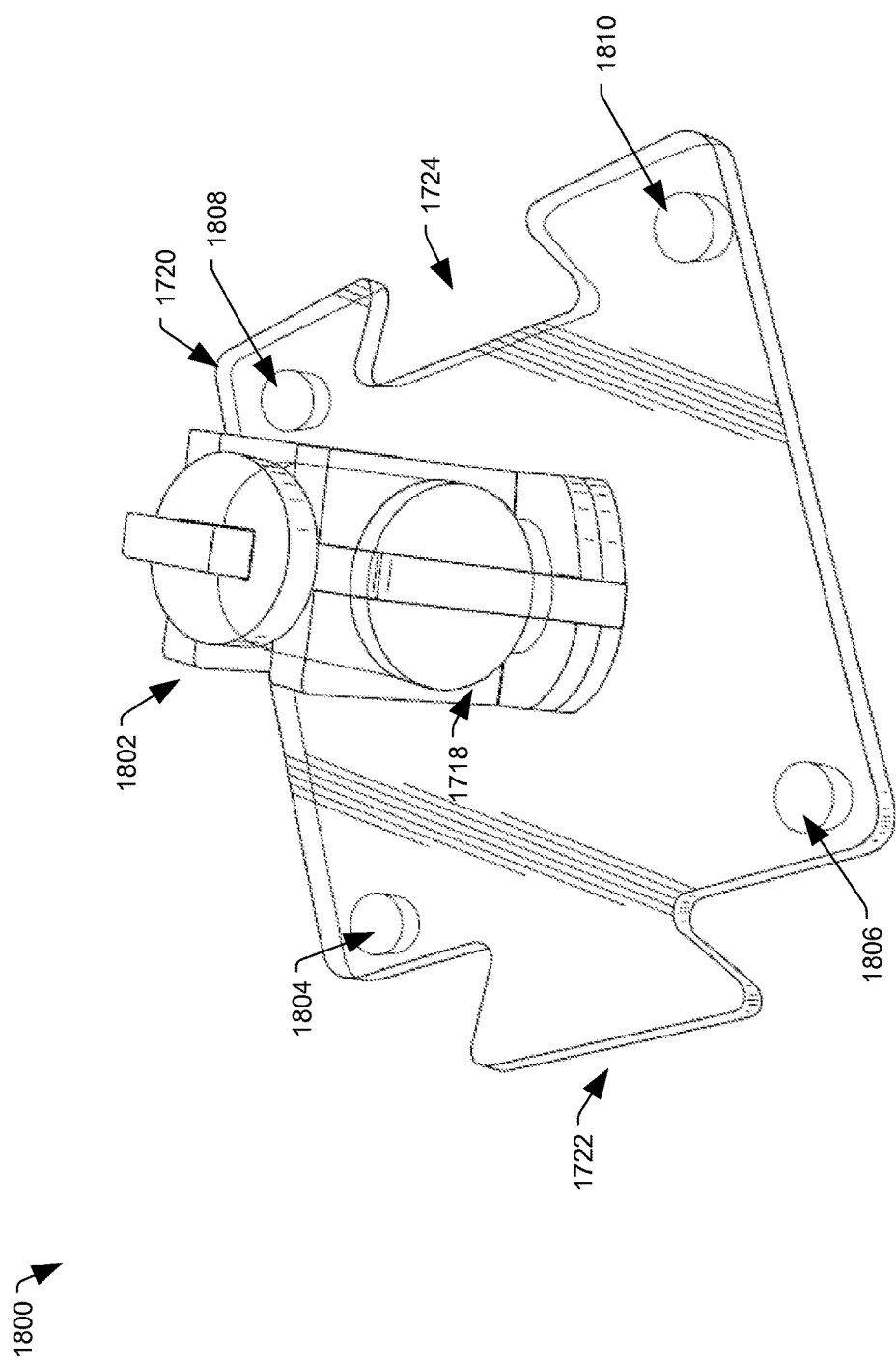
FIG. 18 is a perspective view of the other magnet assembly illustrated in FIG. 17.

FIG. 18 is a perspective view 1800 of the second magnet assembly illustrated in FIG. 17. FIG. 18 illustrates that the second magnet assembly may represent a passive assembly. That is, the second rotor 1702 may include a magnet support 1802 that is rotatably attached to a shaft of a bearing (not shown in FIG. 18, see FIG. 22B) that is disposed within the base structure 1720. However, the base structure 1720 may not include one or more holes to support a coil, as in the first magnet assembly illustrated in FIGS. 1 and 2. Accordingly, the second rotor 1702 may be induced to rotate in a particular direction (e.g., clockwise or counterclockwise) with respect to the base structure 1720 as a result of a magnetic field associated with an adjacent magnet or as a result of a user manually inducing rotation (e.g., by grasping a disk at a tip of the magnet support 1802 between a thumb and a forefinger and spinning the rotor 1702). By contrast, the first magnet assembly may represent an active assembly in that the magnet 106 of the rotor 1304 may be induced to rotate or to continue to rotate as a result of current being supplied to the coil 110 (e.g., via the control cable 1712 of the control unit 1704 illustrated in FIG. 17).

In the particular example illustrated in FIG. 18, multiple pads are illustrated as disposed on an underside of the base structure 1720 (i.e., a side of the base structure 1720 that is substantially opposite a side of the base structure 1720 upon which the second rotor 1702 is rotatably attached). FIG. 18 illustrates a first pad 1804 disposed at a first location (e.g., a first corner), a second pad 1806 disposed at a second location (e.g., a second corner), a third pad 1808 disposed at a third location (e.g., a third corner), and a fourth pad 1810 disposed at a fourth location (e.g., a fourth corner). The pads 1804-1810 on the underside of the base structure 1720 may reduce potential movement of the base structure 1720 with respect to a surface (e.g., a table) that may result from the rotation of the magnet 1718. Further, the pads 1804-1810 may position the magnet 1718 at a particular height above the base structure 1720 such that the magnet 1718 may substantially align with one or more adjacent magnets (e.g., in the case of the magnetic gear train game).

Figure 19:
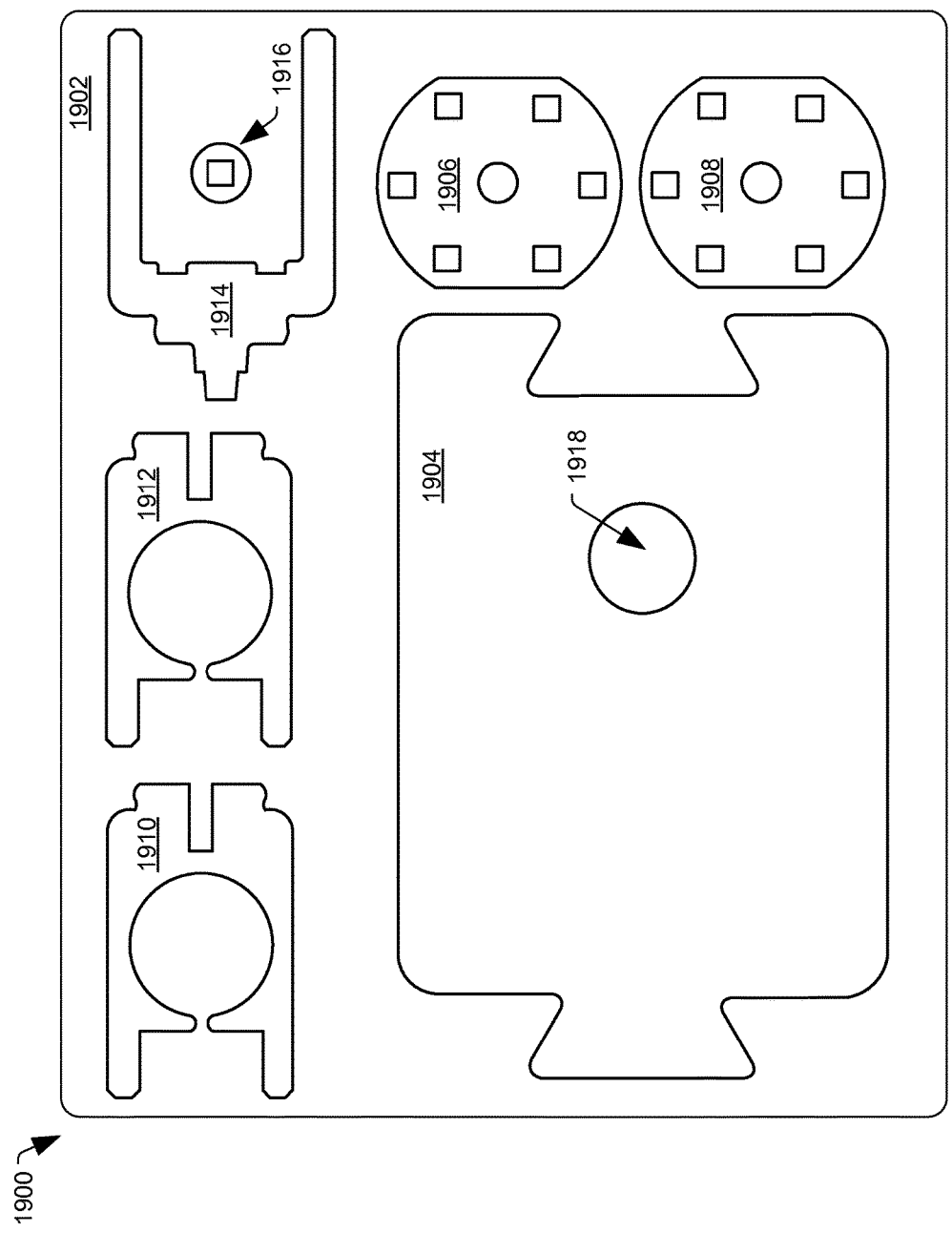
FIG. 19 is a top view of an example of a flat assembly having components to use in constructing the other rotor illustrated in FIGS. 17 and 18.

FIG. 19 is a top view 1900 of an example of a flat assembly 1902 having components to use in constructing the second magnet assembly illustrated in FIG. 18.

The flat assembly 1902 includes component parts that can be punched out or otherwise separated by hand. For example, a base structure 1904 may be separated from the flat assembly 1902 to form the base structure 1704 illustrated in FIG. 18, and component parts may be separated from the flat assembly 1902 to construct the magnet support 1802 illustrated in FIG. 18. In some cases, the flat assembly 1902 may include material that fills the holes and that may be punched out or otherwise separated by hand. Alternatively, the hole material may be pre-removed such that the holes illustrated in the flat assembly 1902 may already be present when the user begins the assembly process.

In the example illustrated in FIG. 19, the flat assembly 1902 includes a first rotor plate 1906, a second rotor plate 1908, a first magnet bracket 1910, a second magnet bracket 1912, a rotor clip 1914, and a disk 1916. As further described with respect to FIG. 20, the magnet support may be constructed by assembling the rotor plates 1906, 1908, inserting the magnet 1718 (not shown in FIG. 19) into holes of the magnet brackets 1910, 1912, securing the magnet 1718 with the rotor clip 1914, and attaching the disk 1916 for a user to grasp for rotation. One side of a bearing (not shown in FIG. 19, see the bearing 2102 of FIG. 21B) may be inserted into a central hole 1918 of the base structure 1904, while another side of the bearing may be inserted into central holes of the assembled rotor plates 1906, 1908 (see FIG. 22A).

In some cases, the flat assembly 1902 may be formed from a plastic material (e.g., an acrylate polymer). As an illustrative, non-limiting example, the flat assembly 1902 may be clear acrylic plastic material, such as poly-methyl methacrylate (PMMA), among other alternatives. In a particular instance, a nominal thickness of the flat assembly 1902 may be within a range of between about 0.1 inches to about 0.5 inches, such as within a range of between about 0.125 inches and about 0.3 inches, or within a range of between about 0.15 inches and about 0.25 inches.

Thus, FIG. 19 illustrates one example of a flat assembly that includes components that may be punched out or otherwise separated by hand. That is, the flat assembly 1902 of FIG. 19 may provide a platform that allows a user (e.g., a child) to construct a rotor without tools.

Figure 20:
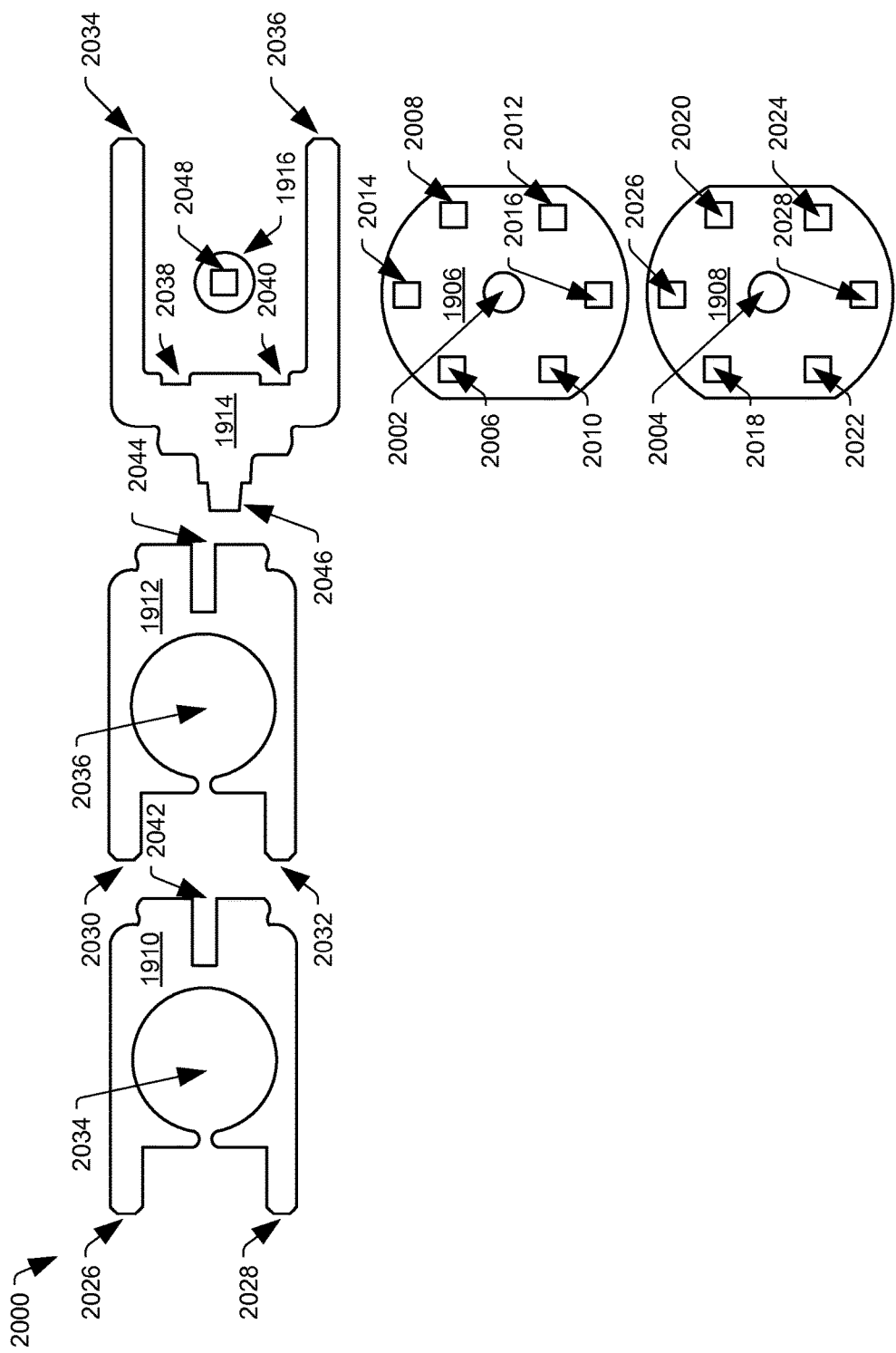
FIG. 20 is a top view of various components removed from the flat assembly of FIG. 19 for use in constructing the magnet support of FIG. 18.

FIG. 20 is a top view 2000 of various components that have been removed from the flat assembly 1902 of FIG. 19 to be used for assembling the magnet support 1812 illustrated in FIG. 18.

FIG. 20 illustrates that the first rotor plate 1906 includes a central hole 2002 for receiving a shaft of the bearing 2102 (not shown in FIG. 5, see FIG. 2), holes for receiving the magnet brackets 1910, 1912, and holes for receiving the rotor clip 1914. Similarly, the second rotor plate 1908 includes a central hole 2004 for receiving the shaft of the bearing 2102 (not shown in FIG. 20, see FIG. 21B), holes for receiving the magnet brackets 1910, 1912, and holes for receiving the rotor clip 1914. In the example illustrated in FIG. 20, the first rotor plate 1906 includes a first set of holes 2006, 2008 for receiving one of the magnet brackets 1910, 1912, a second set of holes 2010, 2012 for receiving another one of the magnet brackets 1910, 1912, and a third set of holes 2014, 2016 for receiving the rotor clip 1914. Similarly, in the example illustrated in FIG. 20, the second rotor plate 1908 includes a first set of holes 2018, 2020 for receiving one of the magnet brackets 1910, 1912, a second set of holes 2022, 2024 for receiving another one of the magnet brackets 1910, 1912, and a third set of holes 2026, 2028 for receiving the rotor clip 1914. It will be appreciated that the example illustrated in FIG. 20 is for illustrative purposes only and that the rotor plates 1906, 1908 may include an alternative number of holes and/or an alternative arrangement of holes.

In some cases, the magnet support 1802 illustrated in FIG. 18 may be assembled in a manner that is similar to the assembly process described above with respect to FIGS. 7A-11B. For example, in a manner similar to that illustrated in FIGS. 7A and 7B, the first rotor plate 1906 and the second rotor plate 1908 may be stacked atop one another such that the central holes 2002, 2004 for receiving the shaft of the bearing 2102 and the holes for receiving the magnet brackets 1910, 1912 and the rotor clip 1914 are substantially aligned. To illustrate, either the first rotor plate 1906 may be stacked atop the second rotor plate 1908 or the second rotor plate 1908 may be stacked atop the first rotor plate 1906. In either case, stacking the rotor plates 1906, 1908 atop one another may result in the first set of holes 2006, 2008 of the first rotor plate 1906 being substantially aligned with the first set of holes 2018, 2020 of the second rotor plate 1908. Further, stacking the rotor plates 1906, 1908 atop one another may result in the second set of holes 2010, 2012 of the first rotor plate 1906 being substantially aligned with the second set of holes 2022, 2024 of the second rotor plate 1908. Still further, stacking the rotor plates 1906, 1908 atop one another may result in the third set of holes 2014, 2016 of the first rotor plate 1906 being substantially aligned with the third set of holes 2026, 2028 of the second rotor plate 1908.

As an illustrative non-limiting example, the first rotor plate 1906 may be stacked atop the second rotor plate 1908. In this case, the central hole 2002 of the first rotor plate 1906 may be disposed above and substantially aligned with the central hole 2004 of the second rotor plate 1908. Further, in this case, the first set of holes 2006, 2008 of the first rotor plate 1906 may be disposed above and substantially aligned with the first set of holes 2018, 2020 of the second rotor plate 1908. Still further, in this case, the second set of holes 2010, 2012 of the first rotor plate 1906 may be disposed above and substantially aligned with the second set of holes 2022, 2024 of the second rotor plate 1908.

The substantial alignment of the first set of holes 2006, 2008 of the first rotor plate 1906 with the first set of holes 2018, 2020 of the second rotor plate 1908 may allow the first magnet bracket 1910 and the second magnet bracket 1912 to be inserted (e.g., in a manner similar to that described above with respect to FIGS. 8A and 8B). For example, FIG. 20 illustrates that the first magnet bracket 1910 may include a set of legs 2026, 2028, and the second magnet bracket 1912 may also include a set of legs 2030, 2032. As an illustrative, non-limiting example, the set of legs 2026, 2028 of the first magnet bracket 1910 may be inserted into the first set of holes 2006, 2008 of the first rotor plate 1906 and may extend into the first set of holes 2018, 2020 of the second rotor plate 1908. In this case, the set of legs 2030, 2032 of the second magnet bracket 1912 may be inserted into the second set of holes 2010, 2012 of the first rotor plate 1906 and may extend into the second set of holes 2022, 2024 of the second rotor plate 1908. Alternatively, the set of legs 2026, 2028 of the first magnet bracket 1910 may be inserted into the second set of holes 2010, 2012 of the first rotor plate 1906 and may extend into the second set of holes 2022, 2024 of the second rotor plate 1908. In this case, the set of legs 2030, 2032 of the second magnet bracket 1912 may be inserted into the first set of holes 2006, 2008 of the first rotor plate 1906 and may extend into the first set of holes 2018, 2020 of the second rotor plate 1908.

In either case, insertion of the legs 2026, 2028 of the first magnet bracket 1910 and the legs 2030, 2032 of the second magnet bracket 1912 into the holes of the rotor plates 1906, 1908 may result in substantial alignment of a hole 2034 of the first magnet bracket 1910 with a hole 2036 of the second magnet bracket 1912. In a manner similar to that described above with respect to FIGS. 9A and 9B, the magnet 1718 may be inserted through the substantially aligned holes 2034, 2036 such that a first pole of the magnet 1806 and a second pole of the magnet 1806 are substantially aligned along an axis that is substantially parallel to a surface of the stacked rotor plates 1906, 1908 (and substantially parallel to a surface of the base structure 1904).

In a manner similar to that described above with respect to FIGS. 10A and 10B, the rotor clip 1914 may be used to secure the magnet 1718 above the surface of the stacked rotor plates 1906, 1908 after the magnet 1718 has been inserted into the holes 2034, 2036 of the magnet brackets 1910, 1912. In the example illustrated in FIG. 20, the rotor clip 1914 includes a set of legs 2034, 2036 that may be inserted into the third set of holes 2014, 2016 of the first rotor plate 1906 and may extend into the third set of holes 2026, 2028 of the second rotor plate 1908. FIG. 20 further illustrates that the rotor clip 1914 may further include a set of grooves 2038, 2040 that may substantially align with grooves 2042, 2044 of the magnet brackets 1910, 1912. In some cases, a user may align the set of legs 2034, 2036 with the third set of holes 2014, 2016 by grasping a tip 2046 of the rotor clip 1914 and may insert the legs 2034, 2036 into the third set of holes 2014, 2016 until the grooves 2038, 2040 of the rotor clip 1914 contact the grooves 2042, 2044 of the magnet brackets 1910, 1912.

In a manner similar to that described above with respect to FIGS. 11A and 11B, the disk 1916 may include a hole 2048 that may be aligned with the tip 2046 of the rotor clip 1914. In some implementations, the hole 2048 may be substantially square or substantially rectangular in shape in order to allow for secure contact with the tip 2046, while an outer surface of the disk 1916 may be substantially circular in shape. The substantially circular shape may allow the user to impart rotational motion by grasping and rotating the disk 1916.

Figure 21A:
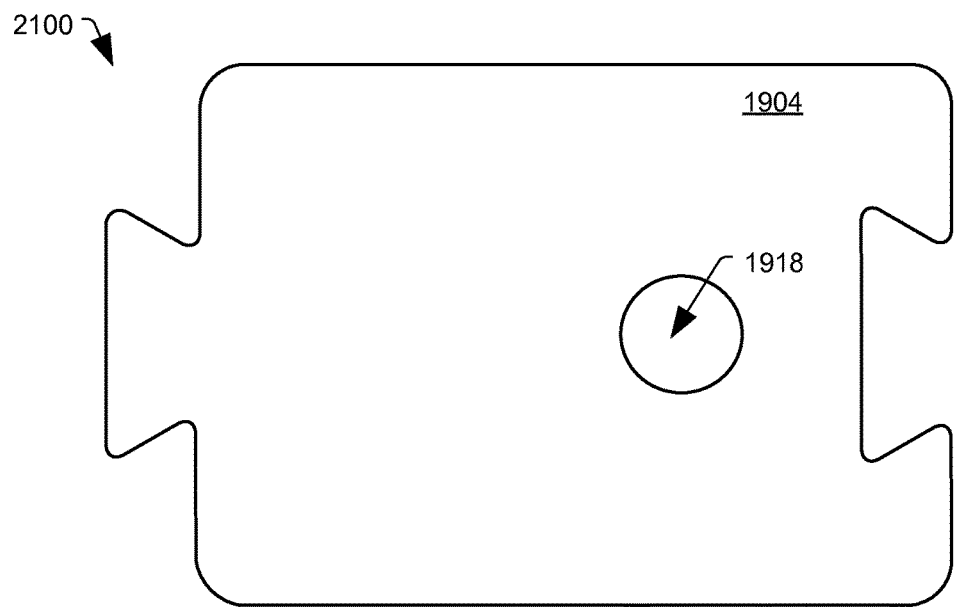
FIG. 21A is a top view of the base structure that is removed from the flat assembly of FIG. 19 and that includes a central hole to receive a bearing to support the magnet assembly illustrated in FIG. 18.

FIG. 21A is a top view 2100 of the base structure 1904 that is removed from the flat assembly 1902 of FIG. 19 and that includes the central hole 1918 for receiving the bearing 2102 to support the magnet assembly constructed as described above with respect to FIG. 20.

Figure 21B:
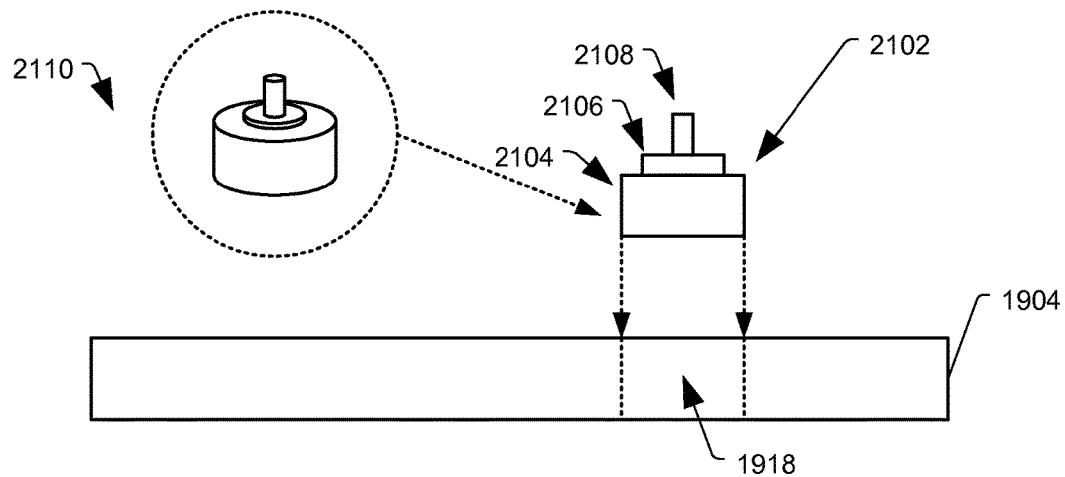
FIG. 21B is a side view showing the insertion of the bearing into the central hole of the base structure illustrated in FIG. 21A.

The user may insert the bearing 2102 into the central hole 1918 of the base structure 1904 and press the bearing 2102 firmly into place. FIG. 21B illustrates that the bearing 2102 may include a base portion 2104 and a rotatable portion 2106 that includes a shaft 2108 to be inserted into the central holes 2002, 2004 in the stacked rotor plates 1906, 1908. FIG. 21B further illustrates a side view 2110 of the bearing 2102 being inserted into the central hole 1918 of the base structure 1904.

Figure 22A:
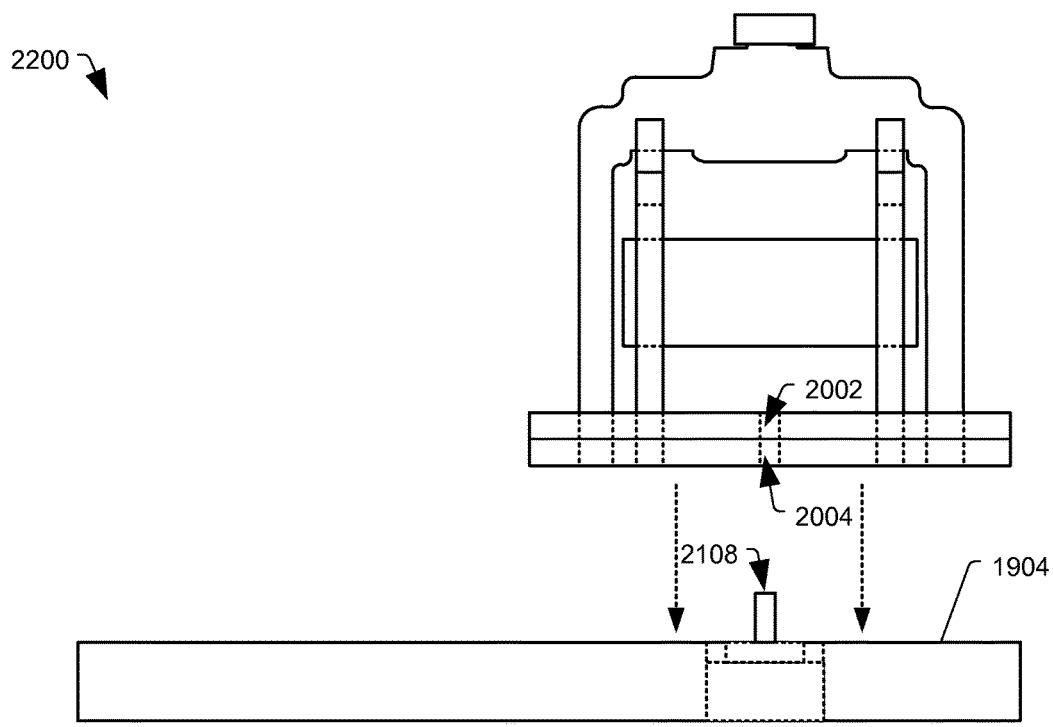
FIG. 22A is a first side view showing holes in the magnet assembly being aligned with a shaft of the bearing that has been inserted into the base structure as illustrated in FIG. 20B.
Figure 22B:
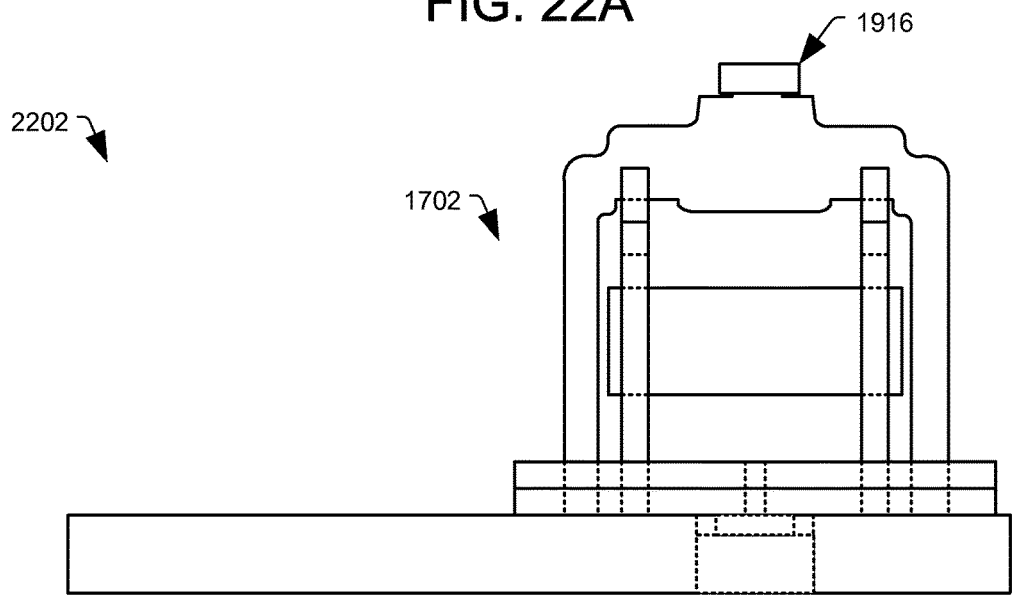
FIG. 22B is a second side view showing the magnet assembly being rotatably attached to the base structure via the bearing inserted into the holes of the stacked rotor plates to form a rotor.

FIG. 22A is a first side view 2200 showing the central holes 2002, 2004 of the stacked rotor plates 1906, 1908 being aligned with the shaft 2108 of the bearing 2102 that has been inserted into the base structure 1904 as illustrated in FIG. 21B. FIG. 22B is a second side view 2202 showing the stacked rotor plate assembly illustrated in FIG. 21B being rotatably attached to the base structure 1904 via the shaft 2108 of the bearing 2102.

The user may position the central holes 2002, 2004 of the stacked rotor assembly above the shaft 2108 and may press the stacked rotor assembly down such that the shaft 2108 contacts the central holes 2002, 2004 in order to complete assembly of the second rotor 1702. The user may grasp the disk 1916 in order to spin the rotor 1702 with her hand. In the event that the rotor 1702 does not spin freely or if the rotor 1702 seems loose or off-center, the user may reposition the bearing 2102 such that the bearing 2102 is seated firmly in the base structure 1904.

Figure 23:
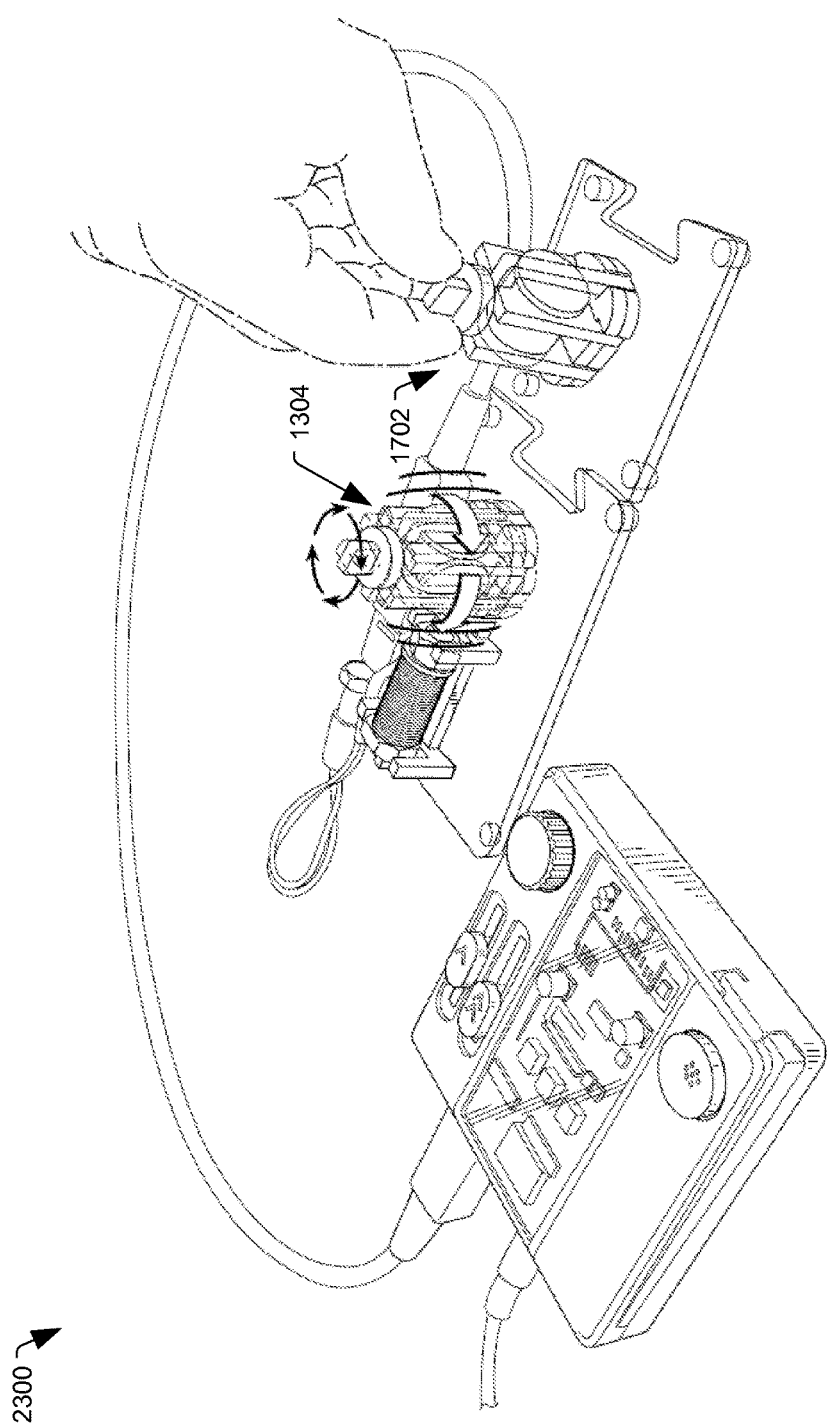
FIG. 23 is a perspective view of an example of a magnetic gear train game that includes two adjacent magnet assemblies.

FIG. 23 is a view 2300 of an example of a magnetic gear train game that includes two adjacent magnet assemblies. FIG. 23 illustrates a particular example in which a user may initiate rotation of the second rotor 1702 of the second magnet assembly in a counterclockwise direction (as the spinning magnet 106 of the first magnet assembly is rotating in a clockwise direction in the example of FIG. 23). FIG. 23 further illustrates that the user may induce rotation of the second rotor 1702 by grasp the disk 1916 at the tip of the rotor 1702 (see FIG. 22B) between a thumb and a forefinger and turning the second rotor 1702 in the counterclockwise direction.

Figure 24:
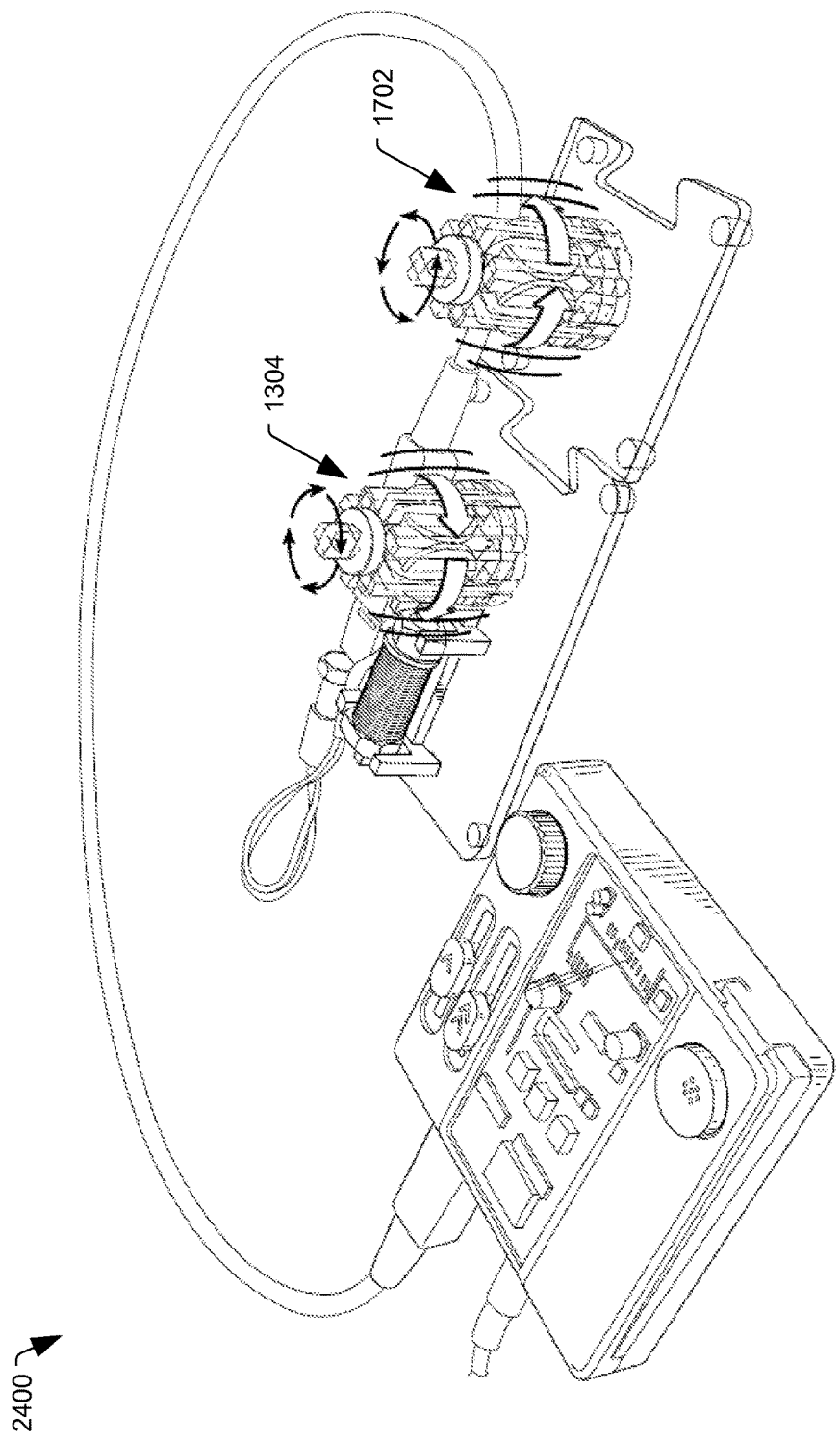
FIG. 24 is a perspective view of the magnetic gear train game illustrated in FIG. 23 showing the rotor of the second magnet assembly rotating in one direction and the second rotor of the second magnet assembly rotating in another direction.

FIG. 24 is a view 2400 of the illustrative magnetic gear train game of FIG. 23 after the second rotor 1702 has begun rotating (e.g., in the counterclockwise direction). In some cases, the second rotor 1702 may be induced to continue to rotate in the counterclockwise direction as a result of a magnetic field associated with the rotating magnet 106 of the adjacent rotor 1304. That is, FIG. 23 illustrates that a user may initiate rotation of a particular magnet assembly after the particular magnet assembly has been positioned adjacent to another magnet assembly. FIG. 24 illustrates that the rotational motion imparted on the first rotor 1304 by the current through the coil 110 may also result in continued rotation of the second rotor 1702.

Figure 25:
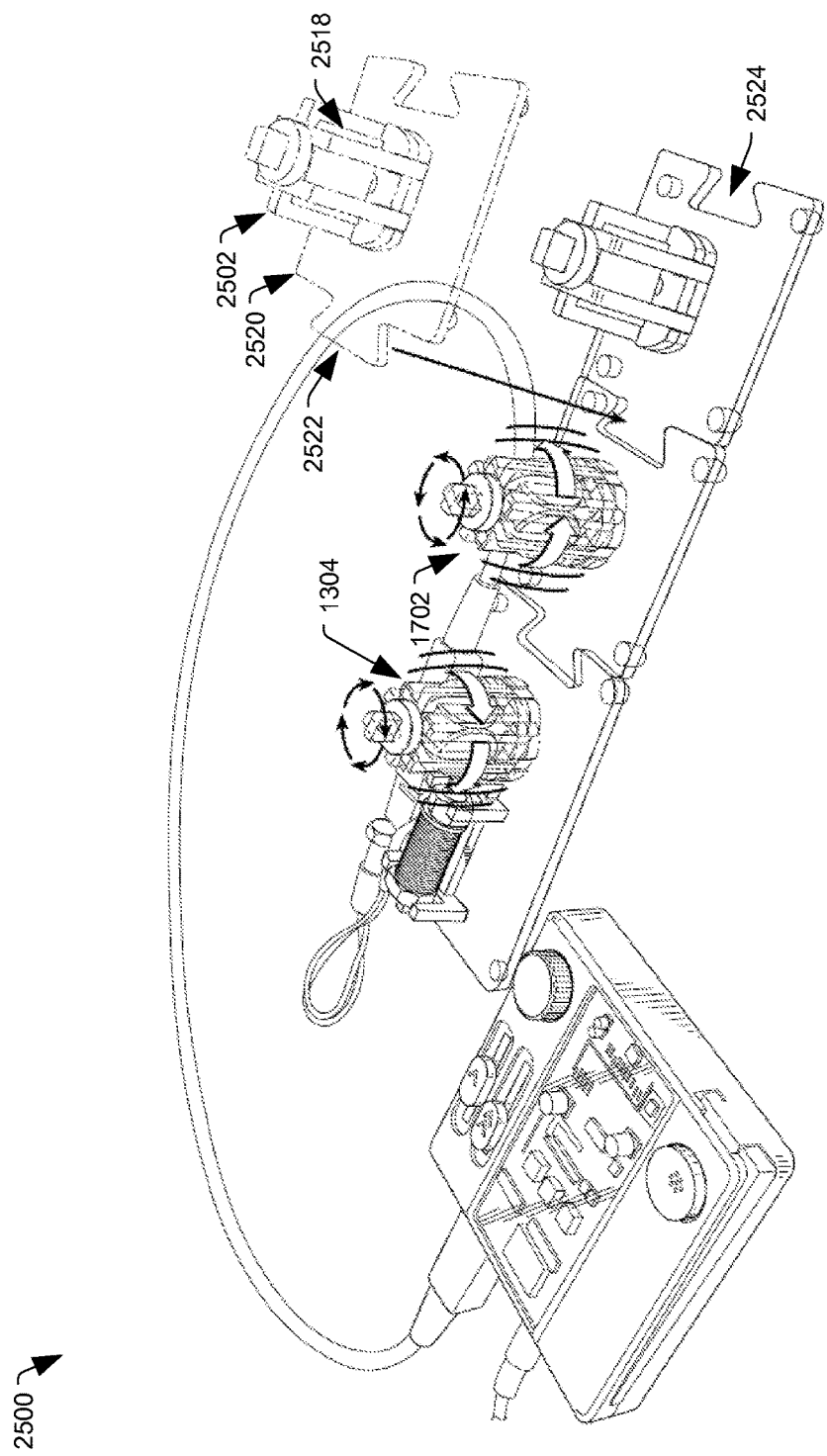
FIG. 25 is a perspective view of a third magnet assembly being positioned adjacent to the second magnet assembly of the magnetic gear train game illustrated in FIG. 24.

FIG. 25 is a perspective view 2500 of a third magnet assembly including a third rotor 2502 being positioned adjacent to the second magnet assembly of the illustrative magnetic gear train game of FIG. 24 in order to form a chain that includes three magnet assemblies.

In the example illustrated in FIG. 25, the third magnet assembly (a passive assembly) includes the third rotor 2502 that includes a third magnet 2518 that is rotatable with respect to a base structure 2520. FIG. 25 shows that the base structure 2520 of the third magnet assembly may be positioned adjacent to the base structure 1720 of the second magnet assembly (another passive assembly). In the particular example illustrated in FIG. 25, the base structure 2520 of the third magnet assembly may include a first pattern 2522 (e.g., a male mating pattern) that may substantially align with the cutout 1724 (e.g., the female mating pattern) of the second magnet assembly. FIG. 25 further illustrates that the base structure 2520 of the third magnet assembly may include a cutout 2524 (e.g., a female mating pattern) in order to allow additional magnet assemblies to be added to the magnetic gear train game.

Figure 26:
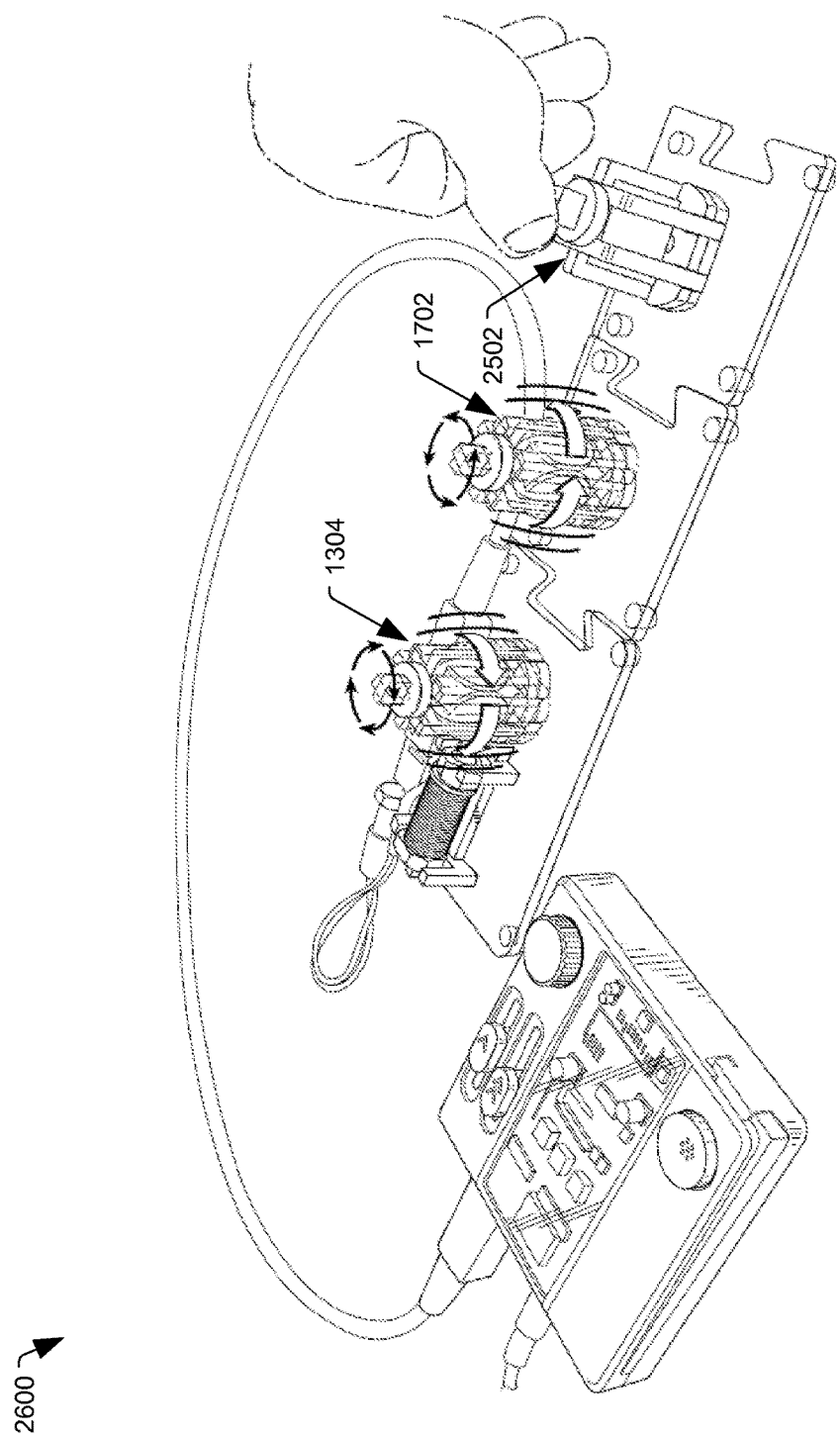
FIG. 26 is a perspective view of an example of a magnetic gear train game that includes three adjacent magnet assemblies.

FIG. 26 is a view 2600 of an example of the magnetic gear train game after the addition of the third magnet assembly in FIG. 25 to form a chain that includes three adjacent magnet assemblies. FIG. 26 illustrates a particular example in which a user may initiate rotation of the third rotor 2502 of the third magnet assembly in a clockwise direction (as the spinning magnet 1718 of the second magnet assembly is rotating in a counterclockwise direction in the example of FIG. 26). FIG. 26 further illustrates that the user may induce rotation of the third rotor 2502 by grasp the disk 1916 at the tip of the rotor 2502 (see FIG. 22B) between a thumb and a forefinger and turning the third rotor 2502 in the clockwise direction.

Figure 27:
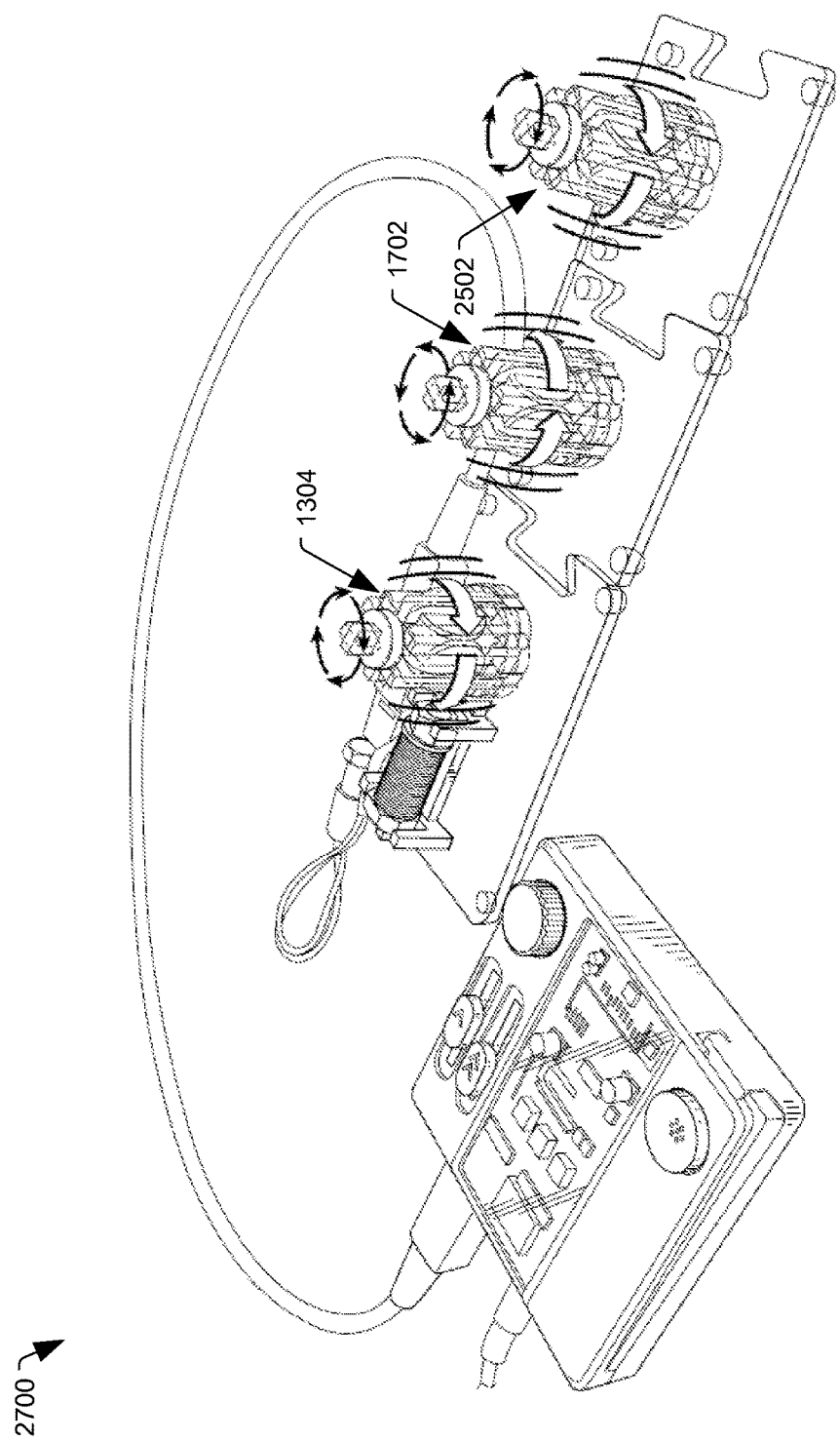
FIG. 27 is a perspective view of the magnetic gear train game illustrated in FIG. 26 showing the rotors of the adjacent magnet assemblies rotating in direction directions.

FIG. 27 is a view 2700 of the illustrative magnetic gear train game of FIG. 26 after the third rotor 2502 has begun rotating (e.g., in the clockwise direction). In some cases, the third rotor 2502 may be induced to continue to rotate in the clockwise direction as a result of a magnetic field associated with the rotating magnet 1718 of the adjacent second rotor 1702. That is, FIG. 26 illustrates that a user may initiate rotation of a particular magnet assembly (e.g., the third magnet assembly) after the particular magnet assembly has been positioned adjacent to another magnet assembly (e.g., the second magnet assembly). FIG. 27 illustrates that the rotational motion imparted on the first rotor 1304 by the current through the coil 110 may also result in continued rotation of not only the second rotor 1702 but also the third rotor 2502.

Figure 28:
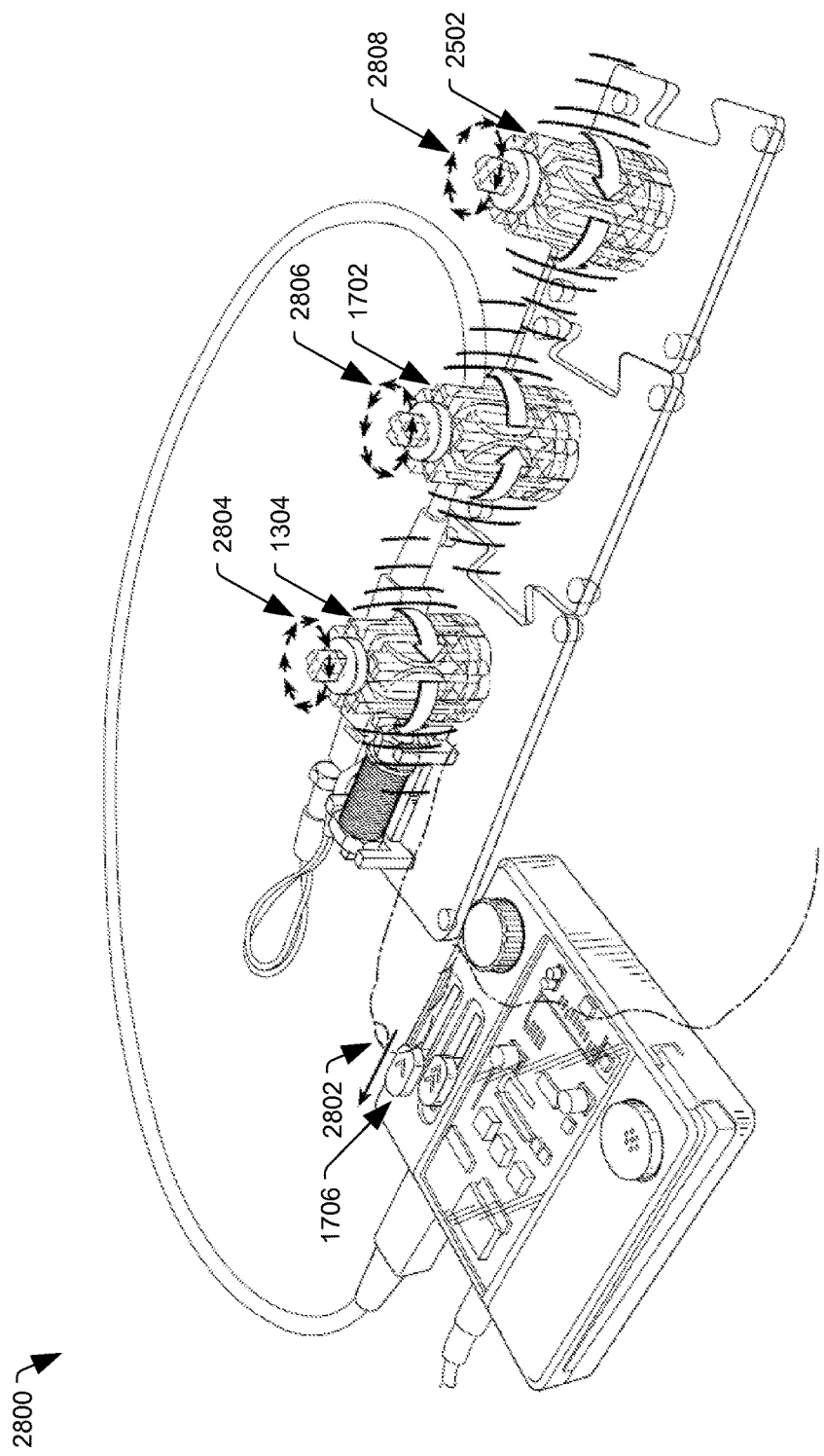
FIG. 28 is a perspective view of the illustrative magnetic gear train game of FIG. 27 after a user has adjusted a rotation speed (e.g., increased the rotation speed) using a motion controller.

FIG. 28 is a view 2800 of the illustrative magnetic gear train game of FIG. 27, including three adjacent magnet assemblies, after a user has adjusted a rotation speed using the motion controller 1706 of the control unit 1704.

In the example of FIG. 28, the user has increased the speed of rotation by moving the motion controller 1706 in a first direction (e.g., in an upward direction), as shown at 2802. FIG. 28 further illustrates that a speed of rotation of the first rotor 1304 in the clockwise direction has increased (as shown by additional rotational arrows, at 2804), a speed of rotation of the second rotor 1702 in the counterclockwise direction has increased (as shown by additional rotational arrows, at 2806), and a speed of rotation of the third rotor 2502 in the clockwise direction has increased (as shown by additional rotational arrows, at 2808). In FIG. 28, the movement of the motion controller 1706 in the first direction may result in the control unit 1704 providing additional current to the coil 110 via the control cable 1712. The additional current provided to the coil 110 may not only induce the increased rotation speed of the rotor 1304 adjacent to the coil 110 but also the increased rotation speed of the other rotors 1702, 2502 of the magnetic gear train game assembly.

In an alternative implementation, the user may decrease the rotation speed by moving the motion controller 1706 in a second direction (e.g., in a downward direction). In this case, the movement of the motion controller 1706 in the second direction may result in the control unit 1704 reducing the current that is provided to the coil 110 via the control cable 1712. The reduction of current provided to the coil 110 may not only induce a decreased rotation speed of the rotor 1304 adjacent to the coil 110 but also a decreased rotation speed of the other rotors 1702, 2502 of the magnetic gear train game assembly.

While FIG. 28 illustrates an example in which the motion controller 1706 is adjustable in an up/down direction, in alternative implementations the control unit 1704 may include an alternative speed adjustment controller (e.g., a rotatable dial or a graphical user interface, among other alternatives). Further, it will be appreciated that additional passive rotor assemblies may be added to the chain in order to form a chain of four or more magnet assemblies (e.g., by interlocking mating patterns).

In the example of FIG. 28, the magnet assemblies are shown in a substantially linear configuration. It will be appreciated that in alternative instances, different puzzle piece orientations may be used. For example, passive assemblies may include alternative arrangements of cutouts such that assemblies may be offset at an angle (e.g., about ninety degrees) from adjacent assemblies. In this way, a user may observe the effects associated with an electromagnetic field in various assembly configurations (e.g., a substantially L-shaped configuration).

Figure 29:
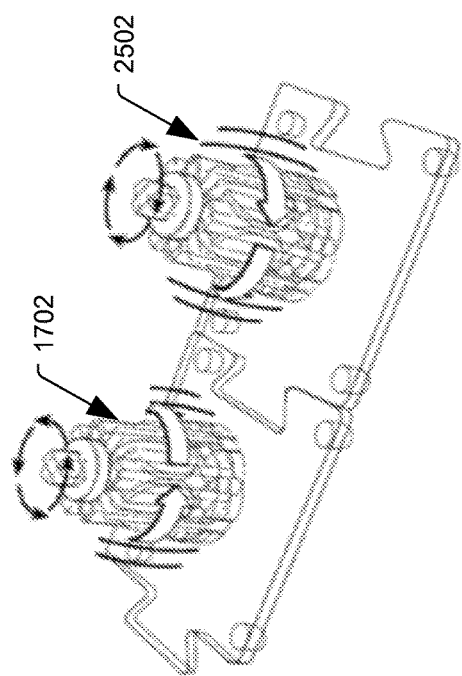
FIG. 29 is a perspective view of an illustrative magnetic gear train game that includes two adjacent passive magnet assemblies, after a user has manually imparted rotational motion on a rotor of one magnet assembly in a first direction, resulting in rotation of another rotor of an adjacent magnet assembly in a second direction.

FIG. 29 is a view 2900 of an alternative example of a magnetic gear train game that includes adjacent passive magnet assemblies. In FIG. 29, one of the magnet assemblies may correspond to the second magnet assembly illustrated in FIGS. 17-28 (including the second rotor 1702), while another one of the magnet assemblies may correspond to the third magnet assembly illustrated in FIGS. 25-28. While FIG. 29 illustrates one example of a magnetic gear train game that includes a chain of two adjacent passive magnet assemblies, it will be appreciated that one or more additional magnet assemblies may be added to the chain.

In the example of FIG. 29, the rotor 1702 of one magnet assembly is shown as rotating in a counterclockwise direction, while the other rotor 2502 of the adjacent magnet assembly is shown as rotating in a clockwise direction. As one example, the user may have induced rotation of the rotor 1702 by grasping the disk 1916 at the tip of the rotor 1702 (see FIG. 22B) between a thumb and a forefinger and turning the second rotor 1702 in the counterclockwise direction. As a result of the rotational motion imparted by the user, the magnetic field associated with the rotating magnet 1718 (see FIG. 17) of the rotor 1702 may induce the magnet 2518 (see FIG. 25) of the other rotor 2502 to rotate in the clockwise direction. As another example, the user may have induced rotation of the rotor 2502 by grasping the disk at the tip of the rotor 2502 (see e.g., the disk 1916 of FIG. 22B) between a thumb and a forefinger and turning the rotor 2502 in the clockwise direction. As a result of the rotational motion imparted by the user, the magnetic field associated with the rotating magnet 2518 (see FIG. 25) of the rotor 2502 may induce the magnet 1718 (see FIG. 17) of the other rotor 1702 to rotate in the counterclockwise direction.

While not illustrated in the example of FIG. 29, it will be appreciated that the user may rotate one of the rotors 1702, 2502 in an alternative direction. That is, the user may induce rotation of the rotor 1702 in a clockwise direction or the user may induce rotation of the rotor 2502 in a counterclockwise direction. As a result of the rotational motion imparted by the user, the magnetic field associated with one rotating magnet may induce the adjacent magnet to rotate in another direction. To illustrate, in the case where the user induces rotation of the rotor 1702 in the clockwise direction, the magnetic field associated with the rotating magnet 1718 may induce the magnet 2518 of the other rotor 2502 to rotate in the counterclockwise direction. Alternatively, in the case where the user induces rotation of the rotor 2502 in the counterclockwise direction, the magnetic field associated with the rotating magnet 2518 may induce the magnet 1718 of the other rotor 1702 to rotate in the clockwise direction.

Figure 30:
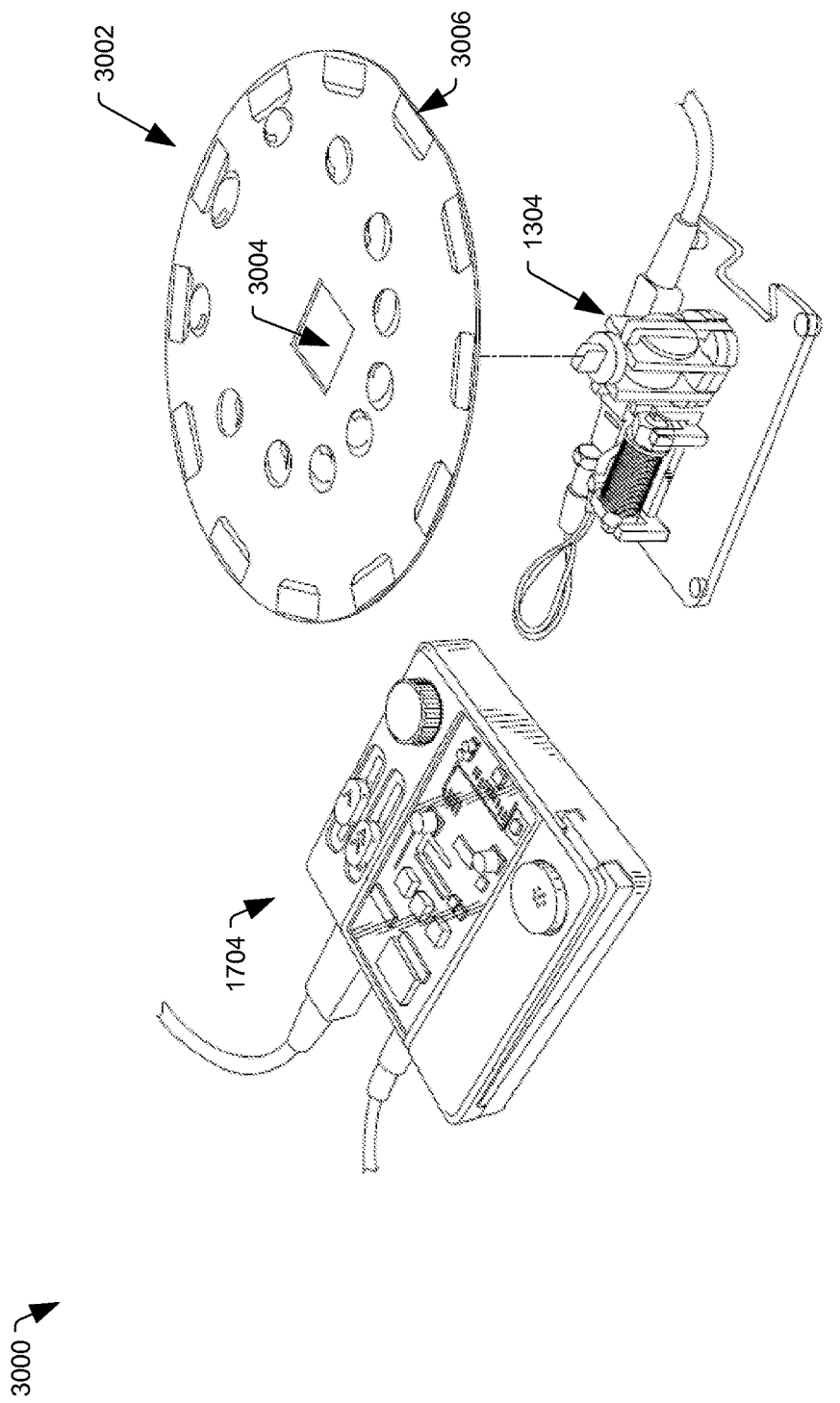
FIG. 30 illustrates an example of an animation disk that includes a design pattern that may create an optical illusion when rotated at a particular rate and illuminated with a strobe light that pulses light at a particular pulse rate.
Figure 33:
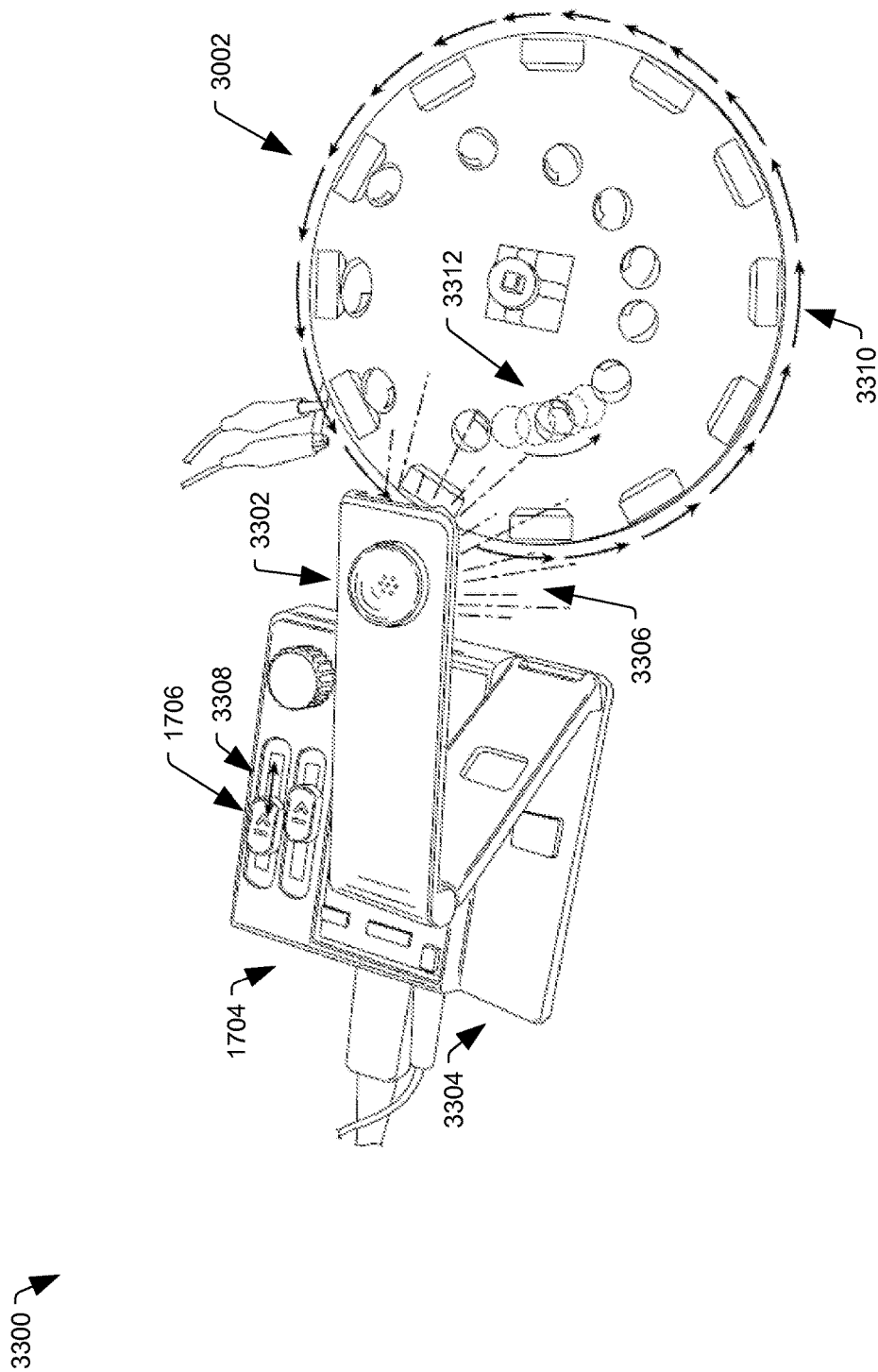
FIG. 33 illustrates the rotating animation disk of FIG. 31 while being illuminated by a strobe light which pulses light at a particular rate.

FIG. 30 is a view 3000 of an example of an animation disk 3002 that includes a design pattern that may create an optical illusion when the animation disk 3002 is rotated at a particular speed exposed to a strobe light that pulses at a particular rate (see e.g., FIG. 33). The animation disk 3002 may include a central hole 3004 (e.g., a substantially square, rectangular, or circular hole) that may allow the animation disk 3002 to be coupled to the rotor 1304. As described above, the control unit 1704 may be used to control the speed of rotation of the rotor 1304 and thereby control the speed of rotation of the animation disk 3002. Further, as described above with respect to FIGS. 23 and 26, in some cases the user may manually initiate rotation of the rotor 1304, and the control unit 1704 may subsequently control the speed of rotation of the rotor 1304 by varying the amount of current that is provided to the coil 110.

In some cases, the animation disk 3002 may be a sheet of paper, a compact disk, cardboard, or some other lightweight material upon which a user may have drawn the design pattern based on instructions included in the motor assembly kit. FIG. 30 illustrates a particular example in which the animation disk 3002 includes a design pattern associated with a travelling ball. In alternative implementations, the animation disk 3002 may include a design pattern associated with a juggling seal, a hopping frog, or a horse in motion, among other alternatives. As described further below with respect to FIG. 33, the control unit 1704 may include a strobe light 3304 that may be moved from a storage position (as shown in FIG. 30) to an operating position (as shown in FIG. 33) in order to illuminate the animation disk 3002 at a particular rate such that the design pattern on the animation 3002 creates an optical illusion. In the case of the travelling ball design illustrated in FIG. 30, the rotation of the animation disk 3002 at a particular rate that is determined based on a pulse rate of the light emitted by the strobe light may create an optical illusion of a ball bouncing from pad to pad.

As alternative examples, in the case of a juggling seal design pattern (not shown), the rotation of the animation disk 3002 at a particular rate may create an optical illusion of one seal passing a ball to another seal. In the case of a hopping frog design pattern (not shown), the rotation of the animation disk 3002 at a particular rate may create an optical illusion of frogs leaping from one lily pad to another lily pad. As another example, one design pattern may create an optical illusion of a galloping horse.

Due to the difficulty of illustrating an optical illusion, the particular animation disk 3002 shown in FIG. 30 includes a portion 3006 that has been illustrated as substantially linear for references purposes only in order to describe the rotation of the animation disk 3002. However, it will be appreciated that the animation disk 3002 may have a substantially circular shape or some other shape. As shown in FIG. 30, a user may position the animation disk 3002 such that the central hole 3004 substantially aligns with the rotor 1304. In some instances, the central hole 3004 may have dimensions that correspond to a diameter of the disk 316 (see FIG. 3 and FIG. 13) such that the animation disk 3002 may be positioned adjacent to the rotor 1304 and rotate at substantially the same speed as the rotor 1304 (e.g., based on the amount of current that is provided to the coil 110 via the control unit 1704).

Figure 31:
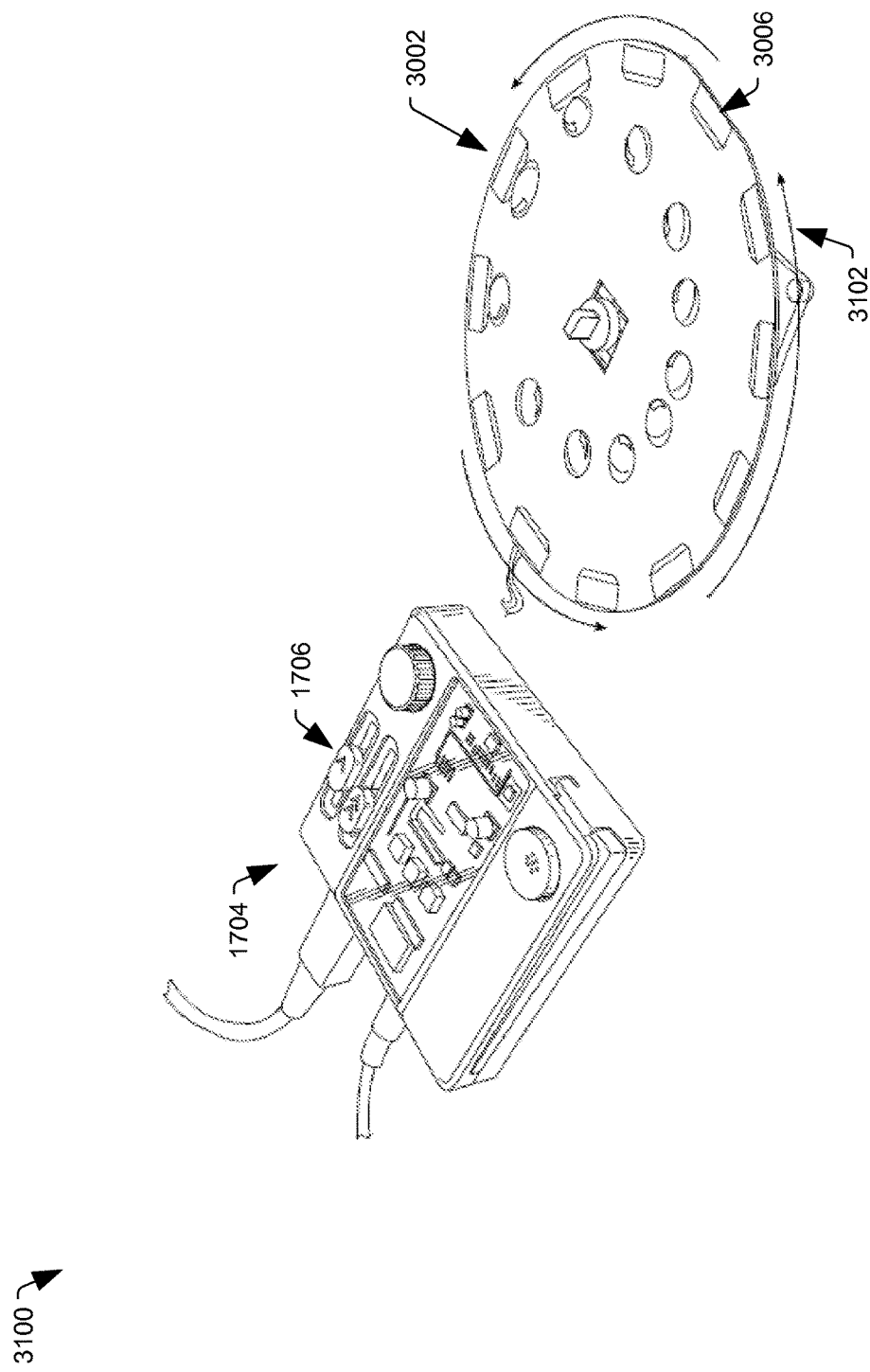
FIG. 31 illustrates the animation disk of FIG. 30 being rotated in a particular direction (e.g., a counterclockwise direction) at a first rate.

FIG. 31 is a view 3100 of the animation disk 3002 of FIG. 30 after the animation disk 3002 has been positioned atop the rotor 1304 (obscured from view in FIG. 31) such that the animation disk 3002 can rotated. As an illustrative, non-limiting example, FIG. 31 illustrates that the control unit 1704 may provide current to the coil 110 (obscured from view in FIG. 31) such that the animation disk 3002 may rotate in a counterclockwise direction with respect to the base structure 304 (substantially obscured from view in FIG. 31), as shown at 3102. However, it will be appreciated that in alternative instances, the control unit 1704 may cause the animation disk 3002 to rotate in a clockwise direction. Further, as described above, the motion controller 1706 of the control unit 1704 may be used to adjust the speed of rotation of the rotor 1304 (and the attached animation disk 3002) by varying the amount of current that is provided to the coil 110.

Figure 32:
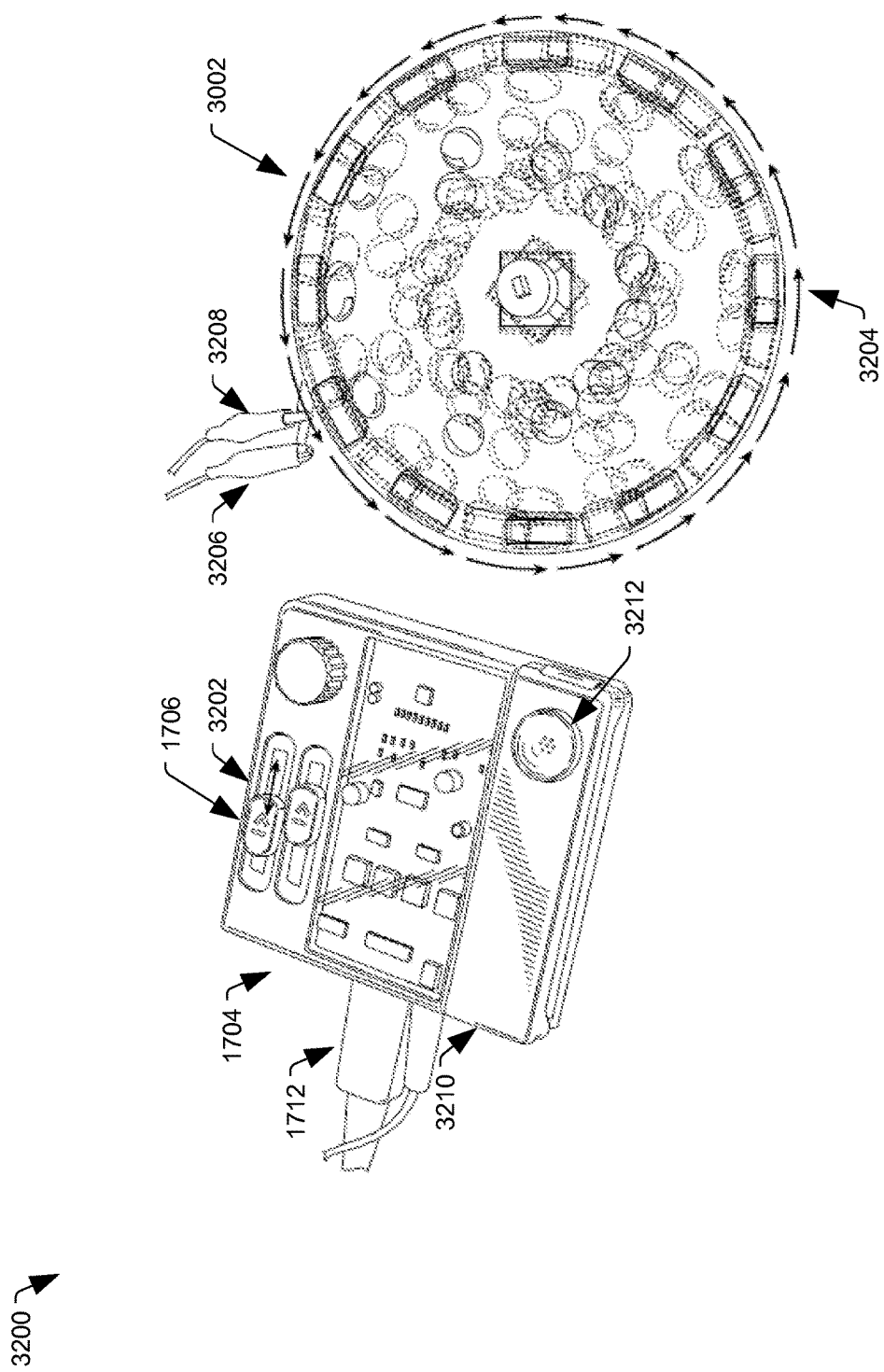
FIG. 32 illustrates the animation disk of FIG. 31 being rotated in a particular direction (e.g., a counterclockwise direction) at a second rate (e.g., at an increased speed).

FIG. 32 is a view 3200 of the animation disk 3002 after the user has adjusted a speed of rotation using the motion controller 1706 of the control unit 1704, as shown at 3202. In the example of FIG. 32, the user has increased the speed of rotation of the animation disk 3002 in the counterclockwise direction, as shown at 3204. FIG. 32 illustrates that the increased rotation speed of the animation disk 3002 may cause the design pattern to appear blurry to the user.

FIG. 32 further illustrates an example in which the control cable 1712 of the control unit 1704 may be electrically connected to the coil 110 via alligator clips 3206 and 3208. As described in FIG. 33, the control unit 1704 may also include a strobe light that is shown in a storage position in FIG. 32, at 3210. A handle 3212 may be used to move the strobe light from the storage position to an operating position.

FIG. 33 is a view 3300 of the rotating animation disk 3002 of FIG. 32 after the user has moved a strobe light 3302 from the storage position (as shown at 3210 in FIG. 32) to an operating position (as shown at 3304). The strobe light 3302 may emit a flashing light in a direction of the animation disk 3002, as shown at 3306. In some cases, the control unit 1704 may include a potentiometer to control a speed at which the animation disk 3002 rotates around the pivot (e.g., using the motion controller 1706). When the strobe light 3302 and the speed of rotation of the animation disk 3002 are out of synchronization with a single cycle of rotation (e.g., a flash at every full rotation, plus one sixth of a rotation), the design pattern may appear to move in a particular direction to an observer. As such, an observer may achieve animation of the design pattern. Similarly, a flash that is coordinated to a fraction less than a full rotation may cause the design pattern to appear to progress in another direction.

While not illustrated in FIG. 33, the control unit 1704 may include a separate control to activate the strobe light 3302, to adjust a pulse rate of the strobe light 3302, to deactivate the strobe light 3302, or a combination thereof. Alternatively, in some cases, the strobe light 3302 may be activated upon being repositioned from the storage position to the operating position. Further, in some cases, the pulse rate of the light emitted by the strobe light 3302 may be fixed at a particular rate.

FIG. 33 illustrates that, while the strobe light 3302 is illuminating the animation disk 3002 with pulsing light (as shown at 3306), the user may adjust a rotation speed of the animation disk 3002, as shown at 3308. In the example illustrated in FIG. 33, the rotation of the animation disk 3002 is in a counterclockwise direction, as shown at 3310. The user may adjust the speed of rotation of the animation disk 3002 using the motion controller 1706 of the control unit 1704 until the design pattern on the animation disk 3002 creates an optical illusion (e.g., a travelling ball in this case), as shown at 3312.

Due to the difficulty of illustrating the optical illusion created by rotating the animation disk 3002 at a particular rotation speed while the strobe light 3302 illuminates the animation disk 3002 with light at a particular pulse rate, FIGS. 34-42 illustrate a sequence of views of the example animation disk 3002 as the animation disk 3002 rotates in the counterclockwise direction.

Figure 34:
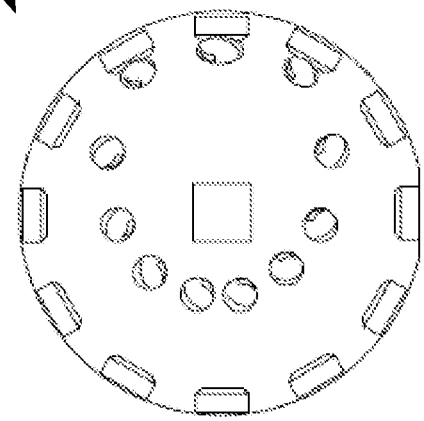
FIGS. 34-42 illustrate views of the animation disk as it rotates in a particular direction in order to create the optical illusion of FIG. 33.

Referring to FIG. 34, a first view of the animation disk 3002 is illustrated and generally designated 3400. As described above with respect to FIGS. 30 and 31, the portion 3006 of the animation disk 3002 that is illustrated as substantially linear is used as a reference point in order to show the relative positioning of particular portions of the design pattern as the animation disk 3002 rotates in the counterclockwise direction. The view 3400 illustrated in FIG. 34 corresponds to a first position of the animation disk 3002 with respect to the rotor 1304, as shown in FIGS. 30 and 31.

Figure 35:
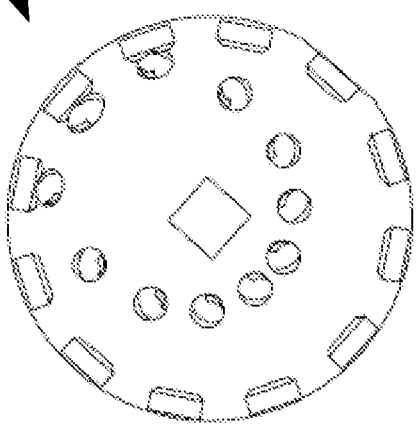
Figure 36:
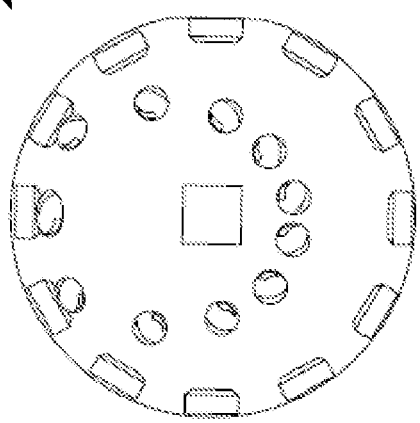
Figure 37:
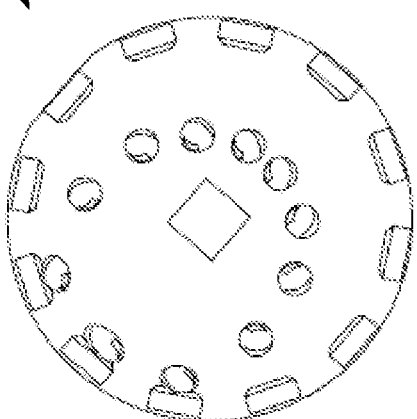

Referring to FIG. 35, a second view of the animation disk 3002 is illustrated and generally designated 3500. With respect to FIG. 34, the animation disk 3002 has rotated substantially forty-five degrees in the counterclockwise direction. Referring to FIG. 36, a third view of the animation disk 3002 is illustrated and generally designated 3600. With respect to FIG. 35, the animation disk 3002 has rotated substantially forty-five degrees in the counterclockwise direction. Referring to FIG. 37, a fourth view of the animation disk 3002 is illustrated and generally designated 3700. With respect to FIG. 36, the animation disk 3002 has rotated substantially forty-five degrees in the counterclockwise direction.

Figure 38:
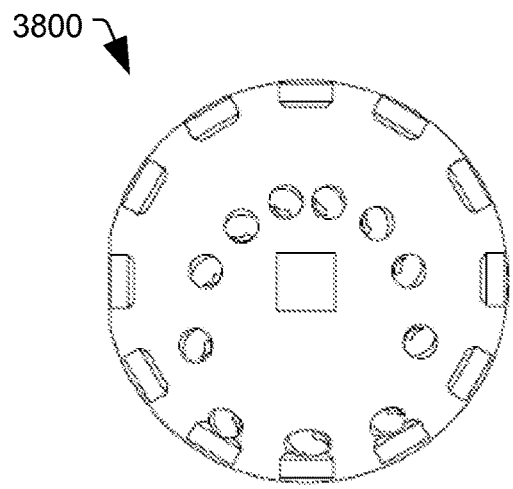
Figure 39:
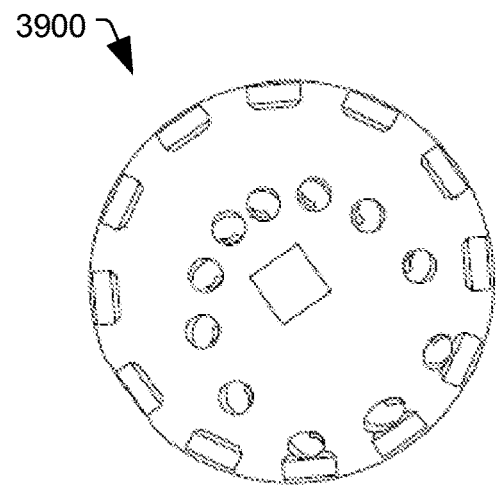
Figure 40:
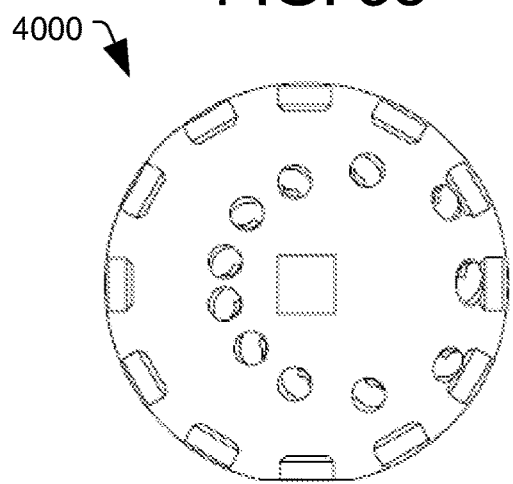
Figure 41:
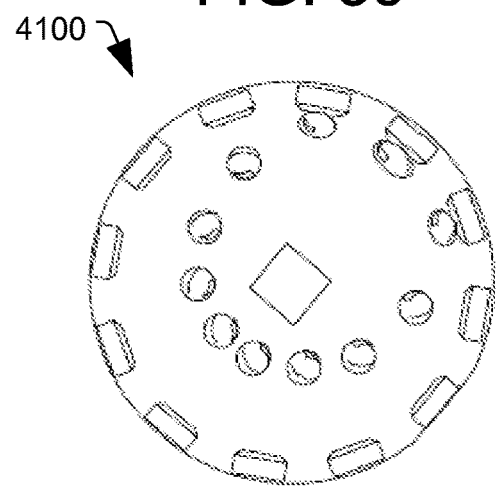

Referring to FIG. 38, a fifth view of the animation disk 3002 is illustrated and generally designated 3800. With respect to FIG. 37, the animation disk 3002 has rotated substantially forty-five degrees in the counterclockwise direction. Referring to FIG. 39, a sixth view of the animation disk 3002 is illustrated and generally designated 3900. With respect to FIG. 38, the animation disk 3002 has rotated substantially forty-five degrees in the counterclockwise direction. Referring to FIG. 40, a seventh view of the animation disk 3002 is illustrated and generally designated 4000. With respect to FIG. 39, the animation disk 3002 has rotated substantially forty-five degrees in the counterclockwise direction. Referring to FIG. 41, an eighth view of the animation disk 3002 is illustrated and generally designated 4100. With respect to FIG. 40, the animation disk 3002 has rotated substantially forty-five degrees in the counterclockwise direction.

Figure 42:
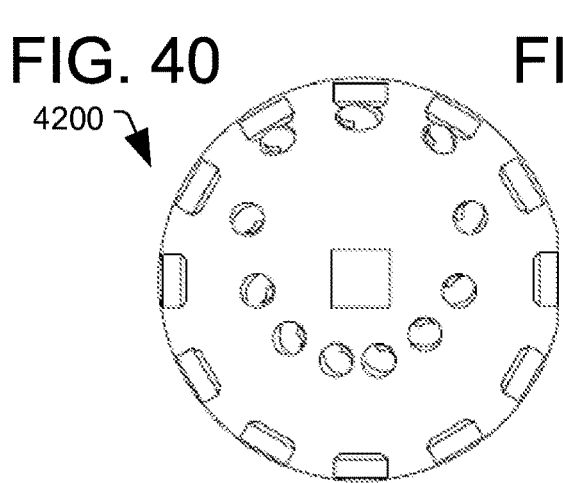

Referring to FIG. 42, a ninth view of the animation disk 3002 is illustrated and generally designated 4200. With respect to FIG. 41, the animation disk 3002 has rotated substantially forty-five degrees in the counterclockwise direction. As a result of the rotation, the animation disk 3002 has completed a single rotation and has returned to the initial position illustrated in FIG. 34.

Those skilled in the art may make numerous uses and modifications of and departures from the specific apparatus and techniques disclosed herein without departing from the inventive concepts. For example, selected examples of motor assembly kits in accordance with the present disclosure may include all, fewer, or different components than those described with reference to one or more of the preceding figures. The disclosed examples should be construed as embracing each and every novel feature and novel combination of features present in or possessed by the apparatus and techniques disclosed herein and limited only by the scope of the appended claims, and equivalents thereof.

The invention claimed is:

1. A motor assembly kit comprising:
   a magnet;
   a coil;
   a bearing;
   a flat assembly comprising a base structure, a first plurality of components that are removable from the flat assembly to construct a magnet support to support the magnet above the base structure, and a second plurality of components that are removable from the flat assembly to construct a coil cradle to support the coil above the base structure,
   wherein the first plurality of components comprises:
      a first magnet bracket that includes a hole to receive a first side of the magnet associated with a first pole of the magnet;
      a second magnet bracket that includes a hole to receive a second side of the magnet associated with a second pole of the magnet;

at least one rotor plate configured to receive the first magnet bracket and the second magnet bracket to form a magnet assembly and configured to rotatably attach the magnet assembly to the base structure via the bearing, wherein the at least one rotor plate includes a first rotor plate including a first set of holes and a second rotor plate including a second set of holes, and wherein the second rotor plate is disposed between the base structure and the first rotor plate; and wherein the second plurality of components comprises:
a first coil cradle support that includes a set of legs to be inserted into a first set of holes of the base structure to support a first end of the coil and a second end of the coil, wherein the first end of the coil is disposed adjacent to the magnet assembly;
a second coil cradle support that includes a set of legs to be inserted into a second set of holes of the base structure to support one of the first end of the coil and the second end of the coil; and
a third coil cradle support that includes a set of legs to be inserted into a third set of holes of the base structure to support the other one of the first end of the coil and the second end of the coil.

2. The motor assembly kit of claim 1, wherein the coil includes at least one wire to receive power from a power supply.

3. The motor assembly kit of claim 2, further comprising the power supply.

4. The motor assembly kit of claim 1, wherein the first set of holes of the first rotor plate include one or more holes to receive the first magnet bracket and one or more holes to receive the second magnet bracket.

5. The motor assembly kit of claim 4, wherein the second set of holes of the second rotor plate include one or more holes to receive the first magnet bracket and one or more holes to receive the second magnet bracket.

6. The motor assembly kit of claim 1, wherein the second set of holes of the second rotor plate include a hole to receive a shaft of the bearing.

7. The motor assembly kit of claim 6, wherein the first set of holes of the first rotor plate include a hole to receive the shaft of the bearing.

8. The motor assembly kit of claim 1, wherein the magnet assembly further comprises a rotor clip that includes a set of legs that substantially align with a set of holes of the at least one rotor plate to secure the magnet within the first magnet bracket and the second magnet bracket.

9. The motor assembly kit of claim 8, wherein the magnet assembly further comprises a disk that includes a hole that substantially aligns with a tip of the rotor clip.

10. The motor assembly kit of claim 9, wherein the hole of the disk has a substantially rectangular shape or a substantially square shape to secure the disk to the tip of the rotor clip.

11. The motor assembly kit of claim 1, wherein the magnet assembly is selectively rotatable in a clockwise direction with respect to the base structure or in a counter-clockwise direction with respect to the base structure.

12. The motor assembly kit of claim 1, wherein a cutout pattern is disposed on one side of the base structure that is substantially adjacent to the magnet assembly.

13. The motor assembly kit of claim 12, wherein the cutout pattern includes a female mating pattern configured to align with a male mating pattern of another base structure.

14. A motor assembly kit comprising:
a coil including a first end and a second end, wherein the second end includes at least one wire;
a magnet;
a bearing;
a flat assembly comprising a base structure, a first plurality of components that are removable from the flat assembly to construct a magnet support to support the magnet above the base structure, and a second plurality of components that are removable from the flat assembly to construct a coil cradle to support the coil above the base structure,
wherein the first plurality of components comprises:
a first magnet bracket that includes a hole to receive a first side of the magnet associated with a first pole of the magnet;
a second magnet bracket that includes a hole to receive a second side of the magnet associated with a second pole of the magnet;
at least one rotor plate configured to receive the first magnet bracket and the second magnet bracket;
a rotor clip that includes a set of legs that substantially align with a set of holes of the at least one rotor plate to secure the magnet within the first magnet bracket and the second magnet bracket to form a magnet assembly that is rotatably attachable to the base structure via the bearing; and
wherein the second plurality of components comprises:
a first coil cradle support that includes a set of legs to be inserted into a first set of holes of the base structure to support the first end of the coil and the second end of the coil, wherein the first end of the coil is disposed adjacent to the magnet assembly;
a second coil cradle support that includes a set of legs to be inserted into a second set of holes of the base structure to support one of the first end of the coil and the second end of the coil; and
a third coil cradle support that includes a set of legs to be inserted into a third set of holes of the base structure to support the other one of the first end of the coil and the second end of the coil.

15. The motor assembly kit of claim 14, wherein the at least one rotor plate includes a first rotor plate including a first set of holes and a second rotor plate including a second set of holes, and wherein the second rotor plate is disposed between the base structure and the first rotor plate.

16. The motor assembly kit of claim 15, wherein:
the first set of holes of the first rotor plate include multiple holes to receive the first magnet support, multiple holes to receive the second magnet support, and a hole to receive a shaft of the bearing; and
the second set of holes of the second rotor plate include multiple holes to receive the first magnet support, multiple holes to receive the second magnet support, and a hole to receive the shaft of the bearing.

17. A motor assembly kit comprising:
a coil including a first end and a second end, wherein the second end includes at least one wire;
a power supply that includes a power cable;
a control unit comprising:
a first interface to receive the power cable; and
a second interface to receive a control cable to be electrically coupled to the coil via the at least one wire;
a magnet;
a bearing;

a flat assembly comprising a base structure, a first plurality of components that are removable from the flat assembly to construct a magnet support to support the magnet above the base structure, and a second plurality of components that are removable from the flat assembly to construct a coil cradle to support the coil above the base structure, wherein the first plurality of components comprises:
a first magnet bracket that includes a hole to receive a first side of the magnet associated with a first pole of the magnet;
a second magnet bracket that includes a hole to receive a second side of the magnet associated with a second pole of the magnet;
a rotor plate assembly comprising a first rotor plate and a second rotor plate, the second rotor plate to be disposed between the base structure and the first rotor plate, wherein the rotor plate assembly is configured to receive the first magnet bracket and the second magnet bracket;
a rotor clip that includes a set of legs that substantially align with a set of holes of the rotor plate assembly to secure the magnet within the first magnet bracket and the second magnet bracket to form a magnet assembly that is rotatably attachable to the base structure via the bearing; and wherein the second plurality of components comprises:
a first coil cradle support that includes a set of legs to be inserted into a first set of holes of the base structure to support the first end of the coil and the second end of the coil, wherein the first end of the coil is disposed adjacent to the magnet assembly;
a second coil cradle support that includes a set of legs to be inserted into a second set of holes of the base structure to support one of the first end of the coil and the second end of the coil; and
a third coil cradle support that includes a set of legs to be inserted into a third set of holes of the base structure to support the other one of the first end of the coil and the second end of the coil.

18. The motor assembly kit of claim 17, wherein the current that is provided to the coil includes alternating current or direct current.

19. The motor assembly kit of claim 17, wherein the control unit further comprises a motion controller configured to selectively adjust an amount of current that is provided to the coil responsive to user input.

20. A motor assembly kit comprising:
a magnet;
a coil;
a bearing;
a flat assembly comprising a base structure, a first plurality of components that are removable from the flat assembly to construct a magnet support to support the magnet above the base structure, and a second plurality of components that are removable from the flat assembly to construct a coil cradle to support the coil above the base structure, wherein the first plurality of components comprises:
a first magnet bracket that includes a hole to receive a first side of the magnet associated with a first pole of the magnet;
a second magnet bracket that includes a hole to receive a second side of the magnet associated with a second pole of the magnet;
at least one rotor plate configured to receive the first magnet bracket and the second magnet bracket to form a magnet assembly and configured to rotatably attach the magnet assembly to the base structure via the bearing, wherein the magnet assembly further comprises a rotor clip that includes a set of legs that substantially align with a set of holes of the at least one rotor plate to secure the magnet within the first magnet bracket and the second magnet bracket; and wherein the second plurality of components comprises:
a first coil cradle support that includes a set of legs to be inserted into a first set of holes of the base structure to support a first end of the coil and a second end of the coil, wherein the first end of the coil is disposed adjacent to the magnet assembly;
a second coil cradle support that includes a set of legs to be inserted into a second set of holes of the base structure to support one of the first end of the coil and the second end of the coil; and
a third coil cradle support that includes a set of legs to be inserted into a third set of holes of the base structure to support the other one of the first end of the coil and the second end of the coil.

* * * * *